(12) United States Patent
Kim et al.

(10) Patent No.: US 12,130,448 B2
(45) Date of Patent: Oct. 29, 2024

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Hyun Soo Kim, Seoul (KR); Sung Guk Lee, Seoul (KR); Jung Seok Oh, Seoul (KR); Seung Hak Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1035 days.

(21) Appl. No.: 16/961,051

(22) PCT Filed: Dec. 26, 2018

(86) PCT No.: PCT/KR2018/016629
§ 371 (c)(1),
(2) Date: Jul. 9, 2020

(87) PCT Pub. No.: WO2019/139284
PCT Pub. Date: Jul. 18, 2019

(65) Prior Publication Data
US 2021/0063762 A1 Mar. 4, 2021

(30) Foreign Application Priority Data

Jan. 10, 2018 (KR) .................. 10-2018-0003257
Aug. 17, 2018 (KR) .................. 10-2018-0095891

(51) Int. Cl.
*G02B 27/00* (2006.01)
*G02B 7/08* (2021.01)
(Continued)

(52) U.S. Cl.
CPC ............ *G02B 27/64* (2013.01); *G02B 7/08* (2013.01); *H04N 23/00* (2023.01)

(58) Field of Classification Search
CPC ........ G02B 27/64; G02B 7/08; G02B 27/646; H04N 23/00; H04N 23/54; H04N 23/55;
(Continued)

(56) References Cited

U.S. PATENT DOCUMENTS

| 10,063,752 B2 | 8/2018 | Topliss et al. |
| 10,197,813 B2 | 2/2019 | Lee et al. |
| 2011/0169920 A1* | 7/2011 | Ryu .................. G03B 19/22 348/46 |

(Continued)

FOREIGN PATENT DOCUMENTS

| CN | 104995541 A | 10/2015 |
| CN | 105527777 A | 4/2016 |

(Continued)

*Primary Examiner* — Henry Duong
(74) *Attorney, Agent, or Firm* — Birch, Stewart, Kolasch & Birch, LLP

(57) ABSTRACT

An embodiment comprises: a housing including a first corner portion, a second corner portion, a third corner portion, and a fourth corner portion; a bobbin disposed within the housing; a coil disposed on the bobbin; a magnet disposed in the housing while being arranged opposite to the coil; a circuit board disposed on one side of the housing and including a position sensor; and a sensing magnet disposed on the bobbin while being arranged opposite to the position sensor, wherein: the magnet comprises a first magnet disposed in the first corner portion of the housing, and a second magnet disposed in the second corner portion opposite to the first corner portion of the housing; the position sensor is disposed closer to the third corner portion than to the first corner portion; and no magnet is disposed in the third corner portion of the housing.

18 Claims, 23 Drawing Sheets

(51) Int. Cl.
*G02B 27/64* (2006.01)
*H04N 23/00* (2023.01)

(58) Field of Classification Search
CPC ...... H04N 23/57; H04N 23/687; G03B 30/00;
G03B 2205/0069; G03B 3/10; G11B
7/0908; G11B 7/0925; G11B 7/0927;
G11B 7/0929; G11B 7/093; G11B
7/0937; H02K 41/0354; H02K 41/0356
USPC ......................................................... 351/824
See application file for complete search history.

(56) References Cited

U.S. PATENT DOCUMENTS

| | | | | |
|---|---|---|---|---|
| 2016/0109721 | A1* | 4/2016 | Min | G02B 27/646 |
| | | | | 359/557 |
| 2017/0146772 | A1 | 5/2017 | Min et al. | |
| 2018/0348469 | A1 | 12/2018 | Son et al. | |
| 2019/0101722 | A1* | 4/2019 | Aranai | G03B 15/00 |
| 2019/0121055 | A1 | 4/2019 | Lee et al. | |

FOREIGN PATENT DOCUMENTS

| | | | |
|---|---|---|---|
| CN | 107544123 A | * | 1/2018 |
| EP | 3 428 705 A1 | | 1/2019 |
| JP | 7-146430 A | | 6/1995 |
| JP | 2011-237507 A | | 11/2011 |
| JP | 2016-509684 A | | 3/2016 |
| JP | 2017-161609 A | | 9/2017 |
| JP | 2018-4718 A | | 1/2018 |
| JP | 2018-45211 A | | 3/2018 |
| KR | 10-0932175 B1 | | 12/2009 |
| KR | 10-2016-0009389 A | | 1/2016 |
| KR | 10-2016-0023386 A | | 3/2016 |
| KR | 10-2016-0041500 A | | 4/2016 |
| KR | 10-2016-0091679 A | | 8/2016 |
| KR | 10-2017-0029734 A | | 3/2017 |
| KR | 10-2017-0060757 A | | 6/2017 |
| KR | 10-2017-0116749 A | | 10/2017 |
| KR | 10-2017-0143198 A | | 12/2017 |
| KR | 10-2018-0010472 A | | 10/2018 |
| WO | WO2014/100516 A1 | | 6/2014 |

* cited by examiner

LENS DRIVING APPARATUS, AND CAMERA MODULE AND OPTICAL DEVICE COMPRISING SAME

CROSS REFERENCE TO RELATED APPLICATIONS

This application is the National Phase of PCT International Application No. PCT/KR2018/016629, filed on Dec. 26, 2018, which claims priority under 35 U.S.C. 119(a) to Patent Application Nos. 10-2018-0003257, filed in the Republic of Korea on Jan. 10, 2018 and 10-2018-0095891, filed in the Republic of Korea on Aug. 17, 2018, all of which are hereby expressly incorporated by reference into the present application.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device each including the same, which are capable of mounting a large lens aperture while decreasing the size of a product, ensuring space required for mounting a drive-type position sensor, and improving design freedom.

Technical Solution

A lens moving apparatus according to an embodiment includes a housing including a first corner portion, a second corner portion, a third corner portion and a fourth corner portion, a bobbin disposed in the housing, a coil disposed on the bobbin, a magnet disposed on the housing so as to face the coil, a circuit board disposed on one side surface of the housing and including a position sensor, and a sensing magnet disposed on the bobbin so as to face the position sensor, wherein the magnet includes a first magnet disposed on the first corner portion of the housing and a second magnet disposed on the second corner portion, which faces the first corner portion, wherein the position sensor is disposed closer to the third corner portion than to the first corner portion, and wherein no magnet is disposed on the third corner portion of the housing.

The coil may include a first coil unit that faces the first magnet and a second coil unit that faces the second magnet.

The lens moving apparatus may further include a first lower elastic unit, a second lower elastic unit and a third lower elastic unit, which are coupled to the housing and are spaced apart from one another, wherein a first end of the first coil unit may be conductively connected to the first lower elastic unit and a second end of the first coil unit may be conductively connected to a first end of the third lower elastic unit, and wherein a first end of the second coil unit may be conductively connected to a first end of the second lower elastic unit, and a second end of the second coil unit may be conductively connected to a second end of the third lower elastic unit.

The circuit board may be disposed between the first corner portion and the third corner portion of the housing.

The lens moving apparatus may further include a lower elastic member disposed under the housing. The lower elastic member may includes a first lower elastic unit coupled to the third corner portion of the housing, a second lower elastic unit coupled to the third corner portion of the housing, and a third lower elastic unit coupled to the fourth corner portion of the housing that faces the third corner portion of the housing, and the circuit board may include a first terminal conductively connected to the first lower elastic unit and a second terminal conductively connected to the second lower elastic unit.

The lower elastic member may not overlap at least one of the first magnet and the second magnet in an optical-axis direction.

One side surface of the bobbin that faces one surface of the housing may be provided with a projection projecting in a direction toward the one side surface of the housing, and the sensing magnet may be disposed on the projection.

The one side surface of the housing may have a groove in which the projection of the bobbin is disposed.

The width of at least a portion of the sensing magnet may decrease in a direction toward the one side surface of the housing from the one side surface of the bobbin.

The bobbin may have a bore (or an opening) in which a lens is mounted, and the distance between another side surface of the housing that faces the one side surface of the housing and the center of the bore in the bobbin may be less than the distance between the center of the bore in the bobbin and the one side surface of the housing.

The housing may include a first side portion disposed between the first corner portion and the third corner portion, a second side portion, which faces the first side portion of the housing, a third side portion disposed between the second corner portion and the third corner portion, and a fourth side portion disposed between the first corner portion and the fourth corner portion, and the thickness of each of the third and fourth side portions of the housing may be greater than the thickness of the second side portion of the housing.

A lens moving apparatus according to another embodiment includes a housing including a first corner portion, a second corner portion, a third corner portion and a fourth corner portion, a bobbin disposed in the housing, a coil disposed on the bobbin and a magnet disposed on the housing so as to face the coil, wherein the magnet includes a first magnet disposed on the first corner portion of the housing and a second magnet disposed on the second corner portion, which faces the first corner portion, wherein the third corner portion of the housing is disposed so as to be adjacent to the first corner portion and face the fourth corner portion, and wherein an imaginary line connecting the third corner portion to the fourth corner portion does not overlap the magnet and the coil.

A lens moving apparatus according to a further embodiment includes a housing including a first corner portion, a second corner portion, a third corner portion and a fourth corner portion, a bobbin disposed in the housing, a coil disposed on the bobbin, a magnet disposed on the housing so as to face the coil, and an elastic member coupled to the bobbin and the housing, wherein the magnet includes a first magnet disposed on the first corner portion of the housing and a second magnet disposed on the second corner portion, which faces the first corner portion, wherein the third corner portion of the housing is disposed so as to be adjacent to the first corner portion and to face the fourth corner portion, wherein the elastic member includes an inner portion coupled to the bobbin, an outer portion coupled to the housing and a connector connecting the inner portion to the outer portion, and wherein an imaginary line connecting the third corner portion to the fourth corner portion does not overlap the inner portion of the elastic member.

The imaginary line connecting the third corner portion to the fourth corner portion may not overlap the connector.

A lens moving apparatus according to another embodiment may further include a circuit board disposed between the first corner portion and the third corner portion and a position sensor disposed on the circuit board, wherein the position sensor may be disposed closer to the third corner portion than to the first corner portion of the housing, and wherein no magnet may be disposed on the third corner portion of the housing.

A lens moving apparatus according to a further embodiment includes a cover member including a first corner portion, a second corner portion, a third corner portion and a fourth corner portion, a bobbin disposed in the cover member, a coil disposed on the bobbin, a magnet disposed on the cover member so as to face the coil, a circuit board disposed on one inner surface of the cover member and including a position sensor, and a sensing magnet disposed on the bobbin so as to face the position sensor, wherein the magnet include a first magnet disposed on the first corner portion of the cover member and a second magnet disposed on the second corner portion so as to face the first corner portion, and wherein the position sensor is disposed closer to the third corner portion than to the first corner portion, wherein no magnet is disposed on the third corner portion of the cover member.

A lens moving apparatus according to a further embodiment includes a housing including a first corner and a second corner adjacent to the first corner, a bobbin disposed in the housing, a coil disposed on the bobbin, a first magnet disposed on the first corner of the housing, a second magnet disposed on a third corner of the housing, which faces the first corner of the housing, a position sensor disposed on the housing, and a sensing magnet disposed on the bobbin so as to correspond to the position sensor, wherein a first surface area of a first portion of the coil disposed on one side surface of the bobbin corresponding to the first corner of the housing is larger than a second surface area of a second portion of the coil disposed on another side surface of the bobbin.

The second surface area may be smaller than a third surface area of a third portion of the coil connecting the first portion of the coil to the second portion of the coil.

The ratio of the second surface area to the first surface area may be 1:2~1:4.

The third corner may face the first corner in a first diagonal direction, and the housing may further include a fourth corner that faces the second corner in a second diagonal direction, a first side portion disposed between the first corner and the second corner, a first side portion disposed between the first corner and the fourth corner, a second side portion disposed between the second corner and the third corner, a third side portion disposed between the first corner and the second corner, and a fourth side portion disposed between the third corner and the fourth corner. The first diagonal direction may be a direction toward the third corner from the first corner through the center of the housing, and the second diagonal direction may be a direction toward the fourth corner from the second corner through the center of the housing. No magnet may be disposed on the second corner or the fourth corner of the housing.

The side surface of the bobbin may be symmetrical with respect to a first diagonal line, which is a line in the first diagonal direction, and may be symmetrical with respect to a second diagonal line, which is a line in the second diagonal direction.

When the bobbin is viewed from above, the side surface of the bobbin may be asymmetrical with respect to a first central line and may be asymmetrical with respect to a second central line, wherein the first central line is a line in a direction toward the second side portion of the housing from the first side portion of the housing through the center of the housing and the second central line is a line in a direction toward the fourth side portion of the housing from the third side portion of the housing through the center of the housing.

The lens moving apparatus may further include a circuit board, disposed on the first side portion of the housing and conductively connected to the position sensor, and a balancing magnet, disposed on the bobbin.

The lens moving apparatus may further include a base disposed under the bobbin, and first and second springs, which are disposed between the bobbin and the base and are spaced apart from each other, wherein the first spring includes a first bonding portion connected to one end of the coil and a second bonding portion conductively connected to the circuit board, and the second spring includes a third bonding portion connected to the other end of the coil and a fourth bonding portion conductively connected to the circuit board.

One end of the first magnet may be disposed on the first side portion of the housing, and the other end of the first magnet may be disposed on the third side portion of the housing. One end of the second magnet may be disposed on the second side portion of the housing, and the other end of the second magnet may be disposed on the fourth side portion of the housing. At least a portion of the position sensor may overlap the second magnet in a direction toward the second side portion of the housing from the first side portion of the housing.

The position sensor may include a hall sensor, configured to generate an output as a result of detection of the intensity of the magnetic force of the sensing magnet, and a drive, configured to output a first drive signal for driving the hall sensor and a second drive signal for driving the coil.

Advantageous Effects

Embodiments are able to mount a large lens aperture while decreasing the size of a product, to ensure space required for mounting a drive-type position sensor, and to improve design freedom.

BEST MODE

Figure 1:
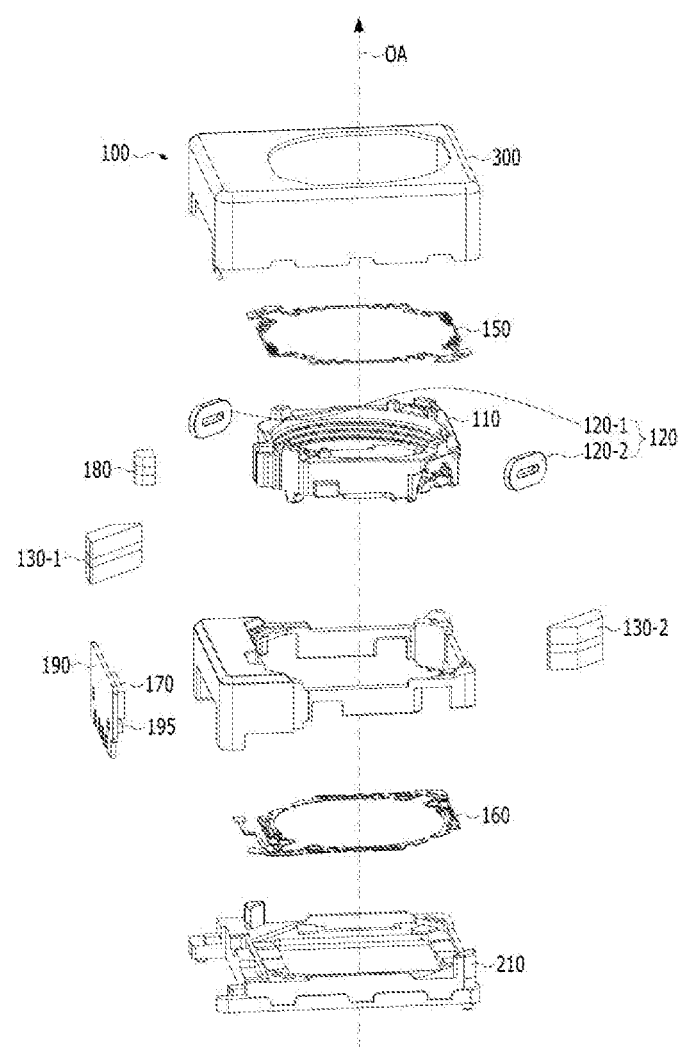
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, lens moving apparatuses and a camera modules and camera modules and optical devices including the same according to the embodiments will be described with reference to the accompanying drawings. For the convenience of description, although the lens moving apparatus is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the optical-axis direction, may be referred to as a "first direction", the X-axis direction may be referred to as a "second direction", and the Y-axis direction may be referred to as a "third direction".

The lens moving apparatus according to an embodiment of the present invention is capable of performing an "auto-focusing function". Here, the "auto-focusing function" serves to automatically focus an image of a subject on an image sensor surface.

Figure 2:
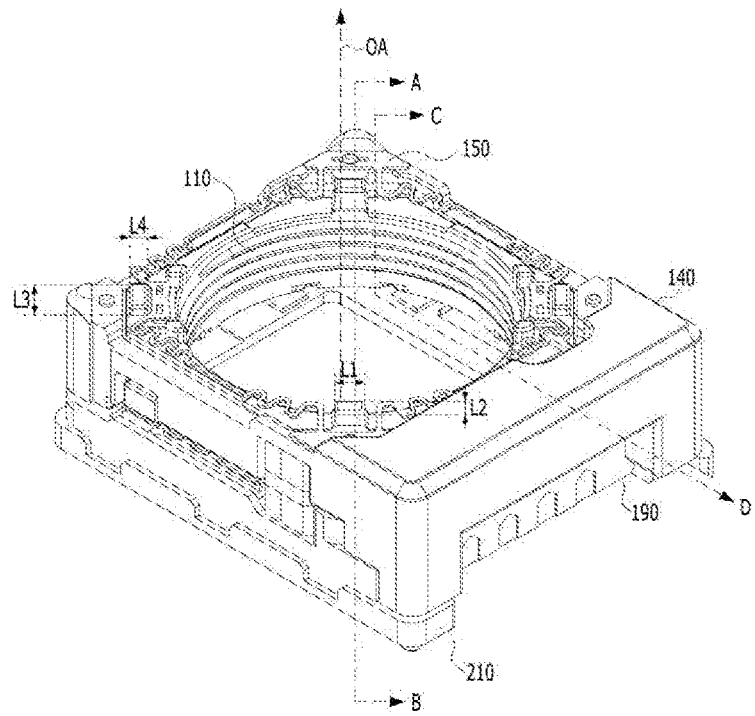
FIG. 2 is an assembled perspective view of the lens moving apparatus shown in FIG. 1, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 in FIG. 1 is removed.

Referring to FIGS. 1 and 2, the lens moving apparatus 100 includes a bobbin 110, a coil 120, a first magnet 130-1, a second magnet 130-2, a housing 140, an upper elastic member 150, a lower elastic member 160, a position sensor 170, a circuit board 190 and a sensing magnet 180.

The lens moving apparatus 100 may further include a balance magnet (not shown) and a cover member 300.

The lens moving apparatus 100 may further include a capacitor 195 mounted on the circuit boar 190.

The term "coil" may be interchanged with "coil unit", and the term "elastic member" may be interchanged with "elastic unit" or "spring".

First, the bobbin 110 will be described.

The bobbin 110 may be disposed in the housing 140 so as to be movable in the optical-axis direction OA or the first direction (for example, the Z-axis direction) by the electromagnetic interaction between the coil 120 and the first and second magnets 130-1 and 130-2.

Figure 3A:
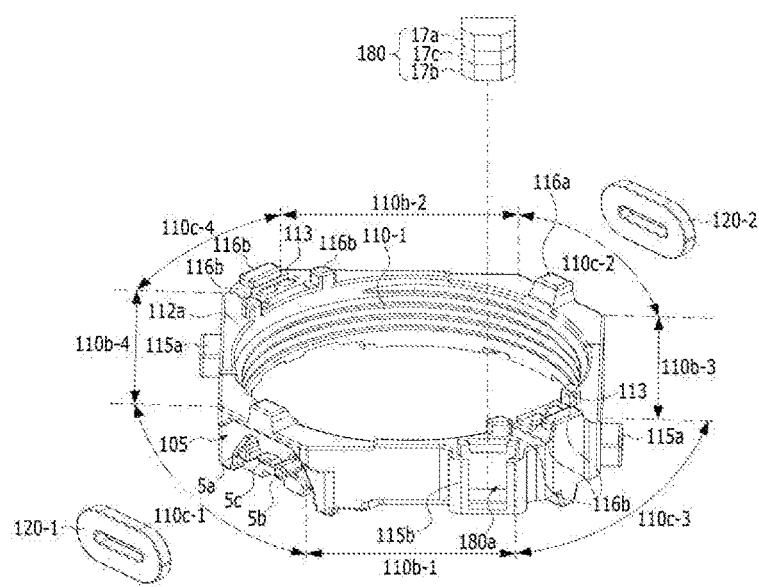
FIG. 3A is a perspective view of the bobbin, the first coil and the sensing magnet shown in FIG. 1.
Figure 3B:
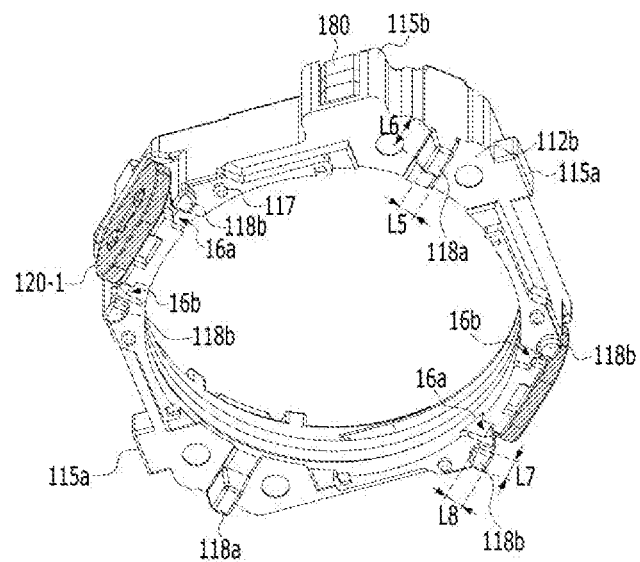
FIG. 3B is an assembled perspective view of the bobbin, the first coil and the sensing magnet.

FIG. 3A is a perspective view of the bobbin 110, the first coil 120 and the sensing magnet 180, which are shown in FIG. 1. FIG. 3B is an assembled perspective view if the bobbin 110, the first coil 120 and the sensing magnet 180.

Referring to FIGS. 3A and 3B, the bobbin 110 may have a bore in which a lens or a lens barrel is mounted. For example, the bore in the bobbin 110 may be a through hole formed through the bobbin 110 in the optical-axis direction, and may have a circular shape, an elliptical shape or a polygonal shape without being limited thereto.

Although the bore in the bobbin 110 may be directly provided therein with a lens, the disclosure is not limited thereto. In another embodiment, a lens barrel, to which at least one lens is mounted or coupled, may be coupled or mounted in the bore in the bobbin 110.

For example, the bobbin 110 may be provided in the inner circumferential surface thereof with a thread 110-1, with which a lens or a lens barrel is engaged.

The bobbin 110 may include a plurality of side portions or a plurality of side surfaces.

For example, the bobbin 110 may include first side portions 110b-1 to 110b-4, which are spaced apart from each other, and second side portions 110c-1 to 110c-4. Each of the second side portions 110c-1 to 110c-4 may connect two adjacent first side portions to each other.

For example, the first side portions 110b-1 to 110b-4 may be referred to as a first side portion 110b-1, a second side portion 110b-2, a third side portion 110b-3 and a fourth side portion 110b-3, and the second side portions 110c-1 to 110c-4 may be referred to as a first corner portion 110c-1, a second corner portion 110c-2, a third corner portion 110c-3 and a fourth corner portion 110c-4.

Alternatively, the first side portions 110b-1 to 110b-4 may be referred to as a first of first side portion 110b-1, a second of first side portion 110b-1, a third of first side portion 110b-3 and a fourth of first side portion 110b-4, and the second side portions 110c-1 to 110c-4 may be referred to as a first of second side portion 110c-1, a second of second side portion 110c-2, a third of second side portion 110c-3 and a fourth of second side portion 110c-4.

Although the horizontal or crosswise length of each of the first side portions 110b-1 to 110b-4 of the bobbin 110 may be different from the horizontal or crosswise length of each of the second side portions 110c-1 to 110c-4 of the bobbin 110, the disclosure is not limited thereto. In another embodiment, the two lengths may be equal to each other.

The bobbin 110 may include a projection 115a provided on the outer surface thereof. For example, the projection 115a may be disposed on the outer surface of at least one of the first side portions 110b-1 to 110b-4 of the bobbin 110. The projection 115a may project in a direction that extends through the center of the bore in the bobbin and is parallel to a line perpendicular to the optical axis, but the disclosure is not limited thereto.

The projection 115a of the bobbin 110 may correspond to a groove 25 in the housing 140, and may be disposed in the groove 25a in the housing 140 so as to minimize or prevent rotation of the bobbin 110 about the optical axis beyond a predetermined range.

Furthermore, the projection 115a may serve as a stopper for minimizing or preventing collision of the upper surface of the bobbin 110 with the cover member 300 even when the bobbin 110 is moved beyond a predetermined range in the optical-axis direction (for example, in a direction toward the upper elastic member 160 from the lower elastic member 160) due to external impact or the like.

The bobbin 110 may have formed in the upper portion, the upper end or the upper surface thereof a first escape groove 112a for avoiding spatial interference with a first frame connector 153 of the upper elastic member 150. Although the first escape groove 112a may be formed in at least one of the first side portions 110b-1 to 110b-4 of the bobbin 110, the disclosure is not limited thereto. In another embodiment, the first escape groove 112a may be formed in at least one of the first and second side portions of the bobbin 110.

Furthermore, the bobbin 110 may have formed in the lower portion, the lower end or the lower surface thereof a second escape groove 112b for avoiding spatial interference with a second frame connector 163 of the lower elastic member 160.

The bobbin 110 may include at least one stopper 116a and at least one stopper 116b projecting from the upper portion, the upper end or the upper surface of the bobbin 110.

The at least one stopper 116a and the at least one stopper 116b of the bobbin 110 may serve to prevent the upper surface of the bobbin 110 from directly colliding with the inner side of the upper plate of the cover member 300 even when the bobbin 110 is moved beyond a specified range due to an external impact or the like while the bobbin 110 is being moved in the first direction to perform an auto-focusing function.

The small size of the bobbin 110 may impose restrictions on the disposition of the first and second coil units 120-1 and 120-2, the coupling relationships between the upper elastic member 150 and the bobbin 110, and the design and positioning of the stoppers of the bobbin 110.

In consideration thereof, the first stopper 116a and the second stopper 116b, which have different heights, may be formed on the upper portion, the upper end or the upper surface of the bobbin 110.

The first stopper 116a of the bobbin 110 may be disposed on at least one of the second side portions 110c-1 to 110c-4 of the bobbin 110, and the second stopper 116b of the bobbin 110 may be disposed on at least another one of second side portions 110c-1 to 110c-4 of the bobbin 110.

For example, the first stopper 116a of the bobbin 110 may be disposed on one of the second side portions 110c-1 and 110c-2 to which the upper elastic member 150 is not coupled.

Furthermore, the second stopper 116b of the bobbin 110 may be disposed on one of the second side portions 110c-3 and 110c-4 to which the upper elastic member 150 is coupled.

The upper surface of the first stopper 116 of the bobbin 110 may be higher than the upper surface of the second stopper 116b. Since the upper surface of the first stopper 116 of the bobbin 110 is higher than the upper surface of the second stopper 116b, the first stopper 116a receives a first impact, and the second stopper 116b serves to stop movement of the cover member.

For example, the height difference between the upper surface of the first stopper 116a and the upper surface of the second stopper 116b of the bobbin 110 may be 10 μm-30 μm.

If the height difference between the upper surface of the first stopper 116a and the upper surface of the second stopper 116b of the bobbin 110 is less than 10 μm, there may be no height difference between the first stopper 116a and the second stopper 116b due to injection tolerance (about 5 μm) in formation of the stoppers of the bobbin 110.

Meanwhile, if the height difference exceeds 30 μm, only the first stopper 116a of the bobbin 110 may serve both as a shock absorber and as a stopper, but the second stopper 116b may not serve to stop the movement of the cover member.

For example, the crosswise length (L3) of the upper surface of the second stopper 116b may be greater than the crosswise length (L1) of the upper surface of the first stopper 116a (L3>L1). For example, the longitudinal length (L4) of the upper surface of the second stopper 116b may be equal to or less than the crosswise length (L2) of the upper surface of the first stopper 116a (L4≤L2). In another embodiment, the length (L3) may be equal to or less than the length (L1) (L3≤L1), or the length (L4) may be greater than the length (L2) (L4>L2).

Although FIG. 3A illustrates the embodiment in which one first stopper 116a is disposed on one second side portion 110c-1 or 110c-2 of the bobbin 110, the disclosure is not limited thereto. In another embodiment, two or more first stoppers may be formed at one second side portion 110c-1 or 110c-2 of the bobbin 110.

Furthermore, although FIG. 3A illustrates the embodiment in which three second stoppers 116b are disposed on another second side portion 110c-3 or 110c-4 of the bobbin 110, the disclosure is not limited thereto. In another embodiment, two or four or more second stoppers may be formed at the another one second side portion of the bobbin 110.

The bobbin 110 may include first couplers 113, which are intended to be coupled and secured to a first inner frame 151 of the upper elastic member 150. Although each of the first couplers 113 of the bobbin 110 shown in FIG. 3A is configured to have a protrusion shape, the disclosure is not limited thereto. In another embodiment, each of the first couplers 113 of the bobbin 110 may be configured to have a groove or flat surface shape.

For example, the first couplers 113 may be formed at the second side portions 110-3 of the bobbin 110, at which the second stoppers 116b of the bobbin 110 are disposed.

Referring to FIG. 3B, the bobbin 110 may include second couplers 117, which are intended to be coupled and secured to the lower elastic member 160. Although each of the second couplers 117 of the bobbin 110 shown in FIG. 3B is configured to have a protrusion shape, the disclosure is not limited thereto. In another embodiment, each of the second couplers of the bobbin 110 may be configured to have a groove or flat surface shape.

For example, the second couplers 117 may be formed at the lower surfaces, the lower portions or the lower ends of the first side portions 110b-1 to 110b-4 of the bobbin 110 adjacent to the second side portions 110c-1 and 110c-2 of the bobbin 110.

The bobbin 110 may include at least one stopper 118a and at least one stopper 118b projecting from the lower portion, the lower end or the lower surface of the bobbin 110.

The at least one stopper 118a and the at least one stopper 118b of the bobbin 110 may serve to prevent the lower surface of the bobbin 110 from directly colliding with the upper surface of the base 210 even when the bobbin 110 is moved beyond a specified range due to an external impact or the like while the bobbin 110 is moved in the first direction for auto-focusing function.

For example, the bobbin 110 may be provided at the lower portion, the lower end or the lower surface thereof with a third stopper 118a and a fourth stopper 119b, which have different heights.

The third stopper 118a of the bobbin 110 may be disposed on at least one of the second side portions 110c-1 to 110c-4 of the bobbin 110, and the fourth stopper 118b of the bobbin 110 may be disposed on another one of the first side portions 110c-1 to 110c-4 of the bobbin 110.

For example, the third stopper 118a of the bobbin 110 may be disposed on one of the second side portions 110c-3 and 110c-4 of the bobbin 110.

For example, the fourth stopper 118b of the bobbin 110 may be disposed on the one among the first side portions 110b-1 to 110b-4 of the bobbin 110 to which the lower elastic member 160 is coupled.

The lower surface of the third stopper 118a of the bobbin 110 may be lower than the lower surface of the fourth stopper 118b of the bobbin 110. Since the lower surface of the third stopper 118a of the bobbin 110 is lower than the lower surface of the fourth stopper 118b of the bobbin 110, the third stopper 118a receives a first impact, and the second stopper 118b serves to stop the movement of the bobbin.

For example, the height difference between the lower surface of the third stopper 118a and the lower surface of the fourth stopper 118b of the bobbin 110 may be 10 μm-30 μm.

If the height difference between the lower surface of the third stopper 118a and the lower surface of the fourth stopper 118b of the bobbin 110 is less than 10 μm, there may be no height difference between the third stopper 118a and the fourth stopper 118b due to injection tolerance (about 5 μm) in the formation of the stoppers of the bobbin 110.

Meanwhile, if the height difference between the lower surface of the third stopper 118a and the lower surface of the fourth stopper 118b of the bobbin 110 exceeds 30 μm, the third stopper 118a of the bobbin 110 may serve both as a shock absorber and as a stopper but the fourth stopper 118b may not serve to stop the movement of the bobbin.

For example, the crosswise length (L7) of the lower surface of the fourth stopper 118b may be less than the crosswise length (L5) of the lower surface of the third stopper 118a (L7>L5). For example, the longitudinal length (L6) of the lower surface of the third stopper 118a may be greater than the crosswise length (L8) of the lower surface of the fourth stopper 118b (L6>L8). In another embodiment, the length (L7) may be equal to or less than the length (L5) (L7≤L5), or the length (L6) may be equal to or less than the length (L8) (L6≤L8).

Although FIG. 3B illustrates the embodiment in which three third stoppers 118a are disposed on one second side portion 110c-3 or 110c-4 of the bobbin 110, the disclosure is not limited thereto. In another embodiment, two or more third stoppers may be formed at one second side portion 110c-3 or 110c-4 of the bobbin 110.

Furthermore, although FIG. 3B illustrates an embodiment in which one fourth stopper 118b is disposed on each of the first side portion 110b-1 to 110b-4 of the bobbin 110, the disclosure is not limited thereto. In another embodiment, two or more fourth stoppers may be formed at each of the first side portions 110b-1 to 110b 4 of the bobbin 110.

The second side portions 110c-1 and 110c-2 of the bobbin 110, which face each other, may have formed in the outer surfaces thereof respective seating groove 105, in which the first and second coil units 120-1 and 120-2 are seated, inserted or disposed. The seating grooves 105 of the bobbin 110 may be depressed from the outer surface of the second side portions 110c-1 and 110c-2, and may have shapes corresponding to those of the first and second coil units 120-1 and 120-2.

In order to hold the first and second coil units 120-1 and 120-2, each of the second side portions 110c-1 and 110c-2 may be provided on the outer surface thereof with at least one protrusion.

For example, the bobbin 110 may include protrusions 5a, 5b and 5c. For example, the protrusions 5a, 5b and 5c may project in directions perpendicular to the optical-axis direction OA and perpendicular to the outer surfaces of the second side portions 110c-1 and 110c-2.

For example, the protrusions 5a, 5b and 5c of the bobbin 110 may be formed in the seating grooves 105 or on the bottoms of the seating grooves 105.

For example, the outer surface of each of the second side portions 110c-1 and 110c-2 of the bobbin 110 may be provided with a first protrusion 5a, a second protrusion 5b and a third protrusion 5c, disposed between the first protrusion 5a and the second protrusion 5b. For example, although the projecting length of each of the first and second protrusions 5a and 5b may be greater than the projecting length of the third protrusion 5c, the disclosure is not limited thereto. In another embodiment, the projecting length of each of the first and second protrusions 5a and 5b may be equal to or less than the projecting length of the third protrusion 5c.

The first coil unit 120-1 may be configured to have a closed curve shape or a ring shape, which surrounds the protrusions 5a, 5b and 5c provided at the second side portion 110c-1 of the bobbin 110, and the second coil unit 120-2 may be configured to have a closed curve shape or a ring shape, which surrounds the protrusions 5a, 5b and 5c provided at the second side portion 110c-2 of the bobbin 110.

Although the protrusions 5a, 5b and 5c may be bobbin protrusions, which are intended to allow the first and second coil units 120-1 and 120-2 to be directly wound therearound, the disclosure is not limited thereto. The protrusions 5a, 5b and 5c may be mounting protrusions (or coupling protrusions), which are intended to allow the first and second coil units to be mounted or coupled thereto.

In another embodiment, the bobbin 110 may not include the protrusions 5a, 5b and 5c provided in the seating groove 105.

In order to suppress separation of the first and second coil units 120-1 and 120-2 and to guide the two ends of each of the first and second coil units 120-1 and 120-2 when the first and second coil units 120-1 and 120-2 are connected to the lower elastic units 160a and 106b, the lower surface, the lower portion or the lower end of each of the second side portions 110c-1 and 110c-2 of the bobbin 110 may have formed therein at least one of guide grooves 16a and 16b.

The bobbin 110 may include a projection 115b projecting from the outer surface of the first side portion 110b-1 thereof. The projection 115b may be positioned adjacent to the second side portion 110c-3 of the bobbin 110.

The projection 115b may be positioned closer to the second side portion 110c-4 of the bobbin 110 at which the first and second coil units 120-1 and 120-2 are not disposed than to the second side portion 110c-1 of the bobbin 110, at which the first coil unit 120-1 is disposed.

The projection 115b of the bobbin 110 may include a seating groove 180a in which the sensing magnet 180 is seated, inserted, secured or disposed.

The seating groove 180a in the bobbin 110 may be depressed from the upper surface of the projection 115b of the bobbin 110, and an opening may be formed in the upper surface, the lower surface or the outer surface of the projection 115b.

For example, the seating groove 180a may have a first opening formed in the upper surface of the projection 115b of the bobbin 110 and a second opening formed in the outer surface of the projection 115b of the bobbin 110.

The seating groove 180a of the bobbin 110 may have a shape that corresponds to or coincides with that of the sensing magnet 180.

In another embodiment, the first side portion 110b-3 of the bobbin 110 may have a seating groove in which a balancing magnet is seated.

By providing the seating groove 180a in the projection 115b of the bobbin 110, it is possible to reduce the distance between the sensing magnet 180 and the position sensor 170, and thus it is possible to increase the output and the sensitivity of the position sensor 170.

Next, the coil 120 will be described.

The coil 120 may include the first coil unit 120-1 disposed on the second side portion 110c-1 of the bobbin 110 and the second coil unit 120-2 disposed on the second side portion 110c-2 of the bobbin 110.

The first coil unit 120-1 may be disposed on the second side portion 110c-1 of the bobbin 110 so as to correspond to or face the first magnet 130-1, and the second coil unit 120-2 may be disposed on the second side portion 110c-2 of the bobbin 110 so as to correspond to or face the second magnet 130-2.

The first coil unit 120-1 and the second coil unit 120-2 may be AF operation coils configured to move the bobbin 110 in the optical-axis direction by electromagnetic interaction between the first and second magnets 130-1 and 130-2.

The first coil unit 120-1 may be disposed on the second side portion 110c-1 of the bobbin 110 so as to have a closed loop shape, and the second coil unit 120-2 may be disposed on the second side portion 110c-2 of the bobbin 110 so as to have a closed loop shape.

Although each of the first and second coil units 120-1 and 120-2 may be directly wound around the protrusions 5a, 5b and 5c of the second side portions 110c-1 and 110c-2 of the bobbin 110, the disclosure is not limited thereto. In another embodiment, each of the first and second coil units 120-1 and 120-2 may be coupled to the protrusions 5a, 5b and 5c of the bobbin 110 via a coil block having a coil ring or angled ring shape.

For example, each of the first and second coil units 120-1, 120-2 may be configured to have a ring shape, which is wound clockwise or counterclockwise about an axis perpendicular to the outer surface of each of the second side portions 110c-1 and 110c-2 of the bobbin 110.

The first coil unit 120-1 and the second coil unit 120-2 may be conductively connected to each other in series. For example, the first coil unit 120-1 and the second coil unit 120-2 may be conductively connected to each other in series via a third lower elastic unit 160c.

In order to create an electromagnetic force as a result of the interaction between the first and second magnets 130-1 and 130-2, electric power or a drive signal may be supplied to the coil 120. The power or the drive signal supplied to the coil 120 may be a DC signal, an AC signal or a signal containing both DC and AC components, and may be of a voltage type or a current type.

When a drive signal (for example, a drive current) is supplied to the first and second coil units 120-1 and 120-2, an electromagnetic force may be created by the electromagnetic interaction between the first and second coil units 120-1 and 120-2 and the first and second magnets 130-1 and 130-2, and the bobbin 110 may be moved in the optical-axis direction OA by the created electromagnetic force.

In this embodiment, the bobbin 110 may be moved upwards or downwards from the initial position of the AF operation unit, which is referred to as bidirectional driving of the AF operation unit.

For example, the upward stroke of the lens moving apparatus according to the embodiment from the initial position of the AF operation unit may be higher than the downward stroke of the lens moving apparatus from the initial position of the AF operation unit. For example, based on the initial position of the AF operation unit, the upward stroke of the lens moving apparatus according to the embodiment may be 160 μm~260 μm, and the downward stroke of the lens moving apparatus may be 75 μm~175 μm.

In another embodiment, the bobbin 110 may be moved upwards from the initial position of the AF operation unit, which is referred to as unidirectional driving of the AF operation unit.

At the initial position of the AF operation unit, the first coil unit 120-1 and the first magnet 130-1 may correspond to, face or overlap each other and the second coil unit 120-2 and the second magnet 130-2 may correspond to, face or overlap each other in a direction parallel to a line that is perpendicular to the optical axis OA and extends along the optical axis.

For example, the AF operation unit may include the bobbin 110 and the components (for example, the coil 120 and the sensing magnet 180) coupled to the bobbin 110.

The initial position of the AF operation unit (for example, the bobbin 110) may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the AF operation unit may be the position at which the AF operation unit is located when gravity acts in the direction from the bobbin 110 to the base 210 or when gravity acts in the direction from the base 210 to the bobbin 110.

By controlling the intensity and/or polarity (for example, the direction in which current flows) of a drive signal applied to the first and second coil units 120-1 and 120-2 and thus controlling the intensity and/or direction of the electromagnetic force resulting from the interaction between the first and second coil units 120-1 and 120-2 and the first and second magnets 130-1 and 130-2, it is possible to control the movement of the AF operation unit and it is thus possible to perform an auto-focusing function.

Next, the sensing magnet 180 will be described.

The sensing magnet 180 may be disposed on the bobbin 110 so as to face the position sensor 170, and may provide a magnetic field for detecting the position sensor 170.

For example, the sensing magnet 180 may be disposed on the first side portion 110b-1 of the bobbin 110 adjacent to the second side portion 110b-3 of the bobbin 110.

For example, in order to reduce magnetic field interference with the first magnet 130-1, the sensing magnet 180 may be disposed closer to the second side portion 110c-3 of the bobbin 110 than to the second side portion 110c-1 of the bobbin 110.

The sensing magnet 180 may be disposed in the seating groove 180a in the bobbin 110 so as to face the position sensor 170.

Although the sensing magnet 180, which faces the position sensor 170, may be exposed at a portion of one surface thereof from the seating groove 180a, the disclosure is not limited thereto. In another embodiment, the sensing magnet 180, which faces the position sensor 170, may not be exposed at a portion of one surface thereof from the seating groove 180a.

Figure 4:
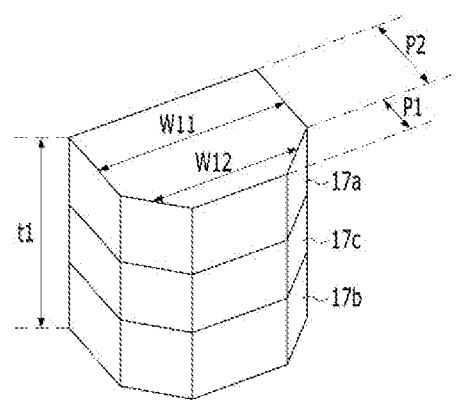
FIG. 4 is an enlarged view of the sensing magnet shown in FIG. 1.

FIG. 4 is an enlarged view of the sensing magnet 180 shown in FIG. 1.

Referring to FIG. 4, the sensing magnet 180 disposed on the bobbin 110 may be configured such that the interface between the N pole and the S pole is parallel to a direction perpendicular to the optical axis OA. For example, although the surfaces of the sensing magnet 180 that face the position sensor 170 may be divided into the N pole and the S pole, the disclosure is not limited thereto. In another embodiment, the interface between the N pole and the S pole of the sensing magnet 180 disposed on the bobbin 110 may be parallel to the optical axis OA.

Although the sensing magnet 180 may be a monopolar magnetized magnet, which has a single N pole and a single S pole, the disclosure is not limited thereto.

In another embodiment, the sensing magnet 180 may be a bipolar magnetized magnet, which has two N poles and two S poles, or a tetrapolar magnetized magnet.

For example, the sensing magnet 180 may include a first magnet part 17a, a second magnet part 17b and a partition wall 17c disposed between the first magnet part 17a and the second magnet part 17b. The partition wall 17c may also be interchangeably referred to as "nonmagnetic partition wall".

The first magnet part 17a may include an N pole, an S pole and a first interface portion between the N pole and the S pole. The first interface portion may be a portion that has substantially no magnetism and has a zone having almost no polarity, and may be a portion which is naturally formed in order to form a magnet composed of one N pole and one S pole.

The second magnet part 17b may include an N pole, an S pole and a second interface portion between the N pole and the S pole. The second interface portion may be a portion that has substantially no magnetism and has a zone having almost no polarity, and may be a portion that is naturally formed in order to form a magnet composed of one N pole and one S pole.

The partition wall 17c may separate or isolate the first magnet part 17a and the second magnet part 17b from each other, and may be a portion having substantially no magnetism or polarity. For example, the partition wall may be a nonmagnetic material, air or the like. The nonmagnetic partition wall may be considered a "neutral zone".

The partition wall 17c may be a portion that is artificially formed when the first magnet part 17a and the second magnet part 17b are magnetized, and the width of the partition wall 17c may be larger than the width of the first interface portion (or the width of the second interface portion). Here, the width of the partition wall 17c may be the length of the partition wall 17c in a direction toward the second magnet part 17b from the first magnet part 17a. The width of the first interface portion (or the second interface portion) may be the length of each of the first and second magnet parts 17a and 17b toward the S pole from the N pole.

The length t1 of the sensing magnet 180 disposed on the bobbin 110 in the optical-axis direction may be greater than the length of the sensing magnet 180 in a direction perpendicular to the optical axis. The reason for this is to prevent an increase in the size of the bobbin in a direction perpendicular to the optical axis due to mounting of the sensing magnet and to prevent a decrease in the intensity of the magnetic field of the sensing magnet.

At least a portion of the sensing magnet 180 may decrease in width in a direction toward a first side portion 141-1 of the housing 140 from the first side portion 110b-1 of the bobbin 110.

For example, the sensing magnet 180 may include a first portion P1, including a first surface that faces the position sensor 170, and a second portion P2, including a second surface opposite the first surface.

For example, the first portion P1 of the sensing magnet 180 may be positioned between the position sensor 170 and the second portion P2 of the sensing magnet 180.

For example, the width W12 of the first portion P1 of the sensing magnet 180 may decrease in a direction toward the first side portion 141-1 of the housing 140 from the first side portion 110b-1 of the bobbin 110. For example, although the width W11 of the second portion P2 of the sensing magnet 180 may be uniform, the disclosure is not limited thereto. In another embodiment, the width W11 of the second portion P2 of the sensing magnet 180 may decrease in a direction toward the first side portion 141-1 of the housing 140 from the first side portion 110b-1 of the bobbin 110.

In a further embodiment, the width W11 of the second portion P2 of the sensing magnet 180 may decrease while the width of the first portion P1 of the sensing magnet 180 may be uniform in a direction toward the first side portion 141-1 of the housing 140 from the first side portion 110b-1 of the bobbin 110.

Here, the width of the sensing magnet 180 may be the length of the sensing magnet 180 in a direction perpendicular to the direction toward the second surface from the first surface of the sensing magnet 180. Alternatively, the width of the sensing magnet 180 may be the crosswise length of the sensing magnet 180 disposed on the bobbin 110.

The seating groove 180a formed in the bobbin 110 may have a shape corresponding to the shape of the sensing magnet 180, which is shown in FIG. 4. Since the sensing magnet 180 has a structure, a portion of which decreases in width, it is possible to prevent separation or withdrawal of the sensing magnet 180 from the seating groove 105. Furthermore, since the sensing magnet 180 has the shape shown in FIG. 4, it is possible to reduce the effect caused by the magnetic field interference with the first and second magnets 130-1 and 130-2 and it is thus possible to improve the accuracy of AF operation.

The sensing magnet 180 may be moved together with the bobbin 110 in the optical-axis direction, and the position sensor 170 may detect the intensity or magnetic force of the magnetic field of the sensing magnet 180, which is moved in the optical-axis direction, and may output an output signal corresponding to the result of the detection.

For example, in accordance with displacement of the bobbin 110 in the optical-axis direction, the intensity or magnetic force of the magnetic field detected by the position sensor 170 may vary. Consequently, the position sensor 170 may output an output signal proportional to the detected intensity of the magnetic field, and the displacement of the bobbin 110 in the optical-axis direction may be detected using the output signal from the position sensor 170.

In order to counteract the effect caused by the magnetic field interference of the sensing magnet 180 with the first and second magnets 130-1 and 130-2 and to establish the weight equilibrium with the sensing magnet 180, the lens moving apparatus 100 according to the embodiment may further include a balancing magnet disposed on the first side portion of the bobbin 110.

The structure, the shape and the like of the above-described sensing magnet 180 may also be applied to the balancing magnet.

Next, the housing 140 will be described.

The housing 140 accommodates therein the bobbin 110, and supports the first magnet 130-1, the second magnet 130-2, the position sensor 170, and the circuit board 190.

Figure 5A:
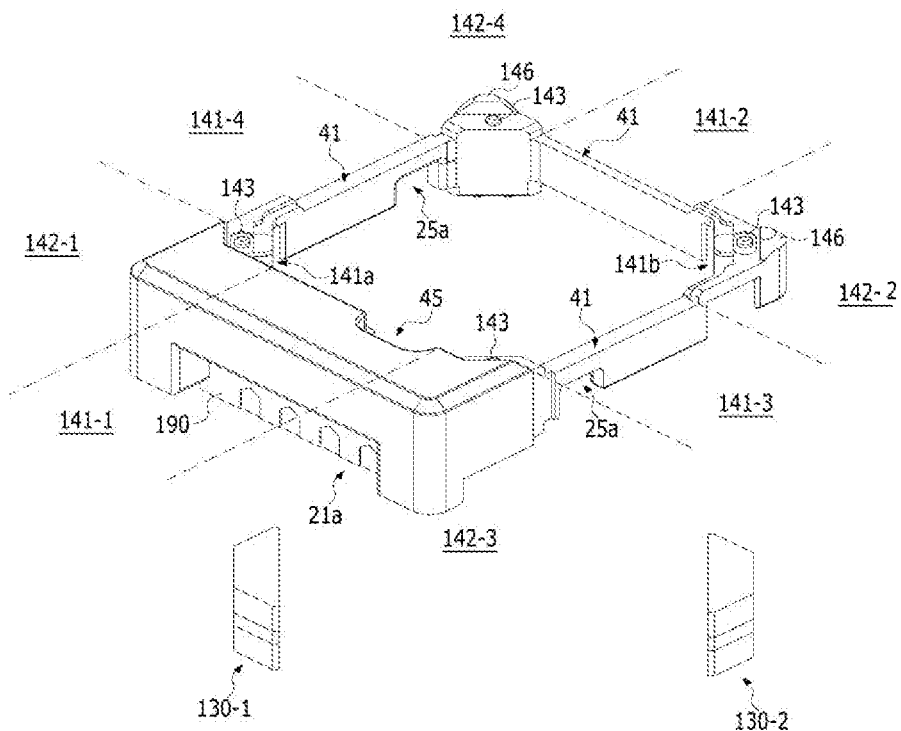
FIG. 5A is a perspective view of a housing.
Figure 5B:
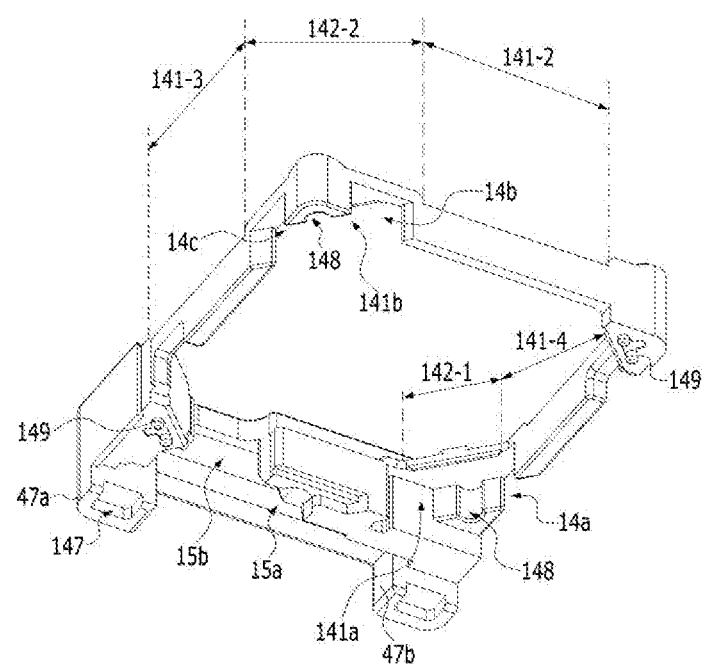
FIG. 5B is a perspective view of the housing and first and second magnets.
Figure 5C:
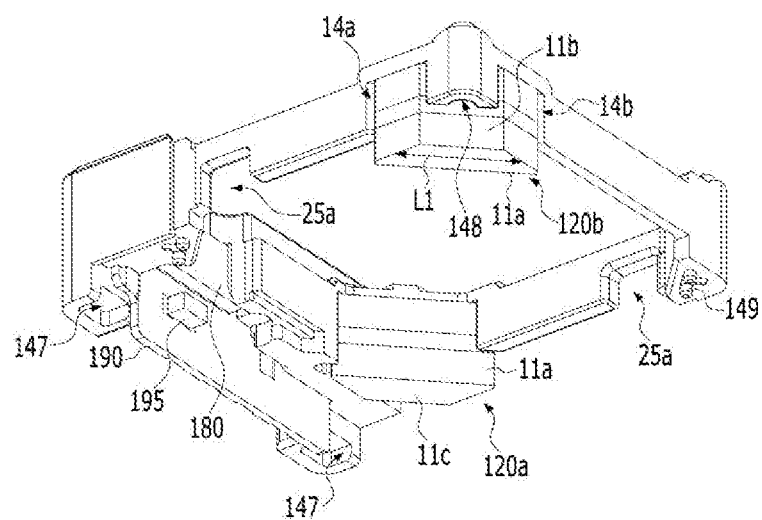
FIG. 5C is a perspective view of the housing, the first and second magnets, the position sensor, the circuit board, and the capacitor.

FIG. 5A is a perspective view of the housing 140. FIG. 5B is a perspective view illustrating the housing 140 and the first and second magnets 130-1 and 130-2. FIG. 5C is a perspective view of the housing 140, the first and second magnets 130-1 and 130-2, the position sensor 170, the circuit board 190, and the capacitor 195.

Referring to FIGS. 5A and 5B, the housing 140 may be configured to have a hollow column overall. For example, the housing 140 may have a polygonal (for example, a rectangular or octagonal) or circular bore, and the bore in the housing 140 may be a through hole, which is formed through the housing 140 in the optical-axis direction.

The housing 140 may include a plurality of side portions (or side walls) 141-1 to 141-4 and a plurality of corner portions 142-1 to 142-4.

For example, the housing may include first to fourth side portions 141-1 to 141-4, which are spaced apart from each other, and first to fourth corner portions 142-1 to 142-4, which are spaced apart from each other.

Each of the corner portions 142-1 to 142-4 of the housing 140 may be disposed or positioned between two adjacent side portions among the side portions 141-1 to 141-4 so as to connect the side portions to each other.

For example, the first and second corner portions 142-1 and 142-2 of the housing 140 may face each other, and the third corner portion 142-3 of the housing 140 may be adjacent to the first corner portion 142-1 of the housing 140, and may face the fourth corner portion 142-4.

For example, the corner portions 142-1 to 142-4 may be positioned at the corners of the housing 140, or may include the corner of the housing 140.

For example, although the number of side portions of the housing 140 is four and the number of corner portions is four, the disclosure is not limited thereto. The number of side portions or corner portions may be five or more.

Each of the side portions 141-1 to 141-4 of the housing 140 may be disposed parallel to a corresponding one of side plates of the cover member 300.

For example, the side portions 141-1 to 141-4 of the housing 140 may respectively correspond to the first side portions 110b-1 to 110b-4 of the bobbin 110, and the corner portions 142-1 to 142-4 of the housing 140 may respectively correspond to or face the second side portions 110c-1 to 110c-4 of the bobbin 110.

Among the corner portions 142-1 to 142-4 of the housing 140, two corner portions 141-1 and 141-2, which face each other, may have seating portions or reception portions 141a and 141b, respectively, for receiving the first and second magnets 130-1 and 130-2.

The seating portions 141a and 141b in the housing 140 may be respectively provided in the lower portions or lower ends of the two corner portions 142-1 and 142-2 of the housing 140, which face each other.

For example, the seating portion 141a in the housing 140 may be provided in the lower portion or the lower end of the first corner portion 142-1, and the seating portion 141b in the housing 140 may be provided in the lower portion or the lower end of the second corner portion 142-2 of the housing 140.

Although each of the seating portions 141a and 141b in the housing 140 may have a groove, for example, a recessed groove having a shape corresponding to a corresponding one of the first and second magnets 130-1 and 130-2, the disclosure is not limited thereto.

The seating portions 141a and 141b in the housing 140 may have openings (for example, 14a, 14b, 14c) formed in side portions (for example, 141-2, 141-3 and/or 141-4) of the housing 140 adjacent to the first and second corner portions 141-1 and 141-2 of the housing 140.

For example, the seating portion 141a in the housing 140 may have the opening 14a formed in the fourth side portion 141-4 of the housing 140 adjacent to the first corner portion 141-1 of the housing 140.

Although the seating portion 141a in the housing 140 has one opening formed in one side portion of the housing 140 in FIG. 5B, the disclosure is not limited thereto. In another embodiment, the seating portion 141a in the housing 140 may have two openings formed in two side portions of the housing adjacent to the first corner portion 141-1.

For example, the seating portion 141b in the housing 140 may have the opening 14b formed in the side portion 141-2 of the housing 140 adjacent to the second corner portion 141-2 of the housing 140 and the opening 14c formed in the side portion 141-3 of the housing 140 adjacent to the second corner portion 141-2 of the housing 140.

For example, one side surface of the first magnet 130-1 may be exposed through the opening 14a in the seating portion 141a at the outer surface of the fourth side portion 141-4 of the housing 140, and the other side surface of the first magnet 130-1 may be supported by a support surface of a support wall of the seating portion 141a.

For example, one side surface of the second magnet 130-2 may be exposed through the opening 14b in the seating portion 141b at the outer surface of the second side portion 141-2 of the housing 140, and the other side surface of the second magnet 130-2 may be exposed through the opening 14c in the seating portion 141b at the outer surface of the third side portion 141-3 of the housing 140.

Specifically, for the first magnet 130-1, the seating portion 141a in the first corner portion of the housing 140 may be provided only at one side thereof with the support wall or the support surface, and may be provided at the other side thereof with the support wall of the housing 140 or the side plate (or the wall) of the cover member 300.

Meanwhile, for the second magnet 130-2, the seating portion 141b in the second corner portion of the housing 140 may be provided at both sides thereof with the side plates (or walls) of the cover member 300 but no support wall or support surface of the housing 140.

Since the openings 14a, 14b and 14c of the seating portions 141a and 141b in the housing 140 enable the corner portions of the first and second magnets 130-1 and 130-2 to be supported by the side portions 141-1 to 141-3 of the housing in which the openings 14a, 14b and 14c are formed, it is possible to stably support the first and second magnets 130-1 and 130-2 using the seating portions 141 and 141b.

For example, each of the side surfaces of the seating portions 141a and 141b in the housing 140, which respectively face the first and second coil units 120-1 and 120-2, may have an opening therein, and a first surface 11a of each of the first and second magnets 130-1 and 130-2, which are respectively disposed in the seating portions 141a and 141b, may be exposed through the opening formed in each of the side surfaces of the seating portions 141a and 141b. In another embodiment, the side surface of each of the seating portions 141a and 141b may not have the opening therein.

For example, each of the lower surfaces of the seating portions 141a and 141b in the housing 140, which face the upper surface of the base 210, may have an opening therein, and each of the lower surfaces 11c of the first and second magnets 130-1 and 130-2, which are respectively disposed in the seating portions 141a and 141b, may be exposed through the opening formed in each of the lower surfaces of the seating portions 141a and 141b. Consequently, it is possible to easily mount the first and second magnets 130-1 and 130-2 in the seating portions 141a and 141b through the openings formed in the lower surfaces of the seating portions 141a and 141b in the housing 140.

In order to avoid spatial interference between the housing 140 and the first frame connector 153 of the upper elastic member 150, one or more (for example, 141-2 and 141-3 among the side portions 141-1 to 141-4 of the housing 140 may have escape grooves 41 therein. The escape grooves 41 in the housing 140 may be depressed from the upper surface of the housing 140.

The side portions of the housing 140 may have a grooved portion or a groove 25a corresponding to the projections 115a of the bobbin 110.

For example, the grooves 25a in the housing 140 may be formed in the lower portions, the lower ends or the lower surfaces of the side portions 141-3 and 141-4 of the housing 140.

For example, each of the grooves 25a in the housing 140 may have openings formed in both inner and outer surfaces of each of the side portions 141-3 and 141-4.

The groove 25a formed in the side portion 141-3 of the housing 140 may be adjacent to the corner portion 142-3 of the housing 140, and the groove 25a formed in the side portion 141-4 of the housing 140 may be adjacent to the corner portion 142-4 of the housing 140.

Since the projections 115a are disposed in the grooves in the housing 140, it is possible to prevent movement or rotation of the bobbin 110 when a thread is formed in the inner circumferential surface of the bobbin 110.

The first magnet 130-1 may be secured in the seating portion 141a using an adhesive such as epoxy, and the second magnet 130-2 may be secured in the seating portion 141b using an adhesive.

Each of the first and second corner portions 142-1 and 142-2 in the housing 140 may have a hole 148 through which an adhesive is injected and which prevents from the injected adhesive from overflowing.

The holes 148 in the housing 140 may be depressed from the lower surface of the first and second corner portions 142-1 and 142-2. For example, each of the holes 148 in the housing may be formed in one side surface of a corresponding one of the seating portions 141a and 141b in the housing 140.

For example, each of the holes 148 in the housing 140 may be formed in one side surface of a corresponding one of the seating portions 141a and 141b in the housing 140, which respectively face second surfaces 11b of the first and second magnets 130-1 and 130-2.

For example, each of the holes 148 may have an opening formed in a corresponding one of the seating portions 141a and 141b such that the hole 148 is connected to or communicates with the corresponding one of the seating portions 141a and 141b.

Although each of the holes 148 may be configured to have a semicircular section or a semi-elliptical section, the disclosure is not limited thereto. The hole 148 may be configured to have various shapes.

In order to prevent the upper surface of the housing 140 from directly colliding with the inner surface of the upper plate of the cover member 300, the upper portion, the upper end or the upper surface of the housing 140 may be provided with stoppers 146.

The stoppers 146 of the housing 140 may be disposed on at least one of the side portions 141-1 to 141-4 of the housing 140 and/or at least one of corner portions 142-1 to 142-4 of the housing 140.

For example, the stoppers 146 may be disposed on the upper portion, the upper end or the upper surface of the corner portions 142-1 to 142-4 of the housing 140 and the first side portion 141-1 of the housing 140.

Furthermore, in order to prevent the lower surface of the housing 140 from colliding with the base 210, the housing 140 may include a stopper (not shown) projecting from the lower surface thereof.

The housing 140 have a first mounting groove 15a (or a groove or a seating groove) configured to receive the circuit board 190, and a second mounting groove 15b (or a groove or a seating groove) configured to receive the position sensor 170.

The first mounting groove 15a in the housing 140 may be formed in one (for example, 141-1) of the side portions of the housing 140. For example, the first mounting groove 15a in the housing 140 may be formed in the first side portion 141-1 of the housing 140, in the first corner portion 142-1, and in the third corner portion 142-3, which are adjacent to the first side portion 141-1.

In order to facilitate mounting of the circuit board 190, the first mounting groove 15a in the housing 140 may be a groove, which is depressed from the lower surface of the first side portion 141-1 of the housing 140, and may have a shape corresponding to or coinciding with the shape of the circuit board 190.

The second mounting groove 15b in the housing 140 may be formed in the inner surface of the first side portion 141-1 of the housing 140, and may have an opening communicating with the inside of the housing 140. The second mounting groove 15b in the housing 140 may be connected to or communicate with the first mounting groove 15a.

In order to facilitate mounting of the position sensor 170, the second mounting groove 15b in the housing 140 may have a shape depressed from the lower surface of the first side portion of the housing 140, and may be open at the lower portion thereof. Furthermore, in order to improve the sensitivity of the position sensor 170, the second mounting groove 15b in the housing 140 may have an opening, which is formed in the inner surface of the first side portion 141-1 of the housing 140. The second mounting groove 15b in the housing 140 may have a shape corresponding to or coinciding with the shape of the position sensor 170.

For example, the circuit board 190 may be secured in the first mounting groove 15a in the housing 140 using an adhesive member. Although the adhesive member may be epoxy or double-sided adhesive tape, the disclosure is not limited thereto.

The first side portion 141-1 of the housing 140 may have formed therein an escape groove 45 in order to avoid spatial interference with the projection 115b of the bobbin 110.

The escape groove 45 in the housing 140 may be connected to or communicate with the second mounting groove 15b in the housing 140. For example, at least a portion of the sensing magnet 180 is disposed in the escape groove 45 in the housing 140, and at least a portion of the position sensor 170 may be exposed through the escape groove 45 in the housing 140.

The upper portion, the upper end or the upper surface of the housing 140 may be provided with at least one coupler 143, which is coupled to the first outer frame 152 of the upper elastic member 150. The first coupler 143 of the housing 140 may be disposed on at least one of the side portions 141-1 to 141-4 and the corner portions 142-1 to 142-4 of the housing 140.

For example, the first coupler 140 may be disposed on the upper portion, the upper end or the upper surface of the first to fourth corner portions 142-1 to 142-4 of the housing 140.

The lower portion, the lower end or the lower surface of the housing 140 may be provided with a second coupler 149, which is coupled or secured to the second outer frame 162 of the lower elastic member 160.

For example, the second coupler 149 may be disposed on the lower portion, the lower end or the lower surface of each of the third corner portion 142-3 and the fourth corner portion 142-4 of the housing 140.

Although each of the first and second couplers 143 and 149 of the housing 140 may have a protrusion shape, the disclosure is not limited thereto. In another embodiment, the coupler may have a groove or flat surface shape.

For example, the first coupler 143 of the housing 140 may be coupled to the hole 152a in the first outer frame 152 of the upper elastic member 150 using an adhesive member (for example, solder) or heat fusion, and the second coupler 149 of the housing 140 may be coupled to the hole 162a in the second outer frame 162 of the lower elastic member 160 using an adhesive member (for example, solder) or heat fusion.

The lower portion, the lower end or the lower surface of each of the first corner portion 142-1 and the third corner portion 142-3 of the housing 140 may have therein a groove or a coupling groove 147, which is intended to be coupled to a projection 51 of the base 210.

Each of the first corner portion 142-1 and the third corner portion 142-3 of the housing 140 may include projections 47a and 47b, which project lower than the lower surfaces of the side portions 141-1 to 141-4 of the housing 140.

For example, the lower surfaces of the projections 47a and 47b may be lower than the lower surfaces 11c of the first and second magnets 130-1 and 130-2.

Furthermore, the lower surface of the projection 47a of the housing 140 may be lower than the lower surface of each of the second corner portion 142-2 and the fourth corner portion 142-4 of the housing 140.

For example, the grooves 147 in the housing 140 may be formed in the lower surfaces of the projection 47a and 47b of the housing 140.

Next, the first and second magnets 130-1 and 130-2 will be described.

The first magnet 130-1 may be disposed on the first corner portion or the first corner 142-1 of the housing 140, and the second magnet 130-2 may be disposed on the second corner portion or the second corner 142-2 of the housing 140.

At the initial position of the AF operation unit (for example, the bobbin 110), the first magnet 130-1 may be disposed such that at least a portion thereof overlaps the first coil unit 120-1 in a direction that is perpendicular to the optical axis OA and parallel to a line that extends toward the first corner portion 142-1 of the housing 140 from the optical axis OA.

At the initial position of the AF operation unit (for example, the bobbin 110), the second magnet 130-2 may be disposed such that at least a portion thereof overlaps the second coil unit 120-2 in a direction that is perpendicular to the optical axis OA and parallel to a line that extends toward the second corner portion 142-2 of the housing 140 from the optical axis OA.

For example, the first and second magnets 130-1 and 130-2 may be respectively inserted or disposed in the seating portions 141a and 141b in the housing 140.

Each of the first and second magnets 130-1 and 130-2 may have a polygonal shape, which is easy to seat in the first and second corner portions 142-1 and 142-2.

For example, the first surface 11a of each of the first and second magnets 130-1 and 130-2 may have an area larger than the area of the second surface 11b of each of the first and second magnets 130-1 and 130-2.

In order to improve linearity in displacement of the bobbin 110 due to electromagnetic force, the crosswise length L1 of the first surface 11a of each of the magnets 130-1 and 130-2 may be greater than the crosswise length of each of the coil units 120-1 and 120-2, without being limited thereto. In another embodiment, the crosswise length L1 of the first surface 11a of each of the magnets 130-1 and 130-2 may be equal to or less than the crosswise length of each of the coil units 120-1 and 120-2.

The first surface 11a of each of the first and second magnets 130-1 and 130-2 may be the surface that faces each of the first and second coil units 120-1 and 120-2 (or the outer surface of the bobbin 110), and the second surface 11b may be the surface opposite the first surface 11a.

For example, the crosswise length of the second surface 11b of each of the first and second magnets 130-1 and 130-2 may be less than the crosswise length of the first surface 11a of each of the first and second magnets 130-1 and 130-2.

For example, the crosswise direction of the first surface 11a of each of the first and second magnets 130-1 and 130-2 may be a direction perpendicular to a direction toward the upper surface from the lower surface of each of the first and second magnets 130-1, 130-2 along the first surface 11a or a direction perpendicular to the optical axis along the first surface 11a of each of the first and second magnets 130-1 and 130-2.

For example, the crosswise direction of the second surface 11b of each of the first and second magnets 130-1 and 130-2 may be direction perpendicular to a direction toward the upper surface from the lower surface of each of the first and second magnets 130-1 and 130-2 along the second surface 11b or a direction perpendicular to the optical axis along the second surface 11b of each of the first and second magnets 130-1 and 130-2.

Each of the first and second magnets 130-1 and 130-2 may include a portion, the crosswise length L1 of which gradually decreases moving toward each of the corner portions 142-1 and 142-2 of the housing 140 from the center of the bore in the housing 140.

For example, each of the first and second magnets 130-1 and 130-2 may include a portion, in which the crosswise length L1 of each of the first and second magnets 130-1 and 130-2 decreases in a direction toward the second surface 11b from the first surface 11a of each of the first and second magnets 130-1 and 130-2. For example, the crosswise direction of each of the first and second magnets 130-1 and 130-2 may be a direction parallel to the first surface 11a of each of the first and second magnets 130-1 and 130-2.

Each of the first and second magnets 130-1 and 130-2 may be a bipolar magnetized magnet including two N poles and two S poles, or may be a tetrapolar magnetized magnet. Each of the first and second magnets 130-1 and 130-2 may include a first magnet part, a second magnet part and a partition wall disposed between the first magnet part and the second magnet part. Here, the partition wall may also be interchangeably referred to as "nonmagnetic partition wall".

Although the lens moving apparatus according to the embodiment includes two magnets 130-1 and 130-2 in order to reduce the size thereof, by embodying the first and second magnets 130-1 and 130-2 by bipolar magnetized magnets, it is possible to increase the electromagnetic force between the magnets and the first and second coil units 120-1 and 120-2 to thus ensure sufficient electromagnetic force for AF operation.

In another embodiment, each of the first and second magnets 130-1 and 130-2 may be a monopolar magnetized magnet including one N pole and one S pole. Although the magnet may be disposed such that the first surface 11a thereof that faces the first coil unit 120-1 is the S pole and the second surface 11b thereof is the N pole, the disclosure is not limited thereto. In another embodiment, each of the first and second magnets 130-1 and 130-2 may be disposed such that the first surface 11a thereof is the N pole and the second surface 11b thereof is the S pole.

Although the horizontal surface of each of the first and second magnets 130-1 and 130-2 may have a polygonal shape, such as a triangular, pentagonal, hexagonal or rhombus shape, the disclosure is not limited thereto.

Referring to FIG. 5C, the lower surface of each of the first and second magnets 130-1 and 130-2 disposed in the seating portions 141a and 141b in the housing 140 may be positioned lower than the lower surface, the lower portion or the lower end (or the end) of the housing 140.

For example, the lower surface of each of the first and second magnets 130-1 and 130-2 disposed in the seating portions 141a and 141b in the housing 140 may be positioned lower than the lower surface, the lower portion or the lower end (or the end) of each of the first and second corner portions of the housing 140.

In other words, the first and second magnets 130-1 and 130-2 disposed in the seating portions 141a and 141b in the housing 140 may project or extend downwards further than the lower surface, the lower portion or the lower end (or the end) of the housing 140.

Next, the circuit board 190 and the position sensor 170 will be described.

The circuit board 190 may be disposed on one side portion (for example, the first side portion 141-1) of the housing 140, and the position sensor 170 may be disposed or mounted on the circuit board 190.

For example, the circuit board 190 may be disposed on the first side portion 141-1, and the first corner portion 142-1 and the third corner portions 142-3, which are adjacent to the first side portion 141-1. For example, the circuit board 190 may be disposed in the first mounting groove 15a in the housing 140.

For example, the circuit board 190 may be disposed between the first corner portion 142-1 and the third corner portion 142-3 of the housing 140, and first to sixth terminals 90-1 to 90-6 may be conductively connected to the position sensor 170.

Figure 6A:
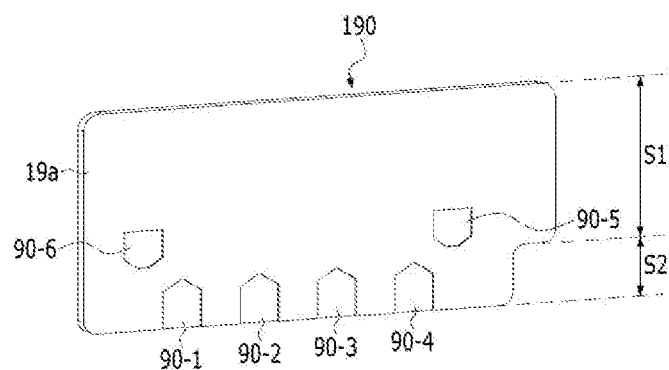
FIG. 6A is a perspective view of the circuit board.
Figure 6B:
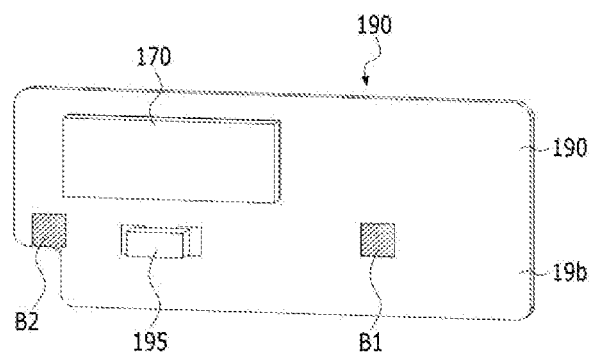
FIG. 6B is a view illustrating the position sensor and the capacitor disposed on the circuit board.
Figure 6C:
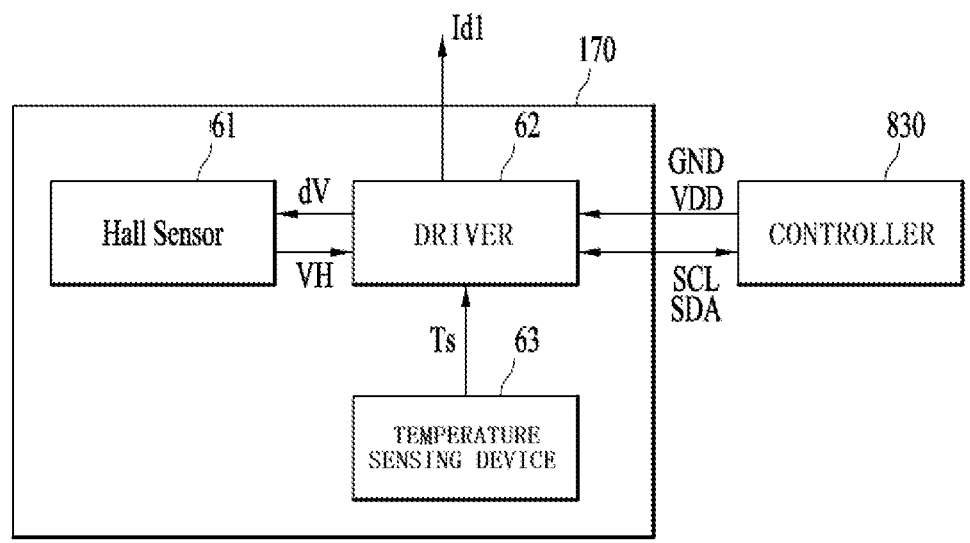
FIG. 6C is a view of an embodiment of the position sensor shown in FIG. 6B.

FIG. 6A is a perspective view of the circuit board 190. FIG. 6B is a view illustrating the position sensor 170 and the capacitor 195, which are disposed on the circuit board 190. FIG. 6C is a view of an embodiment of the position sensor 170 shown in FIG. 6B.

Referring to FIGS. 6A to 6C, the circuit board 190 may include terminals (or pads) B1 and B2 for supplying a drive signal to the first and second coil units 120-1 and 120-2 and the terminals 91-1 to 91-6 to be conductively connected to external terminals (or an external device).

The position sensor 170 may be disposed on a first surface 19b of the circuit board 190.

In order to facilitate the conductive connection with the lower elastic member 160, the terminals B1 and B2 of the circuit board 190 may be disposed on the first surface 19b of the circuit board 190.

For example, in order to shorten the path of the conductive connection with the lower elastic member 160, the terminals B1 and B2 of the circuit board 190 may be disposed lower than the position sensor 170, without being limited thereto.

Furthermore, in order to facilitate the conductive connection with external terminals (or an external device), the terminals 90-1 to 90-6 of the circuit board 190 may be disposed on the second surface 19a of the circuit board 190.

Here, the second surface 19a of the circuit board 190 may be a surface opposite the first surface 19b of the circuit board 190. For example, the second surface 19a of the circuit board 190 may be the surface of the circuit board 190 that faces the bobbin 110.

The circuit board 190 may include a circuit pattern or wires (not shown) for conductively connecting the position sensor 190 to the terminals B1, B2, and 90-1 to 90-6 of the circuit board 190.

The circuit board 190 may include a body part S1 and an extension part S2, positioned under the body part S1. The body part S1 may be alternatively referred to an "upper part", and the extension part S2 may be alternatively referred to as a "lower part".

The extension part S2 may extend downwards from the body part S1. For example, the body part S1 may include a portion projecting from the side surface of the extension part S2. For example, although the terminals 90-1 to 90-4 of the circuit board 190 may be arranged in a row at the extension part S2 of the circuit board 190 and the terminals 90-5 and 90-6 may be disposed on the body part S1 of the circuit board 190, the disclosure is not limited thereto.

For example, the circuit board 190 may be a printed circuit board or a flexible printed circuit board (FPCB).

The position sensor 170 may detect the magnetic field or the intensity of the magnetic field of the sensing magnet 180 mounted on the bobbin 110 during movement of the bobbin 110, and may output an output signal corresponding to the result of the detection.

The position sensor 170 may be mounted on the circuit board 190 disposed on the housing 140, and may be secured to the housing 140. For example, the position sensor 170 may be disposed in the second mounting groove 15b in the housing 190.

For example, the position sensor 170 may be disposed closer to the third corner portion 142-3 than to the first corner portion 142-1 of the housing 140, and the third corner portion of the housing 140 may not be provided with the magnets 130-1 and 130-2.

The position sensor 170 may be embodied as a driver including a hall sensor.

For example, the position sensor 170 may include a hall sensor 61 and a driver 62.

For example, the hall sensor 61 may be made of silicone, and the output VH of the hall sensor 61 may increase as the ambient temperature increases. For example, the ambient temperature may be the temperature of the lens moving apparatus, for example, a temperature of the circuit board 190, the temperature of the hall sensor 61 or the temperature of the driver 62.

In another embodiment, the hall sensor 61 may be made of GaAs, and the output VH of the hall sensor 61 may decrease as the ambient temperature increases. In another embodiment, the output of the hall sensor 61 may have a slope of about −0.06%/° C. with respect to an ambient temperature.

The position sensor 170 may further include a temperature-sensing element 63 capable of detecting an ambient temperature. The temperature-sensing element 63 may output a temperature detection signal Ts, corresponding to the result of detection of the ambient temperature, to the driver 62.

For example, the hall sensor 61 of the position sensor 190 may generate the output VH corresponding to the result of detection of the intensity of the magnetic force of the sensing magnet 180. For example, the intensity of the output of the position sensor 190 may be proportional to the intensity of the magnetic force of the sensing magnet 180.

The driver 62 may output a drive signal dV for driving the hall sensor 61 and a drive signal Id1 for driving the first and second coil units 120-1 and 120-2.

For example, the driver 62 may receive a clock signal SCL, a data signal SDA and power signals VDD and GND through data communication using a protocol such as I2C communication.

Here, although the first power signal GND may be a ground voltage or 0V and the second power signal VDD may be a predetermined voltage for driving the driver 62, and may be DC voltage and/or AC voltage, the disclosure is not limited thereto.

The driver 62 may create the drive signal dV, for driving the hall sensor 61 using the clock signal SCL, the data signal SDA and the power signals VDD and GND, and the drive signal Id1, for driving the first and second coil units 120-1 and 120-2.

The position sensor 170 may include the first to fourth terminals for sending and receiving the clock signal SCL, the data signal SDA, the power signals VDD and GND, and the fifth and sixth terminals for providing a drive signal to the first and second coil units 120-1 and 120-2.

Furthermore, the driver 62 may receive the output VH of the hall sensor 61, and may send the clock signal SCL and the data signal SDA pertaining to the output VH of the hall sensor 61 through data communication using a protocol such as I2C communication.

Furthermore, the driver 62 may receive the temperature detection signal Ts as a result of detection by the temperature-sensing element 63, and may send the temperature detection signal Ts to controllers 830 and 780 through the data communication using a protocol such as the I2C communication.

The controllers 830 and 780 may perform temperature compensation for the output VH from the hall sensor 61 based on variation in the ambient temperature detected by the temperature-sensing element 63 of the position sensor 170.

For example, when the drive signal dV or a bias signal of the hall sensor 61 is 1 mA, the output VH of the hall sensor 61 of the position sensor 170 may be −20 mV~+20 mV.

In the case of temperature compensation for the output VH of the hall sensor 61, having a negative gradient with respect to variation in ambient temperature, the output VH of the hall sensor 61 of the position sensor 170 may be 0 mV~+30 mV.

When the output of the hall sensor 61 of the position sensor 170 is plotted on the x-y coordinate system, the reason why the output range of the hall sensor 61 of the position sensor 170 is represented in the first quadrant (for example, 0 mV~+30 mV) is as follows.

Because the output of the hall sensor 61 in the first quadrant of the x-y coordinate system and the output of the hall sensor 61 in the third quadrant of the x-y coordinate system move in opposite directions depending on variation in ambient temperature, the accuracy and reliability of the hall sensor may decrease when both the first and third quadrant are used as AF operation control zones. Accordingly, in order to accurately compensate for variation in ambient temperature, a specific range in the first quadrant may be considered to be the output range of the hall sensor 61 of the position sensor 170.

Each of the first to fourth terminals of the position sensor 170 may be conductively connected to a corresponding one of the terminals 90-1 to 90-4 of the circuit board 190.

The fifth and sixth terminals of the position sensor 170 may be conductively connected to the terminals B1 and B2 of the circuit board 190, respectively. The terminals 90-5 and 90-6 of the circuit board 190 may be test terminals.

The terminals B1 and B2 of the circuit board 190 may be respectively coupled to the lower elastic units 160a and 160b, and the position sensor 170 may be conductively connected to the first and second coil units 120-1 and 120-2 via the lower elastic units 160a and 160b and may provide a drive signal thereto.

For example, the fifth terminal B5 of the circuit board 190 may be coupled to the first lower elastic unit 160a, and the sixth terminal B6 of the circuit board 190 may be coupled to the second lower elastic unit 160b.

Figure 7A:
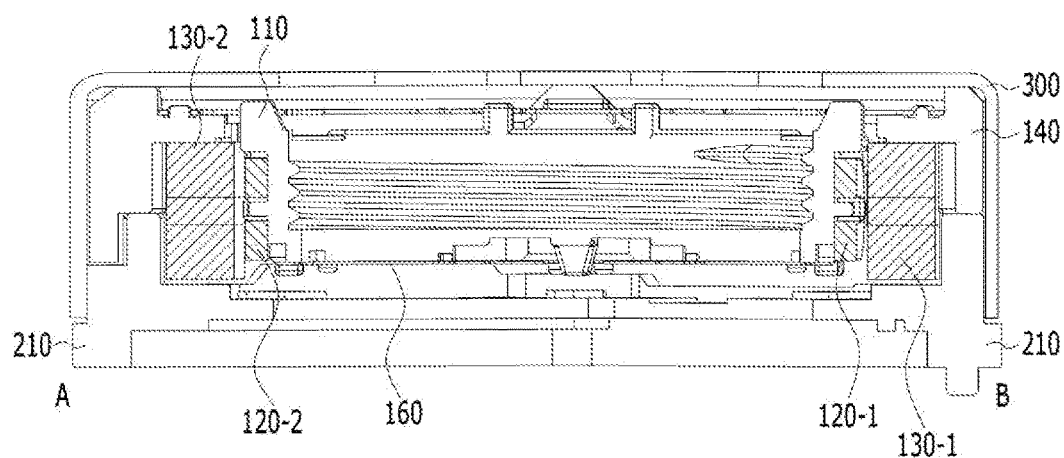
FIG. 7A is a cross-sectional view of the lens moving apparatus, taken along line A-B in FIG. 2.
Figure 7B:
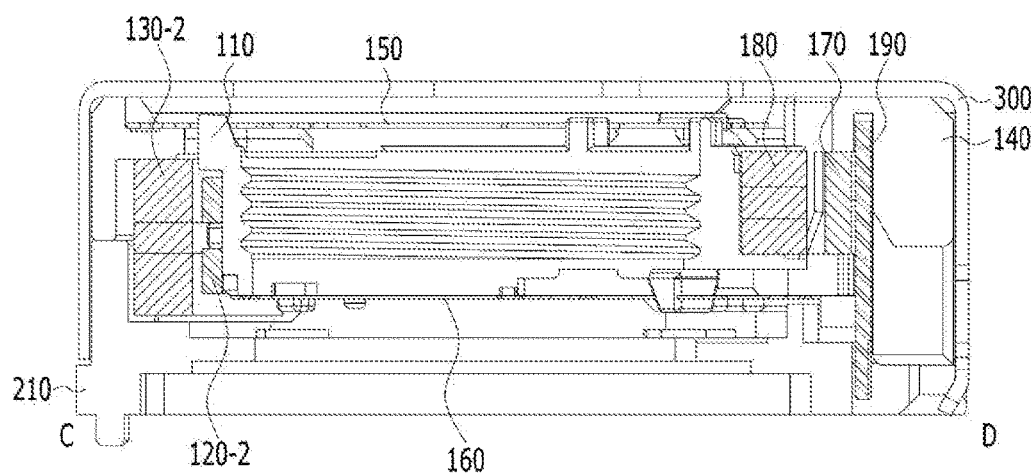
FIG. 7B is a cross-sectional view of the lens moving apparatus, taken along line C-D in FIG. 2.

FIG. 7A is a cross-sectional view of the lens moving apparatus 100 shown in FIG. 2, taken along line A-B in FIG. 2. FIG. 7B is a cross-sectional view of the lens moving apparatus 100 shown in FIG. 2, taken along line C-D in FIG. 2.

Referring to FIGS. 7A and 7B, although the sensing magnet 180 may not overlap the coil units 120-1 and 120-2 in a direction perpendicular to the optical axis OA or in a direction parallel to a line that is perpendicular to the optical axis OA and extends through the optical axis, the disclosure is not limited thereto. In another embodiment, the sensing magnet 180 may overlap the coil units 120-1 and 120-2.

At the initial position of the AF operation unit (for example, the bobbin 110), the position sensor 170 may overlap the sensing magnet 180 in a direction perpendicular to the optical axis OA or in a direction parallel to a line that is perpendicular to the optical axis OA and extends through the optical axis.

Furthermore, the position sensor 170 may not overlap the first and second magnets 130-1 and 130-2 in a direction perpendicular to the optical axis OA or in a direction parallel to a line that is perpendicular to the optical axis OA and extends through the optical axis.

For example, the position sensor 170 may not overlap the first and second magnets 130-1 and 130-2 in a direction toward the coil 120 from the position sensor 170 or in a direction perpendicular to the outer surface of the side portion 141-1 of the housing 140.

Next, the upper elastic member 150, the lower elastic member 160 and the base 210 will be described.

Figure 8A:
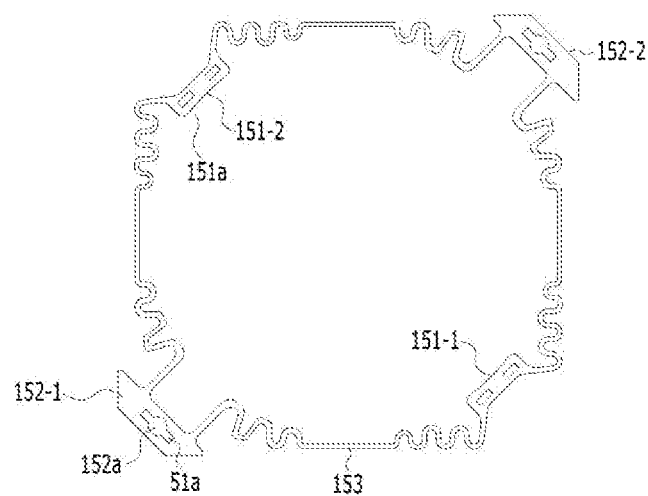
FIG. 8A is a view illustrating the upper elastic member shown in FIG. 1.
Figure 8B:
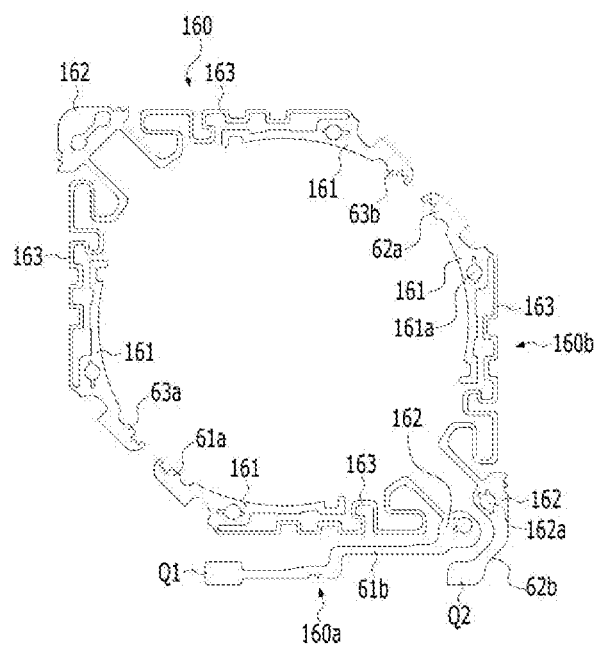
FIG. 8B is a view illustrating the lower elastic member shown in FIG. 1.
Figure 9:
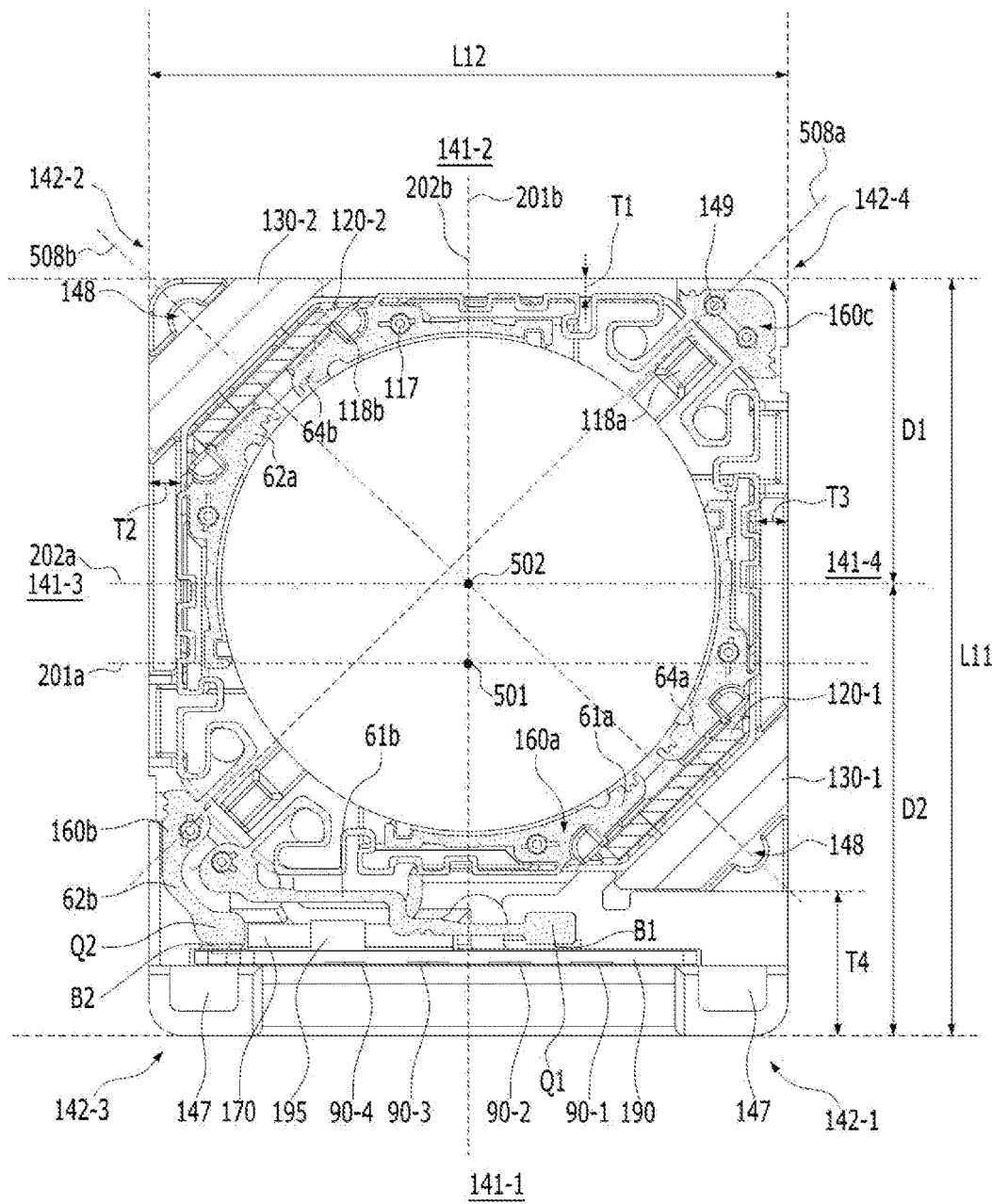
FIG. 9 is a bottom view of the lens moving apparatus shown in FIG. 2, from which the base is removed.
Figure 10:
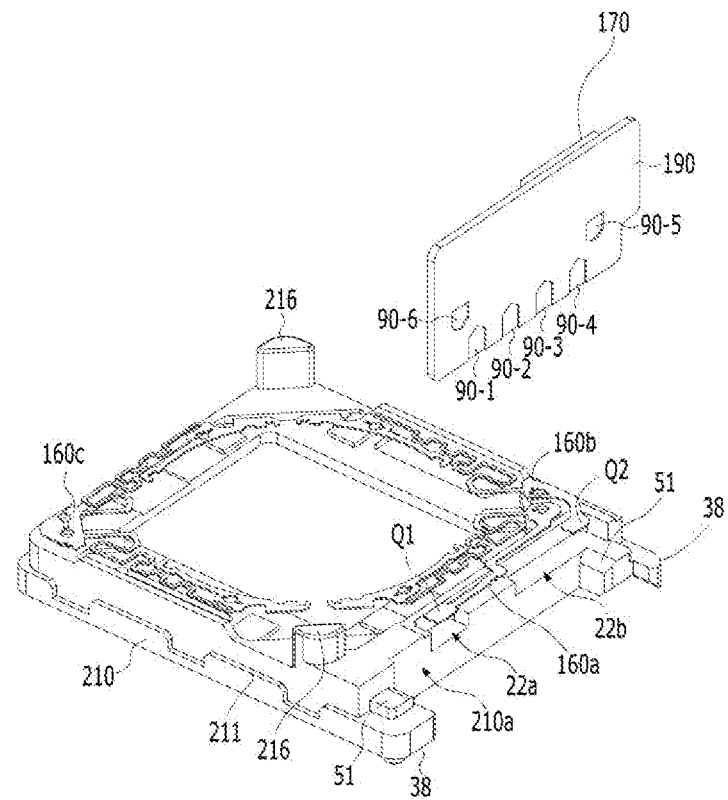
FIG. 10 is a view illustrating the lower elastic member, the base, and the circuit board.

FIG. 8A is a view illustrating the upper elastic member 150 shown in FIG. 1. FIG. 8B is a view illustrating the lower elastic member 160 shown in FIG. 1. FIG. 9 is a bottom view of the lens moving apparatus 100 shown in FIG. 2, from which the base 210 is removed. FIG. 10 is a view illustrating the lower elastic member 160, the base 210, and the circuit board 190.

Referring to FIGS. 8A, 8B, 9 and 10, the upper elastic member 150 and the lower elastic member 160 may be coupled both to the bobbin 110 and to the housing 140 so as to support the bobbin 110.

The upper elastic member 150 may be coupled to the upper portion, the upper end or the upper surface of the bobbin 110, and the lower elastic member 160 may be coupled to the lower portion, the lower end or the lower surface of the bobbin 110.

For example, the upper elastic member 150 may be coupled both to the upper portion, the upper end or the upper surface of the bobbin 110 and to the upper portion, the upper end or the upper surface of the housing 140. For example, the lower elastic member 160 may be coupled both to the lower portion, the lower end or the lower surface of the bobbin 110 and to the lower portion, the lower end or the lower surface of the housing 140.

The upper elastic member 150 and the lower elastic member 160 may elastically support the bobbin 110 with respect to the housing 140.

Although the upper elastic member 150 includes one upper elastic unit (or one upper spring) in FIG. 8A, the upper elastic member may include a plurality of upper elastic units, which are spaced apart from each other, in another embodiment.

The upper elastic member 150 may include a first inner frame coupled to the upper portion, the upper surface or the upper end of the bobbin 110, a first outer frame coupled to the upper portion, the upper surface or the upper end of the housing 140, and a first frame connector connecting the first inner frame 151 to the first outer frame 152. The inner frame may be interchanged with "inner part", and the outer frame may be interchanged with "outer part".

For example, the first outer frame of the upper elastic member 150 may include a first of first outer frame 152-1, coupled to the upper portion, the upper surface or the upper end of the first corner portion 142-1 of the housing 140, and a first of first outer frame 152-2, coupled to the upper portion, the upper surface or the upper end of the second corner portion 142-2 of the housing 140.

For example, the first outer frame of the upper elastic member 150 may be spaced apart from the third corner portion 142-3 and the fourth corner portion 142-4 of the housing 140, and may not be coupled thereto.

For example, the first inner frame of the upper elastic member 150 may include a first of first inner frame 151-1 coupled to the upper portion, the upper surface or the upper end of the second side portion 110c-3 of the bobbin 110, which corresponds to or faces the third corner portion 142-3 of the housing 140, and a second of first inner frame 151-2 coupled to the upper portion, the upper surface or the upper end of the second side portion 110c-4 of the bobbin 110, which corresponds to or faces the fourth corner portion 142-4 of the housing 140.

For example, the first inner frame of the upper elastic member 150 may be spaced apart from the second side portions 110c-1 and 110c-2 of the bobbin 110, which correspond to or face the first and second corner portions 142-1 and 142-2 of the housing 140, and may not be coupled thereto.

In another embodiment, the first outer frame of the upper elastic member 150 may be coupled to at least one of the third corner portion 142-3 and the fourth corner portion 142-4 of the housing 140. In a further embodiment, the first inner frame of the upper elastic member 150 may be coupled to at least one of the second side portions 110c-1 and 110c-2 of the bobbin 110.

Each of the first inner frames 151-1 and 151-2 of the upper elastic member 150 may have formed therein a hole 151a to be coupled to the first coupler 113 of the bobbin 110. Each of the first outer frames 152-1 and 152-2 of the upper elastic member 150 may have formed therein a hole 152a to be coupled to the first coupler 143 of the housing 140. The hole 152a may have at least one slit 51a, which allows an adhesive to be introduced between the first coupler 143 and the hole 151a therethrough.

For example, although the upper elastic member 150 may include four first frame connectors 153, the number thereof is not limited thereto. The first frame connectors may be positioned so as to correspond to the side portions 142-1 to 142-4 of the housing 140.

Referring to FIG. 8B, the lower elastic member 160 may include a first lower elastic unit 160a, a second lower elastic unit 160b and a third lower elastic unit 160c. The lower elastic unit may be interchanged with "lower spring".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

The first to third lower elastic units 160a to 160c may be coupled to the bobbin 110. At least one of the first to third lower elastic units 160a to 160c may be coupled both to the bobbin 110 and to the housing 140.

The first to third lower elastic units 160a to 160c may be disposed between the bobbin 110 and the base 210. For example, the lower elastic member 160 may not overlap at least one of the first magnet and the second magnet in the optical-axis direction. For example, the first to third lower elastic units 160a to 160c may not overlap the first magnet 130-1 and/or the second magnet 130-2 in the optical-axis direction.

At least one of the first to third lower elastic units 160a to 160c may include the second inner frame 161 coupled to the lower portion, the lower surface or the lower end of the bobbin 110, the second outer frame 162 coupled to the lower portion, the lower surface or the lower end of the housing 140, and the second frame connector 163 connecting the second inner frame 161 to the second outer frame 162.

For example, the inner frame of the first lower elastic unit 160a may be disposed under one side portion of the bobbin 110, the inner frame of the second lower elastic unit 160b may be disposed under another side portion of the bobbin 110, and the inner frame of the third lower elastic unit 160c may be disposed under the other two side portions of the bobbin 110.

The second inner frame 161 of at least one of the first to third lower elastic units 160a to 160c may have formed therein a hole 161a for coupling the second coupling portion 117 of the bobbin 110 using solder or a conductive adhesive member.

The second outer frame 162 of at least one of the first to third lower elastic units 160a to 160c may have formed therein a hole 162 for coupling the second coupler 149 of the housing 140. Each of the holes 161a and 162a in the first to third lower elastic units 160a to 160c may have formed therein a slit through which an adhesive enters.

For example, the first lower elastic unit 160a may be coupled to the third corner portion 142-2 of the housing 140, and may be conductively connected to the terminal B1 of the circuit board 190.

For example, the second lower elastic unit 160b may be coupled to the third corner portion 142-2 of the housing 140, and may be conductively connected to the terminal B2 of the circuit board 190.

For example, the third lower elastic unit 160c may be coupled to the fourth corner portion 142-4 of the housing 140, which faces the third corner portion 142-3 of the housing 140.

Referring to FIG. 9, for example, the second outer frame 162 of the first elastic unit 160a may be coupled to the lower portion, the lower end or the lower surface of the housing 140.

For example, the second inner frame 161 of the first lower elastic unit 160a may be coupled to the lower portion, the lower end or the lower surface of the first side portion 110b-1 of the bobbin 110 that faces the first side portion 141-1 of the housing 140.

The second inner frame 161 of the first lower elastic unit 160a may include a first bonding portion (or a first coupler) 61a, to which one end of the first coil unit 120-1 is coupled using a conductive adhesive member or solder. For example, the first bonding portion 61a may be disposed on the second side portion 110c-1 of the bobbin 110 at which the first coil unit 120-1 is disposed.

The second outer frame 162 of the first lower elastic unit 160a may include a first extension portion 61b, which extends toward the terminal B1 of the circuit board 190 from the third corner portion 142-3 of the housing 140.

The first extension portion 61b may extend toward the terminal B1 of the circuit board 190 from the region of the second outer frame 162 of the first lower elastic unit 160a coupled to the third corner portion 142-3 of the housing 140.

The first extension portion 61b may be provided at one end thereof with a pad portion (or a bonding portion) Q1, which is to be conductively connected to the terminal B1 of the circuit board 190 using a conductive adhesive or solder. For easy soldering, the width of the pad portion Q1 may be larger than the width of the first extension portion 61b. Here, the width of the first extension portion 61b may be the length of the first extension portion 61b in a direction perpendicular to the longitudinal direction of the first extension portion 61b.

Although the first extension portion 61b may be bent or curved at least once, the disclosure is not limited thereto. In another embodiment, the first extension portion 61b may have a linear shape.

The second outer frame 162 of the second lower elastic unit 160b may be coupled to the lower portion, the lower end or the lower surface of the third corner portion 142-2 of the housing 140.

For example, the second inner frame 161 of the second lower elastic unit 160b may be coupled to the lower portion, the lower end or the lower surface of the first side portion 110b-3 of the bobbin 110, which faces the third side portion 141-3 of the housing 140.

The second inner frame 161 of the second lower elastic unit 160b may include a second bonding portion (or a second coupler) 62a, to which one end of the second coil unit 120-2 is coupled using a conductive adhesive member or solder. For example, the second bonding portion 62a may be disposed on the second side portion 110c-2 of the bobbin 110, at which the second coil unit 120-2 is disposed.

The second outer frame 162 of the second lower elastic unit 160b may include a second extension portion 62b, which extends toward the terminal B2 of the circuit board 190 from the third corner portion 142-3 of the housing 140.

The second extension portion 62b may extend toward the terminal B2 of the circuit board 190 from the region of the second outer frame 162 of the second lower elastic unit 160b that is coupled to the third corner portion 142-3 of the housing 140.

The second extension portion 62b may be provided at one end thereof with a pad portion (or a bonding portion) Q2, which is conductively connected to the terminal B2 of the circuit board 190 using a conductive adhesive or solder. For easy soldering, the width of the pad portion Q2 may be larger than the width of the second extension portion 62b. Here, the width of the second extension portion 62b may be the length of the second extension portion 62b in a direction perpendicular to the longitudinal direction of the second extension portion 62b.

Although the second extension portion 62b may be bent or curved at least once, the disclosure is not limited thereto. In another embodiment, the second extension portion 62b may have a linear shape.

The second outer frame 162 of the third lower elastic unit 160c may be coupled to the lower portion, the lower end or the lower surface of the fourth corner portion 142-4 of the housing 140.

For example, the second inner frame 161 of the third lower elastic unit 160b may be coupled to the lower portion, the lower end or the lower surface of the first side portions 110b-2 and 110b-4 of the bobbin 110, which face the second side portion 141-2 and the fourth side portion 141-4 of the housing 140.

The second inner frame 161 of the third lower elastic unit 160b may include a third bonding portion (or a second coupler) 64a, to which the other end of the first coil unit 120-1 is coupled using a conductive adhesive member or solder, and a fourth bonding portion 64b, to which the other end of the second coil unit 120-2 is coupled using a conductive adhesive member or solder.

For example, the third bonding portion 64a may be disposed on the second side portion 110c-1 of the bobbin 110, at which the first coil unit 120-1 is disposed, and the fourth bonding portion 64b may be disposed on the second side portion 110c-2 of the bobbin 110, at which the second coil unit 120-2 is disposed.

Each of the first to fourth bonding portions 61a, 62a, 64a and 64b may have therein at least one guide groove for guiding the two ends of each of the first and second coil units.

Although the third lower elastic unit 160c includes one second outer frame 162, two second inner frames 161 and two second frame connectors 163, the disclosure is not limited thereto.

The first coil unit 120-1 may be connected to the second coil unit 120-2 in series via the third lower elastic unit 160-3, thereby allowing a drive signal to be supplied to the first coil unit 120-1 and the second coil unit 120-2 via the terminals B1 and B2 of the circuit board 190.

The first to third lower elastic units 160a to 160c may be spaced apart from the first corner portion 142-1 and the second corner portion 142-2 of the housing 140.

Although the first to third lower elastic units 160a to 160c may not overlap the first and second magnets 130-1 and 130-2 in the optical-axis direction, the disclosure is not limited thereto.

In another embodiment, the first to third lower elastic units may overlap the first and second magnets 130-1 and 130-2 in the optical-axis direction. In a further embodiment, at least one of the first to third lower elastic units may include a second outer frame, which is coupled to at least one of the first corner portion 142-1 and the second corner portion 142-2 of the housing 140.

Referring to FIG. 9, an imaginary line 508a, which connects the third corner portion 142-3 to the fourth corner portion 142-4 of the housing 140, may not overlap the magnets 130-1 and 130-2 or the coils 120-1 and 120-2.

For example, an imaginary line 508a that connects a region of the third corner portion 142-3 of the housing 140, which is coupled to the first and second lower elastic units 160a and 160b, to a region of the fourth corner portion 142-4 of the housing 140, which is coupled to the third lower elastic unit 160c, may not overlap the magnets 130-1 and 130-2 or the coils 120-1 and 120-2.

Furthermore, the imaginary line 508a may not overlap the second inner frame (or the second inner portion) 161 of the lower elastic member 160. Furthermore, the imaginary line 508a may not overlap the second frame connector (or the connector) 163 of the lower elastic member 160.

The imaginary line 508a may overlap the second outer frame (or the second outer portion) 162 of the lower elastic member 160.

Furthermore, an imaginary line 508b, which connects the first corner portion 142-1 to the second corner portion 142-2 of the housing 140, may overlap the magnets 130-1 and 130-2 and the coils 120-1 and 120-2.

The imaginary line 508b may not overlap the second outer frame (or the second outer portion) 162 of the lower elastic member 160.

In another embodiment, the imaginary line may be a line which connects the corner of the lower portion, the lower surface or the lower end of the third corner portion 142-3 of the housing 140 to the corner of the lower portion, the lower surface or the lower end of the fourth corner portion 142-4 of the housing 140.

In order to absorb and dampen vibrations of the bobbin 110, the lens moving apparatus 100 may include a damper (not shown) disposed between the upper elastic member 150 and the housing 140.

For example, the damper (not shown) may be disposed in the space between the first frame connector 153 of the upper elastic member 150 and the housing 140.

For example, the lens moving apparatus 100 may further include a damper (not shown) disposed between the second frame connectors 163 of each of the first to third lower elastic units 160a to 160c and the housing 140.

For example, a damper (not shown) may also be disposed between the inner surface of the housing 140 and the outer surface of the bobbin 110.

Next, the base 210 will be described.

Referring to FIG. 10, the base 210 may have an opening corresponding to the bore in the bobbin 110 and/or the bore in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate of the cover member 300. An adhesive member or a sealing member may be disposed or applied between the lower end of the side plate of the base 210 and the step 211 of the base 210.

The base 210 may be disposed below the bobbin 110 and the housing 140. For example, the base 210 may be disposed below the lower elastic member.

The projection 216, which corresponds to the first and second corner portions 142-1 and 142-2 of the housing 140, may be provided at a corner of the upper surface of the base 210. Although the projection 216 may have the form of a polygonal column, which projects perpendicularly from the upper surface of the base 210, the disclosure is not limited thereto.

The projection 216 may be in contact with the lower end or the lower surface of each of the first and second corners 142-1 and 142-2 of the housing 140, and may be coupled to the lower end or the lower surface of each of the first and second corner portions 142-1 and 142-2 of the housing 140 using an adhesive member (not shown) such as epoxy or silicone.

The base 210 may have a seating groove 210a, which is formed in the outer surface thereof so as to correspond to the circuit board 190 and in which the lower end of the circuit board 190 is seated. For example, the seating groove 210a may be formed in the side surface of the base 210 that corresponds to the first side portion 141-1 of the housing 140.

For example, the extension part S2 of the circuit board 190 may be disposed in the seating groove 210a in the base 210.

The base 210 may have a first escape groove 22a and a second escape groove 22b, which are formed in the upper surface of the base 210 adjacent to the outer surface of the base 210 corresponding to the circuit board 190.

The first escape groove 22a is intended to avoid spatial interference with the pad portion Q1 of the first lower elastic unit 160a, and the second escape groove 22b is intended to avoid spatial interference with the pad portion Q2 of the second lower elastic unit 160b.

The base 210 may include projections 38, which project in a direction perpendicular to the optical axis from the outer surfaces of corners of the base 210 that correspond to the first and third corner portions 142-1 and 142-3 of the housing 140.

The corners of the base 210 that face the first and third corner portions 142-1 and 142-3 of the housing 140 may be provided with protrusions 51, which are coupled to the grooves 147 formed in the first and third corner portions 142-1 and 142-3 of the housing 140. For example, the protrusions 51 of the base 210 may be coupled to the grooves 147 in the housing 140 using an adhesive. For example, the protrusions 51 may be disposed on the projections 38 of the base 210.

The cover member 300 may accommodate the bobbin 110, the coils 120, the first and second magnets 130-1 and 130-2, the housing 140, the upper elastic member 150, the lower elastic member 160, the position sensor 170, the sensing magnet 180 and the circuit board 190 in the space defined between the cover member 300 and the base 210.

The cover member 300 may be configured to have a box shape, which is open at the lower face thereof and includes the upper plate and the side plates. The lower portion of the cover member 300 may be coupled to the upper portion of the base 210. The upper plate of the cover member 300 may have a polygonal shape, for example, a square shape, an octagonal shape, or the like.

The cover member 300 may have a bore, which exposes a lens (not shown) coupled to the bobbin 110 to external light. Although the cover member 300 may be made of made of a nonmagnetic material such as stainless steel so as to prevent a phenomenon in which the cover member 300 is attracted to the first and second magnets 130-1 and 130-2, the disclosure is not limited thereto. The cover member 300 may also be made of a magnetic material so as to serve as a yoke for increasing the electromagnetic force between the coil 120 and the first and second magnets 130-1 and 130-2.

Generally, an AF lens moving apparatus may have a square planar shape, and may be configured such that magnets are disposed on four surfaces of the housing at an interval of 90 degrees, or at two surfaces thereof. In an optical product, which requires a lens moving apparatus which includes a lens having an increased outside diameter and which has a reduced external size, when the lens moving apparatus has a square shape as mentioned above, there may be a limitations on disposition of the position sensor, a circuit board and/or a magnet.

Particularly, designs in which a driver IC-type position sensor having temperature compensation and the like is incorporated in a lens moving apparatus are increasing in recent days. The drive IC-type position sensor has a larger three-dimensional size than a single hall sensor. Accordingly, when a specification of an increased lens aperture and a small-sized lens moving apparatus is required, there may be a limitation on the space required for accommodation of a drive IC-type position sensor.

Referring to FIG. 9, in order to ensure a sufficient space for accommodation of a drive IC-type position sensor, according to the embodiment, the longitudinal length L11 of the housing 140 may be greater than the crosswise length L12 of the housing 140, for example, L12:L11=1:1.1~1:1.5. However, the disclosure is not limited thereto.

Here, the longitudinal direction of the housing 140 may be a direction toward the second side portion 141-2 from the first side portion 141-1 of the housing 140. Furthermore, the crosswise direction of the housing 140 may be a direction toward the fourth side portion 141-4 from the third side portion 141-3 of the housing 140.

For example, the center 501 of the housing 140 may not coincide with the center 502 of the bobbin 110. For example, the center 502 of the bobbin 110 may be the center of the bore in the bobbin 110.

For example, the center 502 of the bobbin 110 may be positioned closer to the second side portion 141-2 of the housing 140 than the first side portion 141-1 of the housing 140.

For example, the center 501 of the housing 140 may be the point at which the first horizontal central line 201a of the housing 140 intersects the first vertical central line 201b of the housing 140.

For example, the first horizontal central line 201a may be a line that is parallel to a direction toward the fourth side portion 141-4 from the third side portion 141-3 of the housing 140 and extends through the center 501 of the housing 140. For example, the first vertical central line 201b may be a line that is parallel to a direction toward the second side portion 141-2 from the first side portion 141-1 of the housing 140 and extends through the center 501 of the housing 140.

For example, the center 502 of the bobbin 110 may be the point at which the second horizontal central line 202a of the bobbin 110 intersects the second vertical central line 202b of the bobbin 110.

For example, the second horizontal central line 202a may be a line that is parallel to a direction toward the fourth side portion 141-4 from the third side portion 141-3 of the housing 140 and extends through the center 502 of the bore in the bobbin 110. For example, the second vertical central line 202b may be a line that is parallel to the first vertical central line 201b and extends through the center 502 of the bore in the bobbin 110.

The distance between the center 502 of the bobbin 110 and the second side portion 141-2 of the housing 140 may be less than the distance between the center 502 of the bobbin 110 and the first side portion 141-1 of the housing 140.

For example, the distance D1 between the second side portion 141-2 and the center 502 of the bobbin 110 in a direction toward the first side portion 141-1 of the housing 140-1 from the second side portion 141-2 of the housing 140-1 may be less than the distance D2 between the outer surface of the first side portion 141-1 of the housing 140 and the center 502 of the bobbin 110 (D1<D2).

For example, the thickness T1 of the second side portion 141-2 of the housing 140 may be less than the thickness T2 of the third side portion 141-3 of the housing 140 (T1<T2). For example, the thickness T1 of the second side portion 141-2 of the housing 140 may be less than the thickness T3 of the fourth side portion 141-4 of the housing 140. For example, although the thickness T2 may be equal to the thickness T3, the disclosure is not limited thereto, and the two thicknesses may be different from each other.

It is possible to decrease the distance D1 by decreasing the thickness T1 to be less than the thickness T2. Since the thickness T2 is greater than the thickness T1, the third side portion 141-3 and the fourth side portion 14-4 of the housing 140 are capable of stably supporting the corners of the first and second magnets 130-1 and 130-2.

For example, the thickness T4 of the first side portion 141-1 of the housing 140 may be greater than any one of the thickness T1 of the second side portion 141-2, the thickness T2 of the third side portion and the thickness T3 of the fourth side portion 140-4 of the housing 140 (T4>T1, T4>T2, T4>T3).

Since the thickness T4 is greater than any one of the thicknesses T1, T2 and T3, it is possible to ensure a sufficient space to accommodate the circuit board 190 and the position sensor 170 without decreasing the size of the bore in the bobbin 110.

Figure 11:
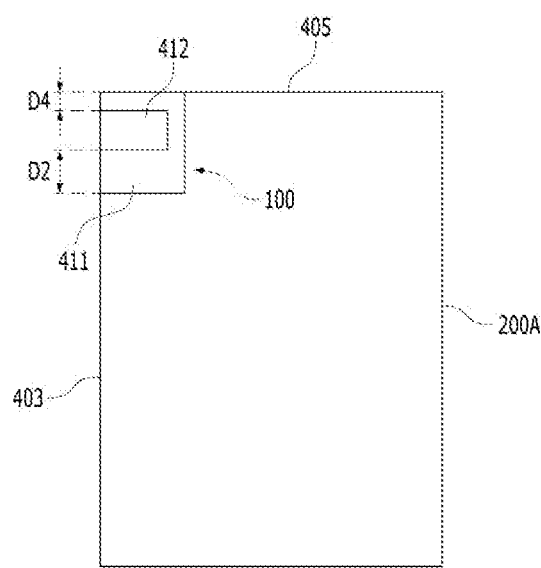
FIG. 11 is a conceptual view of an optical device including the lens moving apparatus according to an embodiment.

FIG. 11 is a conceptual view of an optical device including the lens moving apparatus according to the embodiment.

Referring to FIG. 11, the camera module including the lens moving apparatus 100 may be mounted on the front surface of the optical device 200A. Here, in order to improve freedom in the design of the front surface 403 of the optical device, the lens moving apparatus 100 may be positioned adjacent to the edge of the optical device 200A, for example, the upper end or the upper surface 405 of the optical device 200A.

For example, the lens moving apparatus 100 may be disposed on the optical device 200A such that the second side portion 141-2 of the housing 140 shown in FIG. 9 is adjacent to the upper end or the upper surface 405 of the optical device 200A.

Customers require a predetermined specification for D1 in FIG. 9 in order to improve design freedom of the front surface 403 of the optical device. For example, although the distance D1 may be 3 mm-4 mm, the disclosure is not limited thereto.

Because the lens 412 mounted on the lens moving apparatus 100 must receive light, the lens moving apparatus 100 must be exposed through the front surface 403 of the optical device. As illustrated in FIG. 9, the distance D2 is less than the distance D1. Accordingly, when the lens moving apparatus 100 according to the embodiment is applied to the optical device 200A, it is possible to dispose the lens 412 adjacent to the upper end or the upper surface 405 of the optical device 200A, and it is thus possible to improve design freedom of the front surface of the optical device 200A.

The magnets 130-1 and 130-2 are disposed on the first and second corner portions 142-1 and 142-2 of the housing 140, and the coil units 120-1 and 120-2 may be disposed on the second side portions 110c-1 and 110c-2 of the bobbin 110 corresponding to the first and second corner portions 142-1 and 142-2 of the housing 140. The position sensor 170 may be disposed on the first corner portions 142-1, the first side portion 141-1 and the third corner portion 142-3 of the housing 140, and the sensing magnet 180 may be disposed the first side portion 110b-1 of the bobbin 110 adjacent to the third corner portion 142-3 of the housing 140. Accordingly, the embodiment is able to mount a lens having a large aperture required by customers to a product while reducing the size of the product, and to improve freedom in the design of the front surface of an optical device in which the lens moving apparatus is incorporated.

Although FIGS. 1 to 11 illustrate an embodiment in which the first and second magnets 130-1 and 130-2 are disposed on the housing 140, the disclosure is not limited thereto. In another embodiment, the first and second magnets may be disposed on the first and second corner portions of the cover member.

For example, the cover member may include first to fourth side portions corresponding to the first to fourth side portions of the housing 140 and first to fourth corner portions corresponding to the first to fourth corner portions of the housing 140.

The bobbin 110 may be disposed in the cover member, and the coils 120 may be disposed on the bobbin. The circuit board may be disposed on one inner surface of the cover member, and the position sensor may be disposed on the circuit board. The sensing magnet may be disposed on the bobbin so as to face the position sensor.

Furthermore, the first magnet 130-1 may be disposed on the first corner portion of the cover member, and the second magnet 130-2 may be disposed on the second corner portion, which faces the first corner portion of the cover member.

The position sensor 170 may be disposed closer to the third corner portion than to the first corner portion, and no magnet may be disposed on the third corner portion of the cover member. For example, the circuit board 190 may be positioned between the first corner portion and the third corner portion of the cover member 300. In the embodiment shown in FIG. 1, the description of the positional relationships between the first and second magnets 130-1 and 130-2 of the housing and the positional relationships between the housing 140 and the circuit board 190 and the description of the housing 140, the position sensor 170 and the capacitor 195 may applied to the cover member, the first and second magnets 130-1 and 130-2, the circuit board 190, the position sensor 170 and the capacitor 195 according to the above-described another embodiment. In another embodiment, the upper and lower elastic members 150 and 160 may be coupled to the cover member, and the description of the housing 140 and the lower elastic member 160 shown in FIG. 9 may be applied to the cover member and the lower elastic member 160 according to another embodiment.

Figure 12:
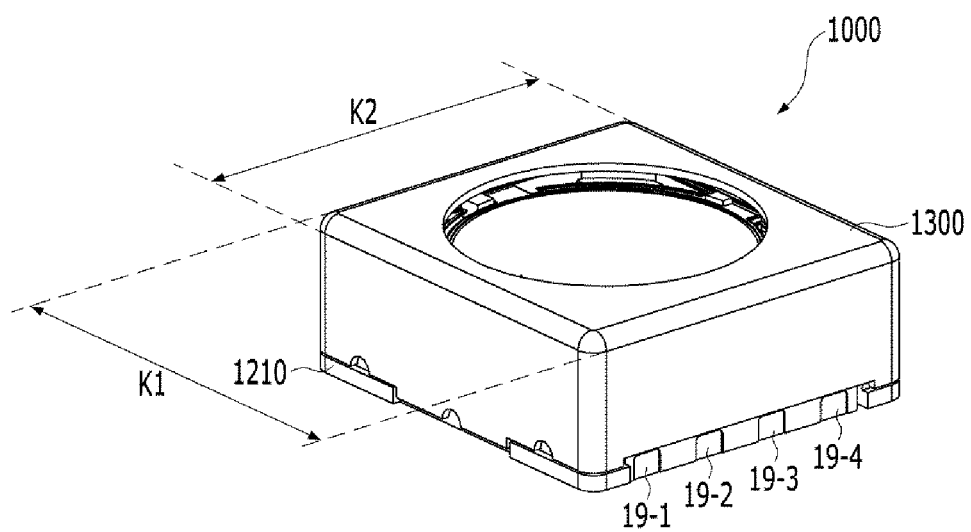
FIG. 12 is a perspective view of a lens moving apparatus according to an embodiment.
Figure 13:
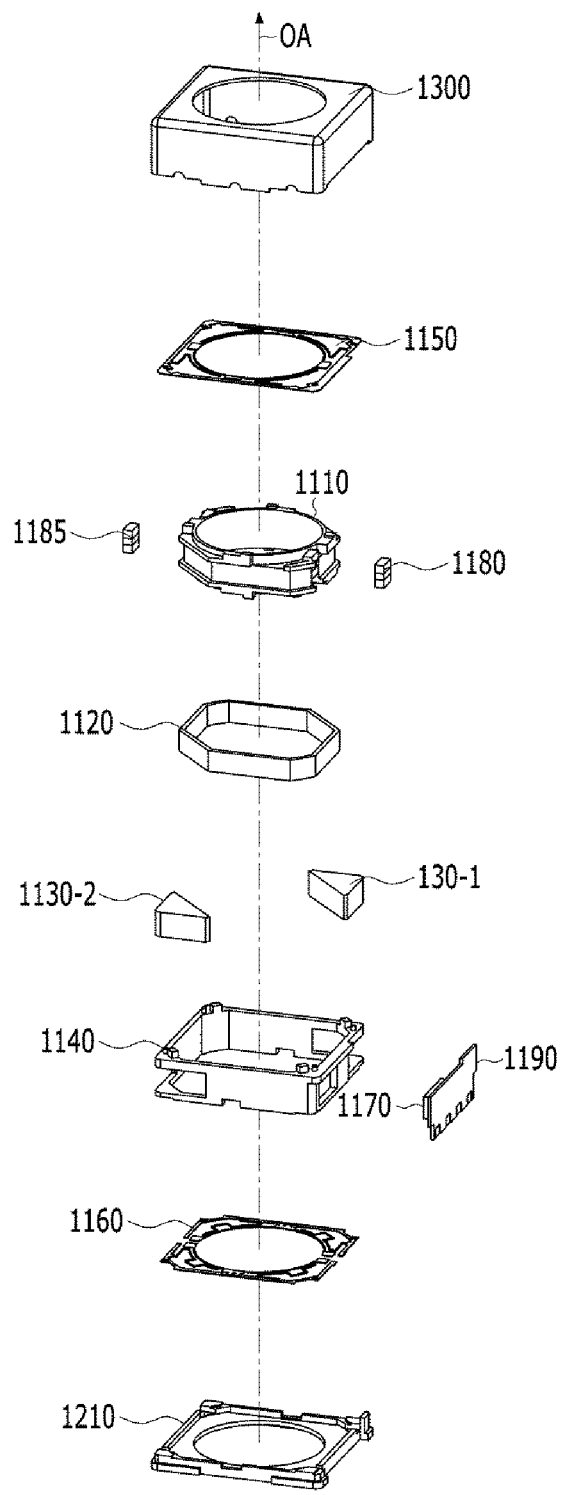
FIG. 13 is an exploded view of the lens moving apparatus shown in FIG. 12.
Figure 14:
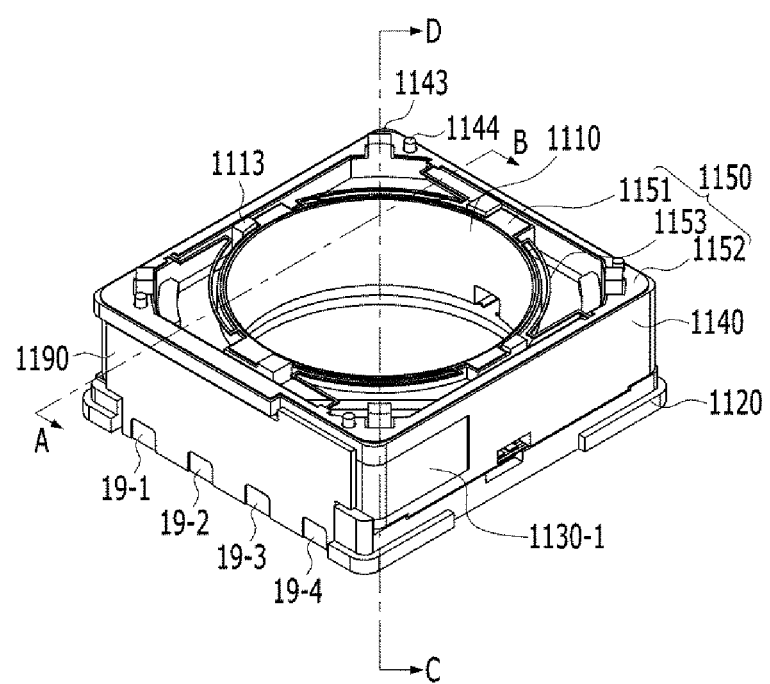
FIG. 14 is an assembled perspective view of the lens moving apparatus shown in FIG. 12, from which a cover member is removed.

FIG. 12 is a perspective view of a lens moving apparatus 1000 according to another embodiment. FIG. 13 is an exploded view of the lens moving apparatus 1000 shown in FIG. 12. FIG. 14 is an assembled perspective view of the lens moving apparatus 1000, from which a cover member 1300 is removed.

The lens moving apparatus 1000 includes a bobbin 1110, a coil 1120, a first magnet 1130-1, a second magnet 1130-2, a housing 1140, an upper elastic member 1150 and a lower elastic member 1160.

The lens moving apparatus 1000 may further include a position sensor 1170, a circuit board 1190 and a sensing magnet 1180 for AF feedback operation. The lens moving apparatus 1000 may further include a cover member 1300 and a base 1210.

Furthermore, the lens moving apparatus 1000 may further include a capacitor disposed or mounted to the circuit board 1190. The description of the capacitor 195 of the lens moving apparatus 100 may be identically applied or similarly applied to the description of the lens moving apparatus 1000.

Next, the bobbin 1110 will be described.

The bobbin 1110 may be disposed inside the housing 1140, and may be moved in the optical-axis direction or in the first direction (for example, in the z-axis direction) by electromagnetic interaction between the coil 1120 and the first and second magnets 1130-1 and 1130-2.

Figure 15:
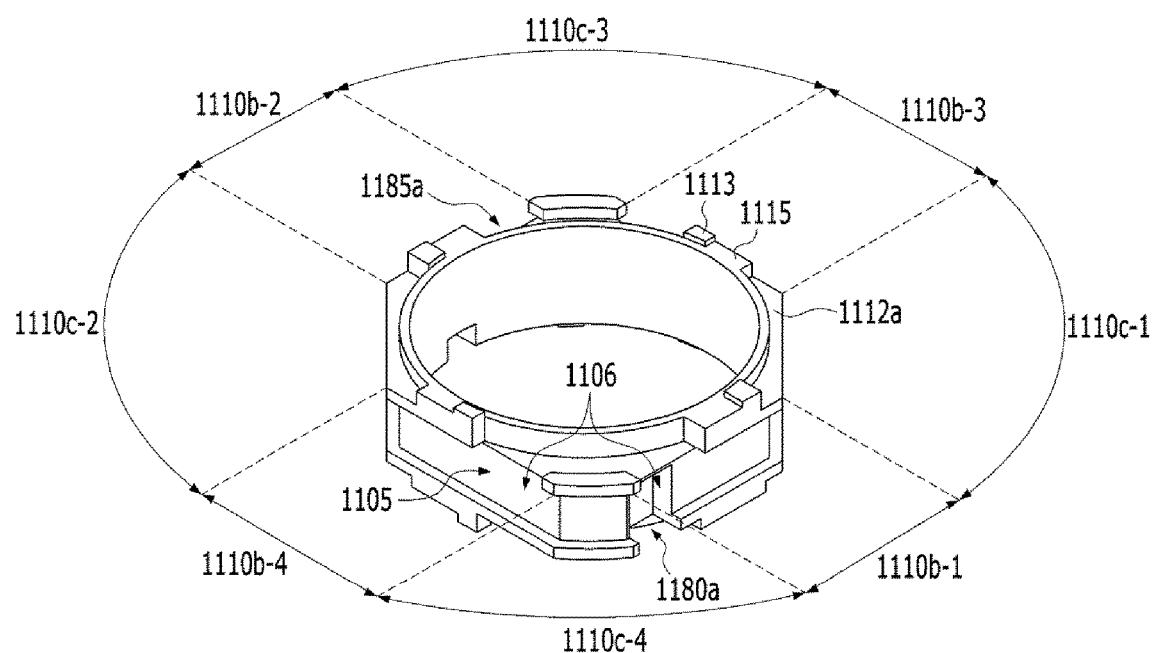
FIG. 15 is a perspective view of the bobbin shown in FIG. 12.
Figure 16:
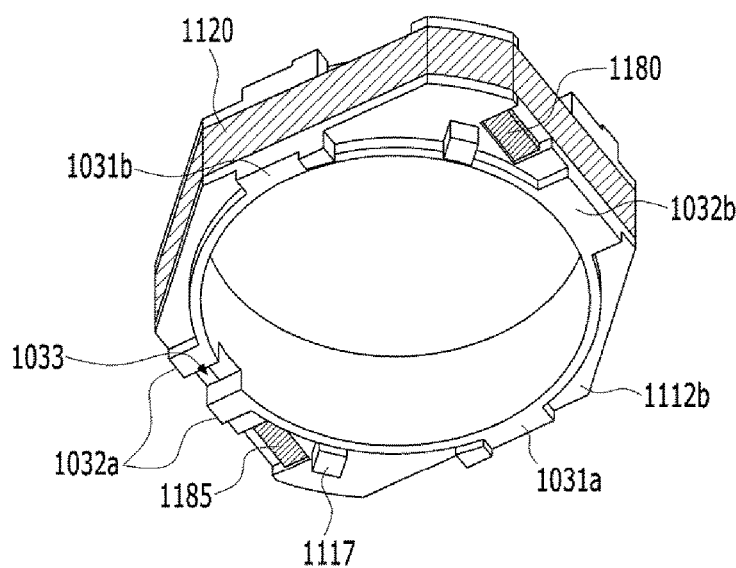
FIG. 16 is a perspective view of the bobbin shown in FIG. 12.

FIG. 15 is a perspective view of the bobbin 1110 shown in FIG. 12. FIG. 16 is a perspective view of the bobbin 1110 and the coil 1120.

Referring to FIGS. 15 and 16, the bobbin 1110 may be provided with a lens or a lens barrel mounted therein, and may be disposed in the housing 1140. The bobbin 1110 may have a bore for mounting the lens or the lens barrel. Although the bore may have a circular shape, an elliptical shape or a polygonal shape, the disclosure is not limited thereto.

The bobbin 1110 may include a first coupler 115, which is disposed on the upper surface thereof and is coupled and secured to a first inner frame 1151 of the upper elastic member 1150, and second couplers 1032a and 1032b, which are disposed on the lower surface thereof and are coupled and secured to a second inner frame 1161 of the lower elastic member 1160.

The bobbin 1110 may include a first stopper 1113, projecting upwards from the upper surface thereof, and a second stopper 1117, projecting downwards from the lower surface thereof. The first stopper 1113 and the second stopper 1117 of the bobbin 1110 may serve to prevent the upper surface or the lower surface of the bobbin 1110 from directly colliding with the inner wall of the cover member 1300 or the upper surface of the base 1210 when the bobbin 1110 is moved beyond a specified range due to an external impact or the like while the bobbin 1110 is moved in the first direction for autofocusing.

Although each of the first and second couplers 1115, 1032a and 1032b may have a flat surface in FIGS. 15 and 16, the disclosure is not limited thereto. In another embodiment, the first and second couplers may have a protrusion or groove shape.

The bobbin 1110 may include a first escape groove 1112a formed in the region of the upper surface that corresponds to or is aligned with a first frame connector 1153 of the upper elastic member 1150.

Furthermore, the bobbin 1110 may include a second escape groove 1112b formed in a region of the lower surface that corresponds to or is aligned with a second frame connector 1163 of the lower elastic member 1160.

By virtue of the first escape groove 1112a and the second escape groove 1112b in the bobbin 1110, it is possible to eliminate spatial interference between the first frame connector 1152 and the second frame connector 1163 and the bobbin 1110 when the bobbin 1110 is moved in the first direction. Consequently, the first frame connector 1153 and the second frame connector 1163 may be elastically deformed with ease.

The bobbin 1110 may include a plurality of side surfaces. For example, the side surfaces of the bobbin 1110 may be the side surfaces or the outer surfaces of the bobbin 1110.

For example, the bobbin 1110 may include the side portions or the side surfaces 1110b-1 to 1110b-4 and 1110c-1 to 1110c-4.

For seating of the coil 1120, the bobbin 1110 may have grooves 1105 formed in the side surfaces or the side portions 1110b-1 to 1110b-4 and 1110c-1 to 1110c-4.

Each of the grooves 1105 may have a shape depressed from a corresponding one of the side portions 1110b-1 to 1110b-4 and 1110c-1 to 1110c-4, or a closed curve shape, for example, a ring shape.

The bobbin 1110 may have a first seating groove 1180a formed in one (for example, 1110b-1) of the side portions 1110b-1 to 1110b-4 and 1110c-1 to 1110c-4 so as to receive the sensing magnet 1180, and a second seating groove 1185a formed in another one of the side portions 1110b-1 to 1110b-4 and 1110c-1 to 1110c-4 so as to receive the balancing magnet 1185.

Each of the first and second seating grooves 1180a and 1185a may be open at the upper surface or the lower surface thereof for easy mounting of the sensing magnet 1180 and the balancing magnet 1185.

For example, for disposition of the sensing magnet 1180 and the balancing magnet 1185, the bobbin 1110 may have the seating grooves 1180a and 1185 formed in the side surface or the outer surface of the other two side portions (for example, 1110b-1 and 1110b-3), which face each other.

Although the first and second seating grooves 1180a and 1185a may not overlap each other in a direction toward the side surface or the outer surface of the side portion 1110b-4 from the side surface or the outer surface of the side portion 1110b-3 of the bobbin 1110, the disclosure is not limited thereto. In another embodiment, the first and second seating grooves 1180a and 1185a may not overlap each other.

The shape of each of the first and second seating grooves 1180a and 1185 may coincide with the shape of a corresponding one of the sensing magnet 1180 and the balancing magnet 1185.

The lower portion, the lower end or the lower surface of the bobbin 1110 may have formed therein a groove 33 for allowing the first end or the second end of the coil 1120 to be easily connected to the first bonding portion 1061a of the first lower spring 1160a and the third bonding portion 1061b of the second lower spring.

Figure 25:
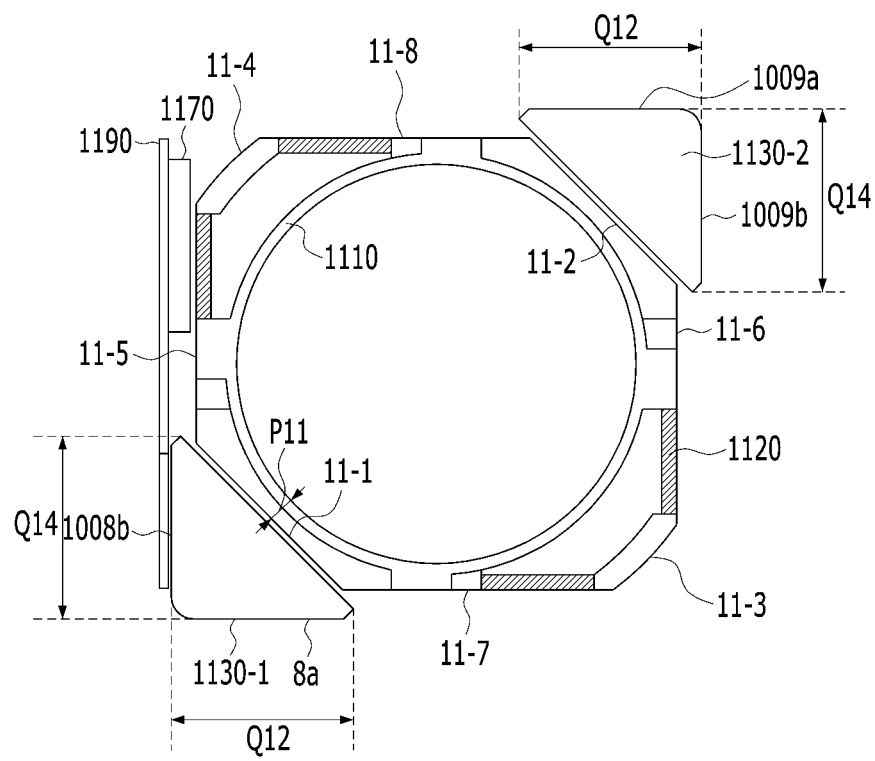
FIG. 25 is a view illustrating the bobbin, the first magnet, the circuit board and the position sensor.

Referring to FIGS. 15 and 25, the bobbin 1110 may have at least one opening 1106 for allowing the coil 1120 mounted thereon to be partially exposed through the upper surface of the bobbin 1110. By forming the opening 1106 for allowing the portion of the coil 1120 to be exposed and thus reducing the mass (or weight) of the bobbin 1110, it is possible to increase the first resonant frequency and the second resonant frequency of vibrations of the AF operation unit (for example, the bobbin 1110) due to AF operation, and it is thus possible to suppress oscillation of the AF operation unit.

The minimum thickness P11 of the side portion 1110*c*-1 of the bobbin 1110 may be 0.35 mm~0.5 mm. The reason for this is that the minimum thickness of the side portion of the bobbin 1110 that can be achieved through an injection-molding process is 0.15 mm and the thickness of the coil 1120 is 0.2 mm.

Next, the coil 1120 will be described.

The coil 1120 is disposed on the side surfaces of the bobbin 1110 or the outer surfaces of the side portions 1110*b*-1 to 1110*b*-4 and 1110*c*-1 to 1110*c*-4.

For example, the coil 1120 may be disposed in the groove 1105 in the bobbin 1110.

For example, the coil may have a closed curve shape, for example, a ring shape surrounding the outer surfaces of the side surfaces of the coil 1120 or the outer surfaces of the side portions 1110*b*-1 to 1110*b*-4 and 1110*c*-1 to 1110*c*-4.

For example, although the coil 1120 may have an octagonal shape, the disclosure is not limited thereto.

The coil 1120 may surround the bobbin 1110 in a rotational direction about the optical axis OA.

Although the coil 1120 is directly wound around the outer surface of the bobbin 1110, the disclosure is not limited thereto. In another embodiment, the coil 1120 may be configured to have the form of a coil ring or a coil block disposed on the bobbin 1110.

A drive signal is supplied to the coil 1120 for AF operation.

When the drive signal (for example, a drive current) is supplied to the coil 1120, an electromagnetic force may be created by electromagnetic interaction between the coil 1120 and the magnets 130-1 and 130-2, and the bobbin 1110 can be moved in the optical-axis direction OA by the created electromagnetic force.

At the initial position of the AF operation unit, the bobbin 1110 may be moved upwards or downwards (for example, in the Z-axis direction), which is referred to as the bidirectional driving of the AF operation unit. Alternatively, at the initial position of the AF operation unit, the bobbin 1110 may be moved upwards or downwards, which is referred to as unidirectional driving of the AF operation unit.

At the initial position of the AF operation unit, the coil 1120 may be disposed so as to correspond to or overlap the first and second magnets 1130-1 and 1130-2 disposed on the housing 1140 in a direction parallel to a line that is perpendicular to the optical axis OA and extends through the optical axis.

For example, the AF operation unit may include the bobbin 1110 and the components coupled to the bobbin 1110 (for example, the coils 1120, the sensing magnet 1180 and the balancing magnet 1185).

The initial position of the AF operation unit may be the original position of the AF operation unit in the state in which no electric power is applied to the coil 1120 or the position at which the AF operation unit is located as the result of the upper and lower elastic members 150 and 160 being elastically deformed due only to the weight of the AF operation unit.

In addition, the initial position of the bobbin 1110 may be the position at which the AF operation unit is located when gravity acts in the direction from the bobbin 1110 to the base 1210 or when gravity acts in the direction from the base 1210 to the bobbin 1110.

Next, the sensing magnet 1180 and the balancing magnet 1185 will be described.

The position sensor 1170 may detect variation in the intensity of the magnetic field of the sensing magnet 1180 due to movement of the bobbin 1110.

The balancing magnet 1185 may be a balancing magnet for attaining weight equilibrium with respect to the sensing magnet 1180. The weight equilibrium of the AF operation unit may be attained by means of the balancing magnet 1185, thereby ensuring accurate AF operation. In another embodiment, the balancing magnet 1185 may be omitted.

The sensing magnet 1180 may be disposed on one of two opposite side surfaces of the bobbin 1110, and the balancing magnet 1185 may be disposed on the other one of the two opposite side surfaces of the bobbin 1110.

For example, the sensing magnet 1180 may be disposed in the first seating groove 1180*a* in the bobbin 1110, and the balancing magnet 1185 may be disposed in the second seating groove 1185*a* in the bobbin 1110.

Although a portion of one surface of the sensing magnet 1180 mounted in the first seating groove 1180*a* in the bobbin 1110 and/or a portion of one surface of the balancing magnet 1185 mounted in the second seating groove 1185*a* may be exposed through the outer surface of the bobbin 1110, the disclosure is not limited thereto. In another embodiment, the portion may not be exposed through the outer surface of the bobbin 1110.

Although each of the sensing magnet 1180 and the balancing magnet 1185 may be a monopolar magnetized magnet, which is disposed such that an upper surface thereof is the N pole and a lower surface thereof is the S pole, the disclosure is not limited thereto, and the polarities may be disposed in the opposite orientation.

For example, although each of the sensing magnet 1180 and the balancing magnet 1185 may be disposed such that the boundary plane between the N pole and the S pole is parallel to a direction perpendicular to the optical axis, the disclosure is not limited thereto. In another embodiment, the boundary plane between the N pole and the S pole may be parallel to the optical axis.

In another embodiment, each of the sensing magnet 1180 and the balancing magnet 1185 may be a bipolar magnetized magnet. The bipolar magnetized magnet may include a first magnet part including the N pole and the S pole, a second magnet part including the N pole and the S pole, and a nonmagnetic partition wall disposed between the first magnet part and the second magnet part.

For example, the description of the sensing magnet 180 in FIG. 4 may be identically applied or similarly applied to the sensing magnet 1180 and/or the balancing magnet 1185.

By virtue of the electromagnetic force resulting from the interaction between the coil 1120 and the first and second magnets 1130-1 and 1130-2, the sensing magnet 1180 may be moved together with the bobbin 1110 in the optical-axis direction OA. The position sensor 1170 disposed on the housing 1140 may detect the intensity of the magnetic field of the sensing magnet 1180, which is moved in the optical-axis direction, and may output the output signal corresponding to the detected intensity. For example, the controller 830 of the camera module 200 or the controller 780 of the terminal 200A may detect displacement of the bobbin 1110 in the optical-axis direction based on an output signal output from the position sensor 1170.

Next, the housing 1140 will be described.

The housing 1140 accommodates therein the bobbin 1110, at which the coil 1120, the sensing magnet 1180 and the balancing magnet 1185 are disposed.

Figure 17:
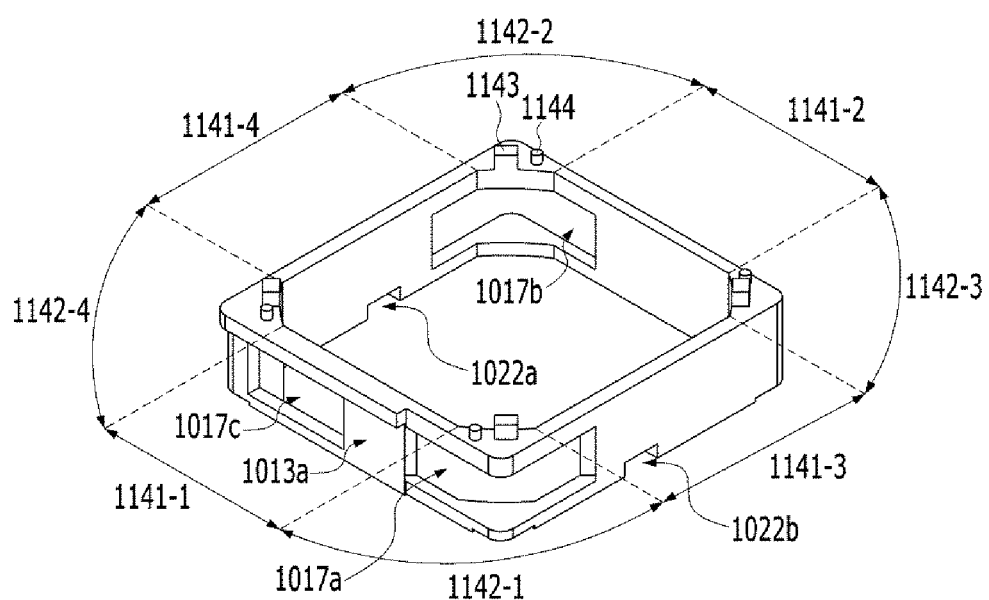
FIG. 17 is a perspective view of the housing shown in FIG. 13.
Figure 18:
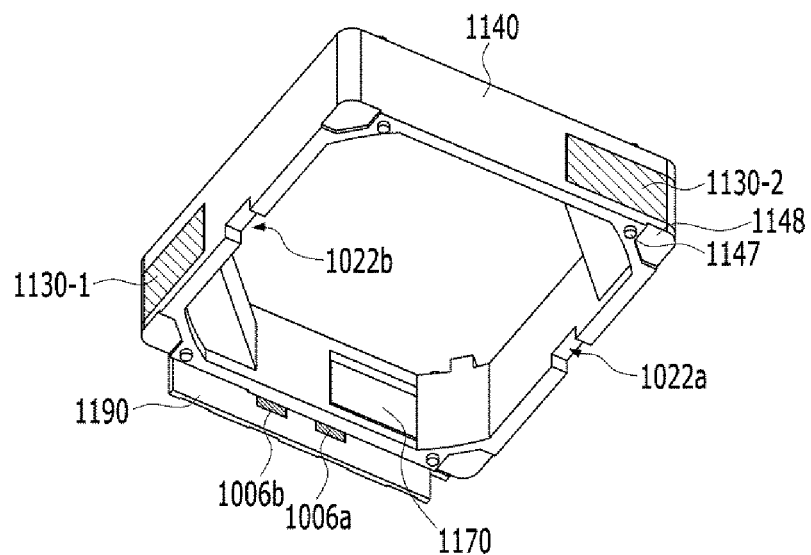
FIG. 18 is a perspective view of the housing, the position sensor and the circuit board shown in FIG. 13.
Figure 19:
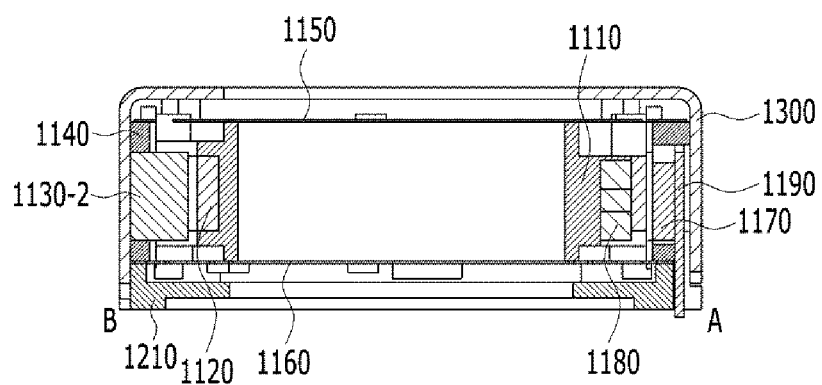
FIG. 19 is a cross-sectional view of the lens moving apparatus, taken along line A-B in FIG. 14.
Figure 20:
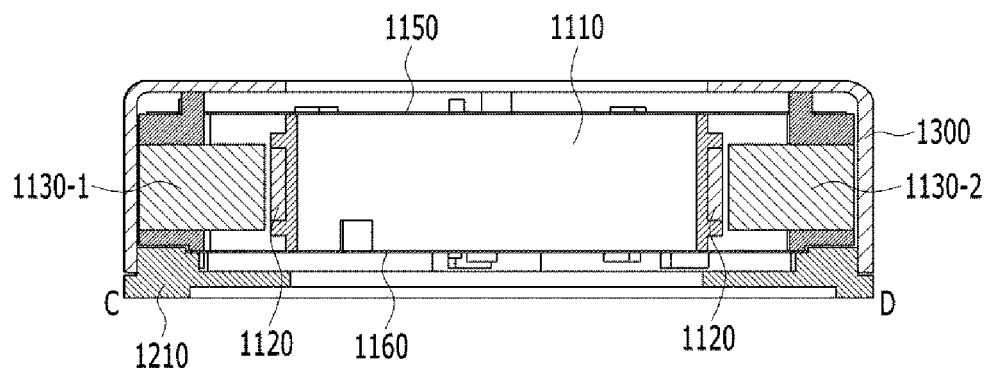
FIG. 20 is a cross-sectional view of the lens moving apparatus, taken along line C-D in FIG. 14.

FIG. 17 is a perspective view of the housing 1140 shown in FIG. 13. FIG. 18 is a perspective view of the housing 1140, the position sensor 1170 and the circuit board 1190, which are shown in FIG. 13. FIG. 19 is a cross-sectional view of the lens moving apparatus 1000 taken along line A-B in FIG. 14. FIG. 20 is a cross-sectional view of the lens moving apparatus 1000 taken along line C-D in FIG. 14.

Referring to FIGS. 17 and 18, the housing 1140 supports the first and second magnets 1130-1 and 1130-2, and accommodates therein the bobbin 1110 such that the AF operation unit, for example, the bobbin 1110, is moved in the first direction.

The housing 1140 supports the first and second magnets 1130-1 and 1130-2, the position sensor 1170, and the circuit board 1190. Although the first and second magnets 1130-1 and 1130-2 are disposed on the housing 1140 in FIGS. 12 to 15, the disclosure is not limited thereto. In another embodiment, the first and second magnets 1130-1 and 1130-2 may be disposed on the inner surfaces of the side plates of the cover member 1300 or at the base 1210. The part at which the first and second magnets 1130-1 are disposed may be referred to as a "holding portion". The holding portion may be the housing 1140, the cover member 1300, the base 1210, or a component independent of the housing 1140, the cover member 1300 and the base 1210. For example, in another embodiment, the first and second magnets may be disposed on the cover member 1300 or the base 1210 in place of the housing 1140. In this case, the housing 1140 may or may not be omitted.

The housing 1140 may have the form of a column having a bore, and may include a plurality of side portions (for example, 1141-1 to 1141-4) and a plurality of corner portions (for example, 1142-1 to 1142-4), which together define the bore. Here, the corner portions may be referred to as "corners".

For example, the housing 1140 may include the side portions (for example, 1141-1 to 1141-4) and the corner portions (for example, 1142-1 to 1142-4), which together define a bore having a polygonal shape (for example, a square shape or an octagonal shape) or a circular shape.

For example, the housing 1140 may include the first to fourth side portions 1141-1 to 1141-4, which are spaced apart from one another, the first corner portion 1142-1 positioned between the first side portion 1141-1 and the third side portion 1141-3, the second corner portion 1142-2 positioned between the second side portion 1141-2 and the third side portion 1141-3, the third corner portion 1142-3 positioned between the second side portion 1141-2 and the fourth side portion 1141-4, and the fourth side portion 1142-4 positioned between the fourth side portion 1141-4 and the first side portion 1141-1.

For example, the first side portion 1141-1 and the second side portion 1141-2 of the housing 1140 may face each other, and the third side portion 1141-3 and the fourth side portion 1141-4 of the housing 1140 may face each other.

The third side portion 1141-3 and the fourth side portion 1141-4 of the housing 1140 may be disposed between the first side portion 1141-1 and the second side portion 1141-2 of the housing 1140.

Furthermore, the housing 1140 may include the first corner portion (or the first corner) 1142-1, the second corner portion (or the second corner) 1142-2 adjacent to the first corner portion 1142-1, the third corner portion (or the third corner) 1142-3, which faces the first corner portion 1142-1 in a first diagonal direction, the fourth corner portion (or the fourth corner 1142-4), which faces the second corner portion 1142-2 in a second diagonal direction, the first side portion 1141-1 disposed between the first corner portion 1142-1 and the fourth corner portion 1142-4, the second side portion 1141-2 disposed between the second corner portion 1142-2 and the third corner portion 1142-3, the third side portion 1141-3 disposed between the first corner portion 1142-1 and the second corner portion 1142-2, and the fourth side portion 1141-4 disposed between the third corner portion 1142-3 and the fourth corner portion 1142-4.

For example, each of the first to fourth side surfaces (or the first to fourth outer surfaces) of the housing 1140 may be a side surface or an outer surface of a corresponding one of the first to fourth side portions 1141-1 to 1141-4 of the housing 1140.

Each of the first to fourth side portions 1141-1 to 1141-4 of the housing 1140 may be disposed parallel to a corresponding one of the side plates of the cover member 1300.

The housing 1140 may have a first opening 1017a formed in the first corner portion 1141-1 of the housing 1140 and a second opening 1017b formed in the third corner portion 1142-3 of the housing 1140 for mounting the first and second magnets 1130-1 and 1130-2.

Although each of the first opening 1017a and the second opening 1017b may have a through-hole shape, which is formed through a corresponding one of the first and third corner portions 1142-1 and 1142-3, in FIG. 17, the disclosure is not limited thereto. In another embodiment, the housing 1140 may have seating grooves formed in the first and third corner portions 1142-1 and 1142-3 for mounting the first and second magnets 1130-1 and 1130-2.

For example, the first opening 1017a may be formed in the third corner portion 1142-3, in a region of the second side portion 1141-2, and in a region of the third side portion 1141-3 of the housing 1140, which are adjacent to the first corner portion 1142-1.

For example, the second opening 1017b may be formed in the third corner portion 1142-3, in a region of the second side portion 1141-2, and in a region of the fourth side portion 1141-4 of the housing 1140, which are adjacent to the third corner portion 1142-3.

In order to prevent the first magnet 1130-1 mounted in the first opening 1017a and the second magnet 1130-2 mounted in the second opening 1017b from being separated toward the inside of the housing 1140, the housing 1140 may include a stopper (not shown) at at least one inner surface of the side portions 1141-1 to 1141-4.

Furthermore, an adhesive member for bonding or attaching the first magnet 1130-1 and the second magnet 1130-2 to the housing 1140 may be disposed between the housing 1140 and the first and second magnets 1130-1 and 1130-2.

In order to prevent the housing 1140 from directly colliding with the inner surface of the upper plate of the cover member 1300, the housing 1140 may include a stopper 1142 provided at the upper portion, the upper surface or the upper end thereof.

For example, although the stopper 1143 may be disposed on the upper surface of at least one of the first to fourth side portions 1142-1 to 1142-4 of the housing 1140, the disclosure is not limited thereto.

The housing 1140 may include at least one protrusion 1144, which is provided at the upper portion, the upper surface or the upper end of the housing 1140 so as to be coupled to the hole in the first outer frame 1152 of the upper elastic member 1150. For example, although the at least one protrusion 1144 may be disposed on the upper surface of at least one of the first to fourth corner portions 1142-1 to 1142-4, the disclosure is not limited thereto.

Referring to FIG. 18, the housing 1140 may include at least one protrusion 1147, which is provided at the lower portion, the lower surface or the lower end of the housing 1140 so as to be coupled or secured to the hole 162a in the second outer frame 1162 of the lower elastic member 1160.

In order to prevent the lower surface or the bottom of the housing 1140 from colliding with the base 1210, which will be described later, the housing 1140 may include at least one stopper (not shown) projecting from the lower portion, the lower surface or the lower end thereof.

A guide groove 1148, which corresponds to a projection 1216 of the base 1210, may be provided at the lower portion, the lower end or the lower surface of at least one of the first to fourth corner portions 1142-1 to 1142-4 of the housing 1140.

For example, using an adhesive member, the guide groove 1148 in the housing 1140 may be coupled to the projection 1216 of the base 1210, and the housing 1140 may thus be coupled to the base 1210.

In order to avoid spatial interference with the portion at which the first frame connector 1153 of the upper elastic member 1150 is connected to the first outer frame 151, the housing 1140 may have an upper escape groove (not shown) formed in the upper portion, the upper surface or the upper end of at least one of the first to fourth side portions 1141-1 to 1141-4.

Furthermore, in order to avoid spatial interference with the portion at which the second frame connector 1163 of the lower elastic member 1160 is connected to the second outer frame 161, the housing 1140 may have a lower escape groove (not shown) formed in the lower portion, the lower surface or the lower end of at least one of the first to fourth side portions 1141-1 to 1141-4.

For injection of dampers 1015a and 1015b, the housing 1140 may have damper application grooves 1022a and 1022b formed in the lower portion, the lower surface or the lower end of at least one of the first to fourth side portions 1141-1 to 1141-4.

For example, the damper application grooves 22a and 22b may be formed in the first and second side portions 1141-1 and 1141-2 of the housing 1140, which face each other.

For seating of the circuit board 1190, the housing 1140 may have a seating groove 1013a formed in one of the side portions 1141-1 to 1141-4.

In order to mount the position sensor 1170 on the housing 1140, the housing 1140 may include a seating portion 1017c formed in one of the side portions 1141-1 to 1141-4.

For example, the seating portion 1017c may be formed in the seating groove 1013a in the housing 1140. Although the seating portion 1017c may be configured to have an opening or a through hole formed through the first side portion 1141-1 of the housing 1140 in FIG. 17, the disclosure is not limited thereto. In another embodiment, the seating portion may be configured to have the form of a recess in which the position sensor 1170 is seated. Although the seating portion 1017c may have a shape corresponding to or coinciding with that of the position sensor 1170, the disclosure is not limited thereto.

Next, the first and second magnets 1130-1 and 1130-2 will be described.

The first and second magnets 1130-1 and 1130-2 may be disposed on two diametrically opposed corner portions, among the corner portions 1142-1 to 1142-4 of the housing 1140.

For example, the first magnet 1130-1 may be fitted or disposed in the first opening 1017a formed in the first corner portion 1142-1 of the housing 1140, and at least a portion of the first magnet 1130-1 may be exposed through the first opening 1017a in the outer surface of the housing 1140.

The second magnet 1130-2 may be fitted or disposed in the second opening 1017b formed in the third corner portion 1142-3 of the housing 1140, and at least a portion of the second magnet 1130-2 may be exposed through the second opening 1017b in the outer surface of the housing 1140.

Each of the first and second magnets 1130-1 and 1130-2 may have a polygonal shape, which is easy to seat in the corner portions of the housing 1140.

For example, although the cross section of each of the first and second magnets 1130-1 and 1130-2 in a direction perpendicular to the optical axis may have a triangular shape (for example, an isosceles triangular shape), the disclosure is not limited thereto. In another embodiment, the cross section may have a trapezoidal shape.

For example, the two remaining side surfaces of each of the first and second magnets 1130-1 and 1130-2, excluding the first surface that faces the coil 1120, may differ from each other in crosswise length.

For example, the crosswise length M (see FIG. 24) of the first magnet 1130-1 or the second 1130-2 may gradually decrease moving toward the corner portion 1142-1 or 1142-3 of the housing 1140, at which the first magnet 1140-1 or the second magnet 1130-2 is disposed, from the center of the housing 1140.

Here, the crosswise direction may be a direction parallel to the crosswise direction of the one side surface of the first magnet 1130-1 or the second magnet 1130-2 that faces the coil 1120.

Each of the first and second magnets 1130-1 and 1130-4 may be integrally formed, and may be oriented such that the first surface of the magnet that faces the coil 1120 is the S pole and the second surface opposite the first surface is the N pole. However, the disclosure is not limited thereto, and the first surface of each of the first and second magnets 1130-1 and 1130-2 may be the N pole and the second surface may be the S pole in another embodiment.

The first and second magnets 1130-1 and 1130-2 may be disposed or mounted only on the first and third corner portions 1142-1 and 1142-3 of the housing 1140 but not on the second and fourth corner portions 1142-2 and 1142-4 of the housing 1140.

Next, the position sensor 1170 and the circuit board 1190 will be described.

The circuit board 1190 and the position sensor 1170 may be disposed on one of the side portions of the housing 1140. For example, the circuit board 1190 and the position sensor 1170 may be disposed on the first side portion 1141-1 or the second side portion 1141-2 of the housing 1140.

For example, the circuit board 1190 and the position sensor 1170 may be disposed on the first side surface (or the first outer surface) of the housing 1140 or the second side surface (or the second outer surface) of the housing 1140.

For example, the circuit board 1190 may be disposed in the seating groove 1013a formed in the first side portion 1141-1 of the housing 1140. In order to secure the circuit board 1190 to the housing 1140, an adhesive member may be disposed between the circuit board 1190 and the first side portion 1141-1 of the housing 1140. The circuit board 1190 may have a hole (or a protrusion), and the housing 1140 may have a protrusion (or a hole) to be coupled to the hole (or the protrusion) of the circuit board 1190.

The circuit board 1190 may include a first surface to which the position sensor 1170 is mounted or disposed, a second surface opposite the first surface, and a plurality of terminals 191- to 19-4 disposed on the second surface of the circuit board 1190 so as to be conductively connected to external components.

For example, although the plurality of terminals 19-1 to 19-4 may be arranged in a row at the lower end of the second surface of the circuit board 1190, the disclosure is not limited thereto.

Although the circuit board 1190 includes four terminals 19-1 to 19-4 in the embodiment shown in FIG. 14, the disclosure is not limited thereto. In another embodiment, the number of terminals may be five or more.

The circuit board 1190 may include a circuit pattern or wires for conductively connecting the position sensor 1170 to the terminals 19-1 to 19-4.

The position sensor 1170 may be mounted or disposed on the first surface of the circuit board 1190, for example, the first surface of the upper portion S11 (see FIG. 22) of the circuit board 1190.

The position sensor 1170 may be disposed in the seating portion 1017*c* formed in the first side portion 1141-1 of the housing 1140.

At the initial position of the bobbin 1110, the position sensor 1170 disposed on the housing 1140 may overlap the sensing magnet 1180 in a direction toward the second side surface or the second side portion 1141-2 of the housing 1140 from the first side surface or the first side portion 1141-1 of the housing 1140; however, the disclosure is not limited thereto.

Referring to FIGS. 19 and 20, at the initial position of the bobbin 1110, the height of the upper surfaces (or the upper ends) of the first and second magnets 1130-1 and 1130-2 may be equal to or higher than the height of the upper surface or the upper end of the coil 1120; however, the disclosure is not limited thereto.

At the initial position of the bobbin 1110, the height of the upper surface (or the upper end) of the position sensor 1170 may be equal to or lower than the height of the upper surface (or the upper end) of the sensing magnet 1180; however, the disclosure is not limited thereto.

Although the height of the upper surface (or the upper end) of the coil 1120 may be equal to or lower than the height of the upper surface (or the upper end) of the sensing magnet 1180, the disclosure is not limited thereto.

In another embodiment, at the initial position of the bobbin 1110, the position sensor 1170 may not overlap the sensing magnet 1180 in a direction toward the second side surface or the second side portion 1141-2 of the housing 1140 from the first side surface or the first side portion 1141-1 of the housing 1140.

At the initial position of the bobbin 1110, the position sensor 1170 disposed on the housing 1140 may not overlap the balancing magnet 1180 in a direction toward the second side surface or the second side portion 1141-2 of the housing 1140 from the first side surface or the first side portion 1141-1 of the housing 1140; however, the disclosure is not limited thereto. In another embodiment, the position sensor and the balancing magnet may overlap each other.

At the initial position of the bobbin 1110, the position sensor 1170 disposed on the housing 1140 may not overlap the coil 1120 in a direction toward the second side surface or the second side portion 1141-2 of the housing 1140 from the first side surface or the first side portion 1141-1 of the housing 1140.

At the initial position of the bobbin 1110, the position sensor 1170 disposed on the housing 1140 may not overlap the first magnet 1130-1 in a direction toward the second side surface or the second side portion 1141-2 of the housing 1140 from the first side surface or the first side portion 1141-1 of the housing 1140.

At the initial position of the bobbin 1110, the position sensor 1170 disposed on the housing 1140 may overlap the second magnet 1130-2 in a direction toward the second side surface or the second side portion 1141-1 of the housing 1140 from the first side surface or the first side portion 1141-1 of the housing 1140.

The position sensor 1170 may detect the intensity of a magnetic field of the sensing magnet 1180 mounted on the bobbin 1110 when the bobbin 1110 is moved, and may output an output signal (for example, an output voltage) corresponding to the detected intensity.

The position sensor 1170 may be embodied as a drive including a hall sensor. The description of the position sensor 170 shown in FIG. 6C may be applied to the position sensor 1170.

The position sensor 1170 may include first to fourth terminals for sending and receiving a clock signal SCL, a data signal SDA, and power signals VDD and GND, and fifth and sixth terminals for providing a drive signal to the coil 1120.

The circuit board 1190 may be conductively connected to the first to sixth terminals (not show) of the position sensor 1170, and may include a first terminal or a first connecting terminal 1006*a*, conductively connected to the fifth terminal of the position sensor 1170, and a second terminal or a second connecting terminal 1006*a*, conductively connected to the sixth terminal of the position sensor 1170.

Each of the first to fourth terminals of the position sensor 1170 may be conductively connected to a corresponding one of the terminals 19-1 to 19-4 of the circuit board 1190.

Each of the fifth and sixth terminals of the position sensor 1170 may be conductively connected to a corresponding one of the first and second connecting terminals 1006*a* and 1006*b* of the circuit board 1190.

The first and second connecting terminals 1006*a* and 1006*b* of the circuit board 1190 may be coupled to the bonding portions 1061*a* and 1061*b* of a corresponding one of the first and second lower springs 1160*a* and 1160*b*, and may be conductively connected thereto. In other words, the position sensor 1170 may provide a drive signal to the coil 1120 via the first and second connecting terminals 1006*a* and 1006*b*.

In another embodiment, the position sensor 1170 may be embodied by only a single position detection sensor, such as a hall sensor or the like. In this case, the circuit board 1190 may include four terminals for driving the position sensor 1170, which is embodied only by a location detection sensor, and two terminals for providing drive signals for driving the coil 1120.

Next, the upper elastic member 1150 and the lower elastic member 1160 will be described.

Figure 21:
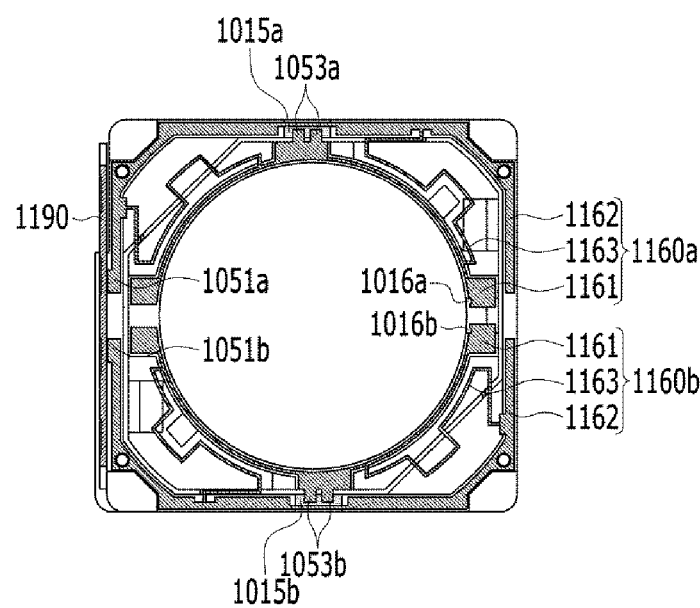
FIG. 21 is a bottom view of the lower elastic member and the circuit board coupled to the housing.
Figure 22:
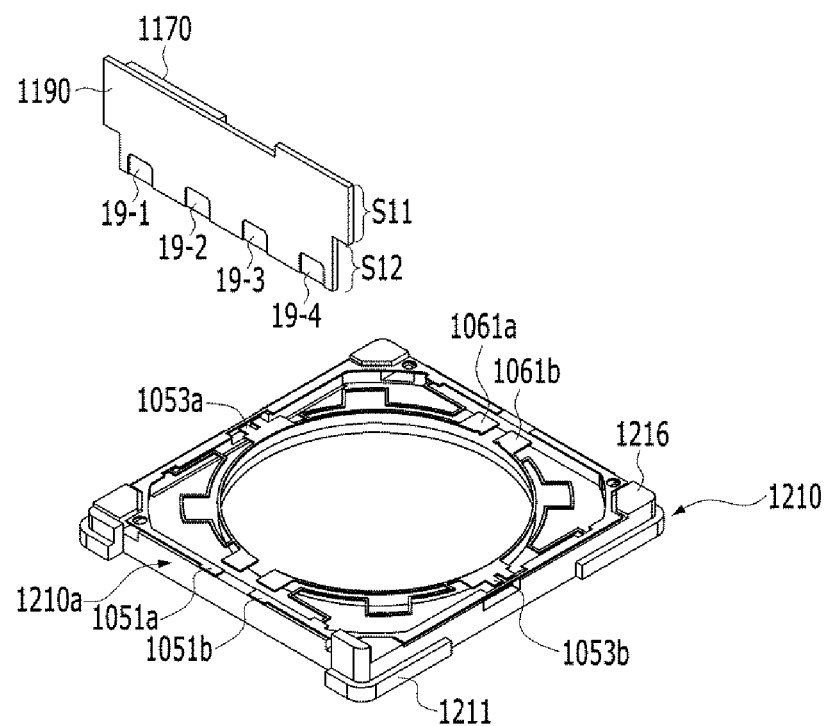
FIG. 22 is a view illustrating the lower elastic member, the base, and the circuit board.

FIG. 21 is a bottom view of the lower elastic member 1160 and the circuit board 1190, which are coupled to the housing 1140. FIG. 22 illustrates the lower elastic member 1160, the base 1210, and the circuit board 1190.

Referring to FIGS. 14, 21 and 22, the upper elastic member 1150 and the lower elastic member 1160 may be coupled both to the bobbin 1110 and to the housing 1140 so as to support the bobbin 1110.

For example, the upper elastic member 1150 may be coupled to the upper portion, the upper surface or the upper end of the bobbin 1110 and the upper portion, the upper surface or the upper end of the housing 1140, and the lower elastic member 1160 may be coupled to the lower portion, the lower surface or the lower end of the bobbin 1110 and the lower portion, the lower surface or the lower end of the housing 1140.

At least one of the upper elastic member 1150 and the lower elastic member 1160 may be divided or separated into two or more members.

For example, the lower elastic member 1160 may include a first spring (or a first lower spring) 1160a and a second spring (a second lower spring) 1160b, which are spaced apart from each other.

Although each of the upper elastic member 1150 and the lower elastic member 1160 may be embodied as a leaf spring, the disclosure is not limited thereto, and each member may also be embodied as a coil spring, a suspension wire, or the like.

The upper elastic member 1150 may include a first inner frame 1151 coupled to the upper portion, the upper surface or the upper end of the bobbin 1110, a first outer frame 1152 coupled to the upper portion, the upper surface or the upper end of the housing 1140, and a first frame connector 1153 connecting the first inner frame 1151 to the first outer frame 1152.

The first inner frame 1151 of the upper elastic member 1150 may include a first coupling region 151 coupled to the first coupler 1115 of the bobbin 1110. Although the first coupling region 151 may have a flat surface, a hole, or a groove shape, the disclosure is not limited thereto.

The first outer frame 1152 of the upper elastic member 1150 may include a second coupling region coupled to the protrusion 1144 of the housing 1140. Although the second coupling region may have a hole, a groove or a flat surface shape, the disclosure is not limited thereto.

For example, the upper elastic member 1150 may include four first frame connectors 153, and the four first frame connectors may be positioned so as to correspond to the first to fourth corner portions 1142-1 to 1142-4 of the housing 1140.

The first and second lower springs 1160a and 1160b may be coupled to the bobbin 1110.

The first and second lower springs 1160a and 1160b may be coupled both to the bobbin 1110 and to the housing 1140.

The first and second lower springs 1160a and 1160b may be disposed between the bobbin 1110 and the base 1210.

At least one of the first and second lower springs 1160a and 1160b may include the second inner frame 1161 coupled to the lower portion, the lower surface or the lower end of the bobbin 1110, a second outer frame 1162 coupled to the lower portion, the lower surface or the lower end of the housing 1140, and a second frame connector 1163 connecting the second inner frame 1161 to the second outer frame 1162.

The second inner frame 1161 of at least one of the first and second lower springs 1160a and 1160b may include a coupling region, which is coupled to the second couplers 1031a and 1031b of the bobbin 1110 using solder or a conductive adhesive member.

The second outer frame 1162 of at least one of the first and second lower springs 1160a and 1160b may have at least one hole coupled to the protrusion 1147 of the housing 1140.

For example, the second outer frame 1162 of the first lower spring 1160a may be disposed on the lower portion or the lower surface of a region of the first side portion 1141-1 of the housing 1140, the lower portion or the lower surface of the fourth corner portion 1142-4, the lower portion or the lower surface of the fourth side portion 1141-4 of the housing 1140, the lower portion or the lower surface of the third corner portion 1142-3, and the lower portion or the lower surface of a region of the second side portion 1141-2.

Referring to FIG. 22, the second outer frame 1162 of the first lower spring 1160a may include a first bonding portion 1061a, coupled to one end of the coil 1120, and a second bonding portion 1051a, coupled to the first connecting terminal (or the first terminal) 1006a of the circuit board 1190.

For example, the first bonding portion 1061a may be provided at one end of the second outer frame 1162 of the first lower spring 1160a, and the second bonding portion 1051a may be provided at the other end of the second outer frame 1162 of the first lower spring 1160a.

For example, the first bonding portion 1061a may be positioned at the lower surface or the lower portion of the second side portion 1141-2 of the housing 1140, and the second bonding portion 1051a may be positioned at the lower surface or the lower portion of the first side portion 1141-1 of the housing 1140.

For example, the second bonding portion 1051a may have a structure projecting toward the circuit board 1190 from the outer surface of the second outer frame positioned at the first side portion 1141-1 in order to facilitate coupling to the first connecting terminal 1006a of the circuit board 1190.

For example, the second outer frame 1162 of the second lower spring 1160b may be disposed on the lower portion or the lower surface of another region of the first side portion 1141-1 of the housing 1140, the lower portion or the lower surface of the first corner portion 1142-1, the lower portion or the lower surface of the third side portion 1141-3 of the housing 1140, the lower portion or the lower surface of the second corner portion 1142-2 of the housing 1140, and the lower portion or the lower surface of another region of the second side portion 1141-2 of the housing 1140.

The second outer frame 1162 of the second lower spring 1160b may include the third bonding portion 1061b coupled to the other end of the coil 1120 and the fourth bonding portion 1051b coupled to the second connecting terminal 1006b of the circuit board 1190.

For example, the third bonding portion 1061b may be provided at one end of the second outer frame 1162 of the second lower spring 1160b, and the fourth bonding portion 1051b may be provided at the other end of the second outer frame 1162 of the second lower spring 1160b.

For example, the third bonding portion 1061b may be positioned at the lower surface or the lower portion of the second side portion 1141-2 of the housing 1140, and the fourth bonding portion 1051b may be positioned at the lower surface or the lower portion of the first side portion 1141-1 of the housing 1140.

For example, the fourth bonding portion 1051b may have a structure projecting toward the circuit board 1190 from the outer surface of the second outer frame 1162 positioned at the first side portion 1141-1 of the housing 1140 in order to facilitate coupling to the second connecting terminal 1006b of the circuit board 1190.

Each of the second bonding portion 1051a and the fourth bonding portion 1051b may project toward the outer surface from the inner surface of the first side portion 1141-1 of the housing 1140.

The second bonding portion 1051a and the fourth bonding portion 1051b may be spaced apart from each other and may be symmetrical with respect to a central line; however, the disclosure is not limited thereto. The central line may be a line that extends through the center of the bore in the housing 1140 and is parallel to a direction toward the second side portion 1141-2 from the first side portion 1141-1.

Using solder or a conductive adhesive, one end of the coil 1120 may be coupled to the first bonding portion 1061a of the first lower spring 1160a, and the other end of the coil 1120 may be coupled to the third bonding portion 1061b of the second lower spring 1160b.

For example, the first bonding portion 1061a may have therein a first guide groove 1016a, configured to guide one end of the coil 1120, and a second guide groove 1016b, configured to guide the other end of the coil 1120.

By virtue of the first to fourth bonding portions 1061a, 1051a, 1061b and 1051b, one drive signal may be provided to the coil 1120 from the circuit board 1190.

Each of the first frame connector 1153 and the second frame connector 1163, 1163-1 and 1163-2 of the upper elastic member 1150 and the lower elastic member 1160 may be bent or curved (or formed into a curved line) at least once so as to define a predetermined pattern. The upward and/or downward movement of the bobbin 1110 in the first direction may be flexibly (or elastically) supported through changes of position and fine deformation of the first and second frame connectors 1153 and 1163.

The first lower spring 1160a may include a first extension portion 1053a, which is connected to the second inner frame 1161 of the first lower spring 1160a and corresponds to the first damper application groove 1022a in the housing 1140.

The first extension portion 1053a may extend toward the first damper application groove 1022a in the housing 1140 from a region of the second inner frame 1161 of the first lower spring 1160a.

The first extension portion 1053a may be positioned in the first damper application groove 1022a, and a damper 1015a may be disposed between the first damper application groove 1022a and the first extension portion 1053a.

The second lower spring 1160b may include a second extension portion 1053b, which is connected to the second inner frame 1161 of the second lower spring 1160b and corresponds to the second damper application groove 1022b in the housing 1140.

Although each of the first and second extension portions 1053a and 1053b may include two protrusions, the disclosure is not limited thereto. In another embodiment, each of the first and second extension portions 1053a and 1053b may include one or more protrusions.

The second extension portion 1053b may extend toward the second damper application groove 1022b in the housing 1140 from a region of the second inner frame 1161 of the second lower spring 1160b.

The second extension portion 1053b may be positioned in the second damper application groove 1022b, and a damper 1015b may be disposed between the second damper application groove 1022b and the second extension portion 1053b.

The dampers 1015a and 1015b may serve to absorb and dampen vibrations of the bobbin 1110.

In order to absorb and dampen vibrations of the bobbin 1110, the lens moving apparatus 1100 may further include a damper (not shown) disposed between the upper elastic member 1150 and the housing 1140.

For example, the damper (not shown) may further be disposed in the space between the first frame connector 1153 of the upper elastic member 1150 and the bobbin 1110 (or the housing 1140).

For example, the lens moving apparatus 1000 may further include a damper (not shown) disposed between the second frame connector 1163 of each of the first and second lower springs 160a and 160b and the bobbin 1110 (or the housing 1140).

For example, a damper (not shown) may further be disposed between the inner surface of the housing 1140 and the outer surface of the bobbin 1110.

In another embodiment, the lower elastic member 160 of the lens moving apparatus 100 may be identically applied or similarly applied in place of the lower elastic member 1160 of the lens moving apparatus 1000. In a further embodiment, the lower elastic member 1160 of the lens moving apparatus 1000 may be identically applied or similarly applied in place of the lower elastic member 160 of the lens moving apparatus 100.

Next, the base 1210 will be described.

Referring to FIGS. 21 and 22, the base 1210 may include a bore corresponding to the bore in the bobbin 1110 and/or the bore in the housing 1140, and may be configured to have a shape corresponding to the cover member 1300, for example, a square shape.

The base 1210 may include a step 1211 formed in the lower end of the side surface, to which an adhesive is applied when the cover member 1300 is adhesively secured. Here, the step 1211 may guide the cover member 1300 coupled thereon, and may face the lower end of the side plate of the cover member 1300. An adhesive member or a sealing member may be disposed or applied between the lower end of the side plate of the base 1210 and the step 1211 in the base 1210.

The base 1210 may be disposed below the bobbin 1110 and the housing 1140.

For example, the base 1210 may be disposed below the lower elastic member 1160.

The corners of the upper surface of the base 1210 may be provided with projections 1216 corresponding to the guide grooves 1148 in the housing 1140. Although each of the projections 1216 may have, for example, a polygonal column shape projecting from the upper surface of the base 1210 perpendicularly to the upper surface of the base 1210, the disclosure is not limited thereto.

The projections 1216 may be fitted into the guide grooves in the housing 1140, and may be fastened or coupled to the guide grooves 1148 using an adhesive member such as epoxy or silicone (not shown).

The base 1210 may include a seating groove 1210a, which is formed in the side surface thereof that corresponds to the circuit board 1190 and to which the lower end of the circuit board 1190 is mounted.

For example, the seating groove 1210a may be formed in the side surface of the base 1210 that corresponds to the first side portion 1141-1 of the housing 1140.

Figure 23:
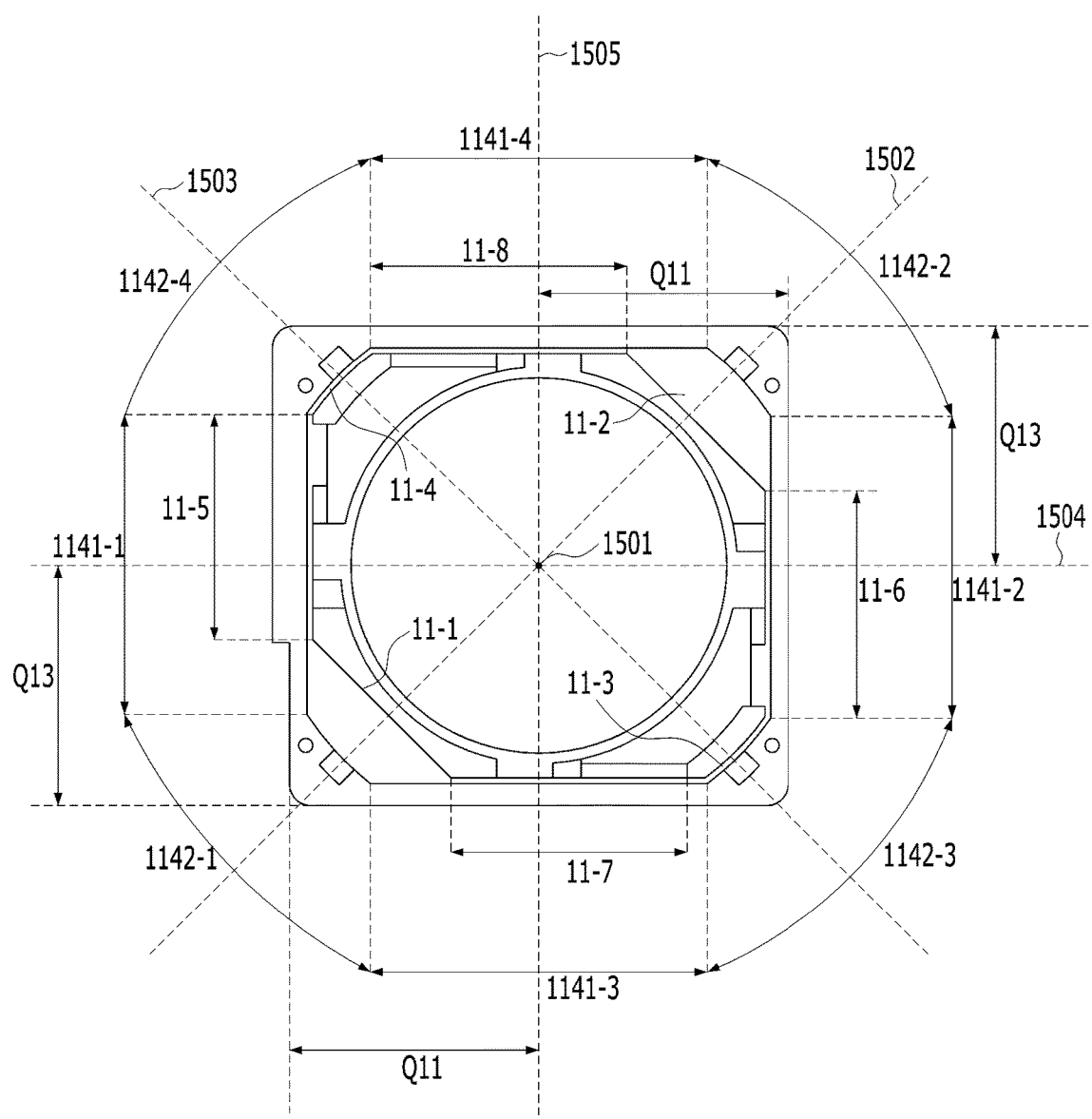
FIG. 23 is a plan view of the bobbin and the housing shown in FIG. 14.

Referring to FIGS. 20 and 23, the circuit board 1190 may include the upper part S11 and the lower part S12. The horizontal length of the lower part S12 may be smaller than the horizontal length of the upper part S11.

The upper part S11 of the circuit board 1190 may be disposed in the seating groove 1013a in the housing 1140. The lower part S12 of the circuit board 1190 may project downwards from the lower portion or the lower surface of the housing 1140, and may be disposed in the seating groove 1210a in the base 1210.

The terminals 19-1 to 19-4 may be disposed on the second surface of the lower part S2 of the circuit board 1190. The first surface of the lower part S12 of the circuit board 1190 may be provided with the first and second connecting terminals 1006a and 1006b, to which the second bonding portion 1051a and the fourth bonding portion 1051b are bonded.

Next, the cover member 1300 will be described.

The cover member 1300 accommodates other components 1110, 1120, 1130-1, 1130-2, 1140, 1150, 1160, 1170, 1180, 1185 and 1190 in the space defined between the cover member 1300 and the base 1210.

The cover member 1300 may be configured to have a box shape, which is open at the lower face thereof and includes the upper plate and the side plates. The lower ends of the side plates of the cover member 1300 may be coupled to the upper portion of the base 1210. The upper plate of the cover member 1300 may have a polygonal shape, for example, a square shape, an octagonal shape, or the like. The upper plate of the cover member 1300 may have a bore through which a lens (not shown) is exposed to external light.

The cover member 1300 may be made of a nonmagnetic material such as stainless steel or plastic in order to prevent the cover member 1300 from being attracted to the magnets 1130-1 and 1130-2; however, the disclosure is not limited thereto.

Figure 24:
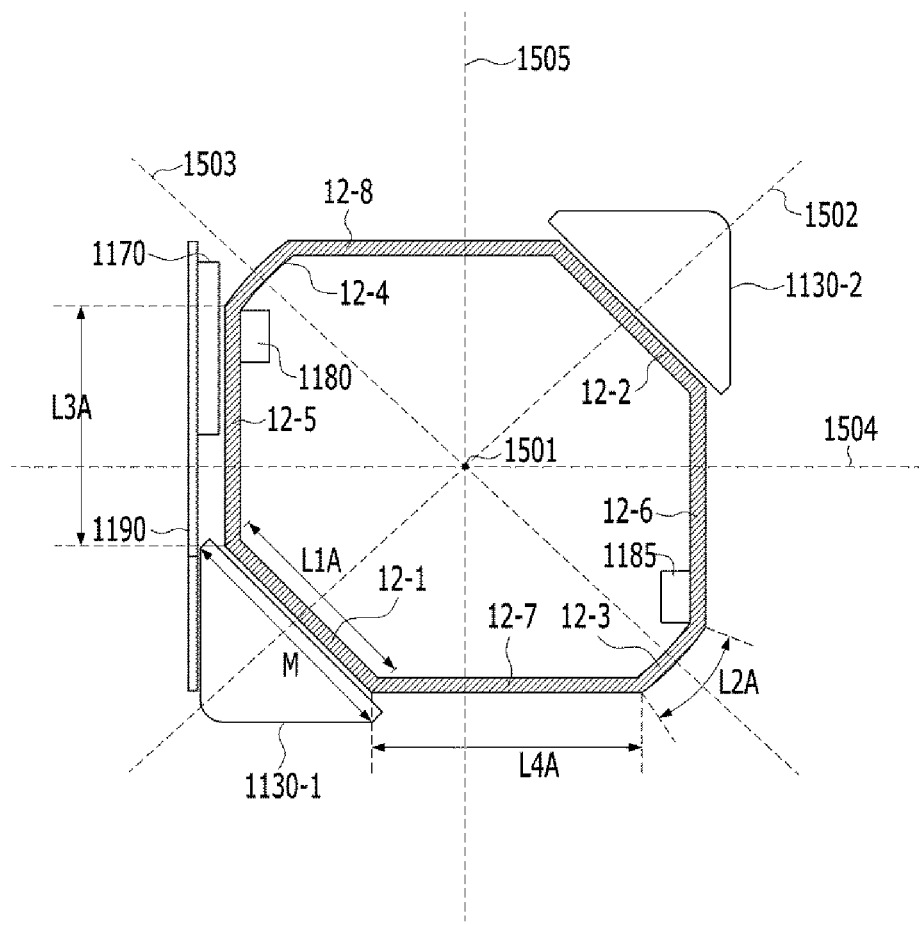
FIG. 24 is a view illustrating the disposition of the coil, the first magnet, the second magnet, the circuit board, the position sensor, the sensing magnet, and the balancing magnet.

FIG. 23 is a plan view of the bobbin 1110 and the housing 1140 shown in FIG. 14. FIG. 24 illustrates disposition of the coil 1120, the first magnet 1130-1, the second magnet 1130-2, the circuit board 1190, the position sensor 1170, the sensing magnet 1180 and the balancing magnet 1185. FIG. 25 illustrates the bobbin 1110, the first magnet 1130-1, the second magnet 1130-2, the circuit board 1190, and the position sensor 1170.

Referring to FIG. 23, the bobbin 1110 may include a first side surface 11-1 of the side portion 1110c-1 corresponding to the first corner portion 1142-1 of the housing 1140, a third side surface 11-3 of the side portion 1110c-3 corresponding to the second corner portion 1142-2 of the housing 1140, a second side surface 11-2 of the side portion 1110c-2 corresponding to the third corner portion 1142-3 of the housing 1140, a fourth side surface 11-4 of the side portion 1110c-4 corresponding to the fourth corner portion 1142-4 of the housing 1140, a fifth side surface 11-5 of the side portion 1110b-1 corresponding to the first side portion 1141-1 of the housing 1140, a sixth side surface 11-6 of the side portion 1110b-2 corresponding to the second side portion 1141-2 of the housing 1140, a seventh side surface 11-7 of the side portion 1110b-3 corresponding to the third side portion 1141-3 of the housing 1140, and an eighth side surface 11-8 of the side portion 1110b-4 corresponding to the fourth side portion 1141-4 of the housing 1140.

The first side surface 11-1 and the second side surface 11-2 of the bobbin 1110 may face each other in a diagonal direction, and the third side surface 11-3 and the fourth side surface 11-4 of the bobbin 1110 may face each other in a diagonal direction.

For example, a first diagonal direction 1502 may be a direction toward the third corner portion (or the third corner) 1142-3 from the first corner portion (or the first corner) 1142-1 through the center 150-1 of the housing 1140.

For example, a second diagonal direction 1503 may be a direction toward the fourth corner portion (or the fourth corner) 1142-4 from the second corner portion (or the second corner) 1142-2 through the center 1501 of the housing 1140.

For example, the surface area (or the crosswise length) of the first side surface 11-1 or the second side surface 11-2 of the bobbin 1110 may be larger than the surface area (or the crosswise length) of the third side surface 11-3 or the fourth side surface 11-4 of the bobbin 1110.

For example, the surface area (or the crosswise length) of the first side surface 11-1 of the bobbin 1110 may be equal to the surface area (or the crosswise length) of the second side surface 11-2 of the bobbin 1110.

For example, the surface area (or the crosswise length) of the third side surface 11-3 of the bobbin 1110 may be equal to the surface area (or the crosswise length) of the fourth side surface 11-4 of the bobbin 1110.

For example, the surface area (or the crosswise length) of the fifth side surface 11-5 or the sixth side surface 11-6 of the bobbin 1110 may be larger than the surface area (or the crosswise length) of the first side surface 11-1 or the second side surface 11-2 of the bobbin 1110.

For example, the surface area (or the crosswise length) of the fifth side surface 11-5 of the bobbin 1110 may be equal to the surface area (or the crosswise length) of the sixth side surface 11-6 of the bobbin 1110.

For example, the surface area (or the crosswise length) of the seventh side surface 11-7 or the eighth side surface 11-8 of the bobbin 1110 may be larger than the surface area (or the crosswise length) of the fifth side surface 11-5 or the sixth side surface 11-6 of the bobbin 1110.

For example, the surface area (or the crosswise length) of the seventh side surface 11-7 of the bobbin 1110 may be equal to the surface area (or the crosswise length) of the eighth side surface 11-8 of the bobbin 1110.

Each of the first to eighth side surfaces 11-1 to 11-8 of the bobbin 1110 may have a flat surface or a curved surface. In this case, the above relationships in surface area may be similarly applied to the individual side surfaces. For example, when the third side surface 11-3 and the fourth side surface 11-4 of the bobbin 1110 are curved surfaces, the surface areas or the crosswise lengths of the curved surfaces may be the same as above.

One end of the first side surface 11-1 of the bobbin 1110 may correspond to or face a portion of the first side portion 1141-1 of the housing 1140, and the other end of the first side surface 11-1 of the bobbin 1110 may correspond to or face a portion of the third side portion 1141-3 of the housing 1140.

Furthermore, one end of the second side surface 11-2 of the bobbin 1110 may correspond to or face a portion of the second side portion 1141-2 of the housing 1140, and the other end of the second side surface 11-2 of the bobbin 1110 may correspond to or face a portion of the third side portion 1141-3 of the housing 1140.

The side surfaces of the bobbin 1110 may be symmetrical with respect to a first diagonal line, which is a line in the first diagonal direction 1502. Furthermore, the side surfaces of the bobbin 1110 may be symmetrical with respect to a second diagonal line, which is a line in the second diagonal direction 1503.

When the bobbin 1110 is viewed from above, the side surfaces of the bobbin 1110 may be asymmetrical with respect to a first central line 1504. For example, the first central line 1504 may be a line toward the second side portion 1141-2 of the housing 1140 from the first side portion 1141-1 of the housing 1140 through the center 1501 of the housing 1140.

When the bobbin 1110 is viewed from above, the side surfaces of the bobbin 1110 may be asymmetrical with respect to a second central line 1505. For example, the second central line 1505 may be a line toward the fourth side portion 1141-4 of the housing 1140 from the third side portion 1141-3 of the housing 1140 through the center 1501 of the housing 1140.

Referring to FIG. 24, the length L1A of each of portions 12-1 and 12-5 of the coil 1120 disposed on the side surfaces 11-1 and 11-2 of the bobbin 1110 corresponding to the first corner 1142-1 or the third corner 1142-2 of the housing is greater than the length L2A of each of other portions 12-2 and 12-6 of the coil 1120 disposed on other side surfaces 11-3 and 11-4 of the bobbin 1110 corresponding to the second corner 1142-2 or the fourth corner 1142-4 of the housing 1140 (L1A>L2A).

Furthermore, the surface area of each of portions 12-1 and 12-5 of the coil 1120 disposed on side surfaces 11-1 and 11-2 of the bobbin 1110 may be larger than the surface area of each of other portions 12-2 and 12-6 of the coil 1120 disposed on other side surfaces 11-3 and 11-4 of the bobbin 1110.

For example, the ratio (L2A:L1A) of the second length L2A (or the second surface area) of each of the other portions 12-2 and 12-6 of the coil 1120 to the first length L1A (or the first surface area) of each of the portions 12-1 and 12-5 of the coil 1120 may be 1:2~1:4. For example, the ratio (L2A:L1A) may be 1:2.5~1:3.5.

Because the first length L1A decreases when the value (L1A/L2A) obtained by dividing the first length L1A by the second length L2A is smaller than 2, the electromagnetic force as a result of the interaction with the first and second magnets 1130-1 and 1130-2 may decrease, thereby decreasing the AF driving force.

Furthermore, because the size of the bore in the bobbin 1110 decreases when the value (L1A/L2A) obtained by dividing the first length L1A by the second length L2A exceeds 4, the diameter of a lens barrel mountable to the bobbin 1110 decreases, thereby making it impossible to realize a lens moving apparatus having a large lens aperture.

For example, the coil 1120 may include the first portion 12-1 disposed on the first side surface 11-1 of the bobbin 1110, the second portion 12-2 disposed on the side surface 11-2 of the bobbin 1110, the third portion 12-3 disposed on the third side surface 11-3 of the bobbin 1110, the fourth portion 12-4 disposed on the fourth side surface 11-4 of the bobbin 1110, the fifth portion 12-5 disposed on the fifth side surface 11-5 of the bobbin 1110, the sixth portion 12-6 disposed on the sixth side surface 11-6 of the bobbin 1110, the seventh portion 12-7 disposed on the seventh side surface 11-7 of the bobbin 1110, and the eighth portion 12-8 disposed on the eighth side surface 11-8 of the bobbin 1110.

For example, the length L1A (or the surface area) of the first portion 12-1 and the length (or the surface area) of the second portion 12-2 of the coil 1120 may be greater than the length L2A (or the surface area) of the third portion 12-3 and the length (or the surface area) of the fourth portion 12-4 (L1A>L2A).

For example, the length L3A (or the surface area) of the fifth portion 12-5 and the length (or the surface area) of the sixth portion 12-6 of the coil 1120 may be greater than the length L2A (or the surface area) of the third portion 12-3 and the length (or the surface area) of the fourth portion 12-4 (L3A>L2A).

For example, the length L4A (or the surface area) of the seventh portion 12-7 and the length (or the surface area) of the eighth portion 12-8 of the coil 1120 may be greater than the length L3A (or the surface area) of the fifth portion 12-5 and the length (or the surface area) of the sixth portion 12-6 (L4A>L3A).

For example, the first portion 12-1 and the second portion 12-2 of the coil 1120 may have the same length (or surface area), and the third portion 12-3 and the fourth portion 12-4 of the coil 1120 may have the same length or surface area. The fifth portion 12-5 and the sixth portion 12-6 of the coil 1120 may have the same length or surface area, and the seventh portion 12-7 and the eighth portion 12-8 of the coil 1120 may have the same length or surface area.

For example, the length L1A of the first portion 12-1 of the coil 1120 may be 2.5 mm~3 mm. For example, the length L1A of the first portion 12-1 of the coil 1120 may be 2.76 mm.

For example, the length L2A of the third portion 12-2 of the coil 1120 may be 0.75 mm~1.25 mm. For example, the length L2A of the third portion 12-3 of the coil 1120 may be 0.97 mm.

For example, the length L3A of the fifth portion 12-5 of the coil 1120 may be 3.1 mm~3.4 mm. For example, the length L3A of the fifth portion 12-5 of the coil 1120 may be 3.19 mm.

For example, the length L4A of the seventh portion 12-7 of the coil 1120 may be 3.5 mm~4 mm. For example, the length L4A of the seventh portion 12-7 of the coil 1120 may be 3.6 mm.

The coil 1120 may be symmetrical with respect to the first diagonal line, which is a line in the first diagonal direction 1502, and may be symmetrical with respect to the second diagonal line, which is a line in the second diagonal direction.

Furthermore, the coil 1120 may be asymmetrical with respect to the first central line 1504, and may be asymmetrical with respect to the second central line 1505.

Although the crosswise length of the first surface of the first magnet 1130-1 that faces the first portion 12-1 of the coil 1120 may be greater than the length L1A of the first portion 12-1 of the coil 1120, the disclosure is not limited thereto. In another embodiment, the two lengths may be the same.

Furthermore, although the crosswise length of the first surface of the second magnet 1130-2 that faces the second portion 12-2 of the coil 1120 may be greater than the length of the second portion 12-2 of the coil 1120, the disclosure is not limited thereto. In another embodiment, the two lengths may be the same.

At the initial position of the bobbin 1110, the position sensor 1170 may overlap the fourth portion 12-4 and the fifth portion 12-5 of the coil 1120 in a direction toward the second side portion 1141-2 from the first side portion 1141-1 of the housing 1140. Furthermore, at least a portion of the position sensor 1170 may overlap the second magnet 130-1 in a direction toward the second side portion 1141-2 of the housing 1140 from the first side portion 1141-1 of the housing 1140. By virtue of this disposition, it is possible to avoid spatial interference between the position sensor 1170 and the first magnet 1130-1 disposed on the first corner 1142-1 of the housing 1140.

One end of the first magnet 1130-1 may be disposed on the first side portion 1141-1 of the housing 1140, and the other end of the first magnet 1130-1 may be disposed on the third side portion 1141-3 of the housing 1140. One end of the second magnet 1130-2 may be disposed on the second side portion 1141-2 of the housing 1140, and the other end of the second magnet 1130-2 may be disposed on the fourth side portion 1141-4 of the housing 1140. Since each of the first and second magnets 1130-1 and 1130-2 extends toward the adjacent side portion of the housing 1140, it is possible to increase the surface area of the first surface of each of the first and second magnets 1130-1 and 1130-2 that face the first and second portions 12-1 and 12-2 of the coil 1120, and it is possible to increase the electromagnetic force.

Generally, the remaining portion of the side portion of the bobbin excluding the groove, which is formed in the bobbin so as to enable to the AF drive coil to be mounted therein, requires a minimum thickness to ensure durability and strength. Due to the minimum thickness of the side portion of the bobbin required to dispose the AF drive coil, the lens moving apparatus may be subjected a restriction on the size of the bore in which a lens is mounted, and it is thus difficult to realize an AF lens moving apparatus having a large lens aperture. For example, a large lens aperture may correspond to the case in which the diameter of the bore in the bobbin is equal to or greater than 5.8 mm.

When both the AF drive magnet and the AF position sensor are disposed on the side portion of the housing, it may be impossible to realize a lens moving apparatus having a large lens aperture. Particularly, because the drive IC-type AF position sensor has a larger size than the position sensor embodied only by a hall sensor, spatial interference may further restrict realization of a large lens aperture.

The embodiment is able to reduce the spatial interference between the bobbin 1110 and the AF position sensor by disposing the AF drive magnets 1130-1 and 1130-2 at only two corner portions of the housing 1140 and disposing the position sensor 1170 at the side portion of the housing 1140.

Referring to FIG. 12, the length K1 between the outer surface of the first side plate and the outer surface of the second side plate of the cover member 1300 may be greater than the length K2 between the outer surface of the third side plate and the outer surface of the fourth side plate of the cover member 1300 (K1>K2).

For example, the first side plate of the cover member 1300 may correspond to or face the first side portion 1141-1 of the housing 1140, and the second side plate of the cover member 1300 may correspond to or face the second side portion 1141-2 of the housing 1140. The third side plate of the cover member 1300 may correspond to or face the third side portion 1141-3 of the housing 1140, and the fourth side plate of the cover member 1300 may correspond to or face the fourth side portion 1141-4 of the housing 1140.

In the case where K1>K2, since the position sensor 1170 is disposed on the first side portion 1141-1 of the housing 1140 corresponding to the first side plate of the cover member 1300, the embodiment is able to ensure space for mounting the position sensor 1170, to avoid spatial interference between the position sensor and the bobbin 1110, and to realize a slim-sized lens moving apparatus having a thin shape which makes it easy to realize a large lens aperture.

Since two AF drive magnets 1130-1 and 1130-2 are disposed on two corners of the housing 1140, the embodiment is able to improve freedom in disposition of the position sensor and the like, to reduce manufacturing costs and to increase the electromagnetic force in the optical-axis direction.

For example, it is possible to increase the electromagnetic force by avoiding spatial interference with the position sensor 1170 while increasing the sizes of the first and second magnets 1130-1 and 1130-2.

Referring to FIGS. 23 and 25, the ratio (Q12:Q11) of the length Q12 of one side surface or the second surface 1008$a$ of the first magnet 1130-1 to half Q11 of the crosswise length of the third side portion 1141-3 of the housing 1140 may be 1:1.2~1:1.6.

For example, the ratio (Q12:Q11) of the length Q12 of one side surface or the second surface 1009$a$ of the second magnet 1130-2 to half Q11 of the crosswise length of the fourth side portion 1141-4 of the housing 1140 may also be the same as the above description.

For example, when Q11/Q12 exceeds 1.6, the sizes of the magnets 1130-1 and 1130-2 decreases excessively, making it impossible to ensure a desired electromagnetic force and to ensure driving force required for AF operation. When Q11/Q12 is less than 1.2, because the sizes of the magnets 1130-1 and 1130-2 increases excessively and spatial interference occurs between the magnets 1130-1 and 1130-2 and the bobbin 1110, it is impossible to realize a large lens aperture.

Furthermore, the ratio (Q14:Q13) of the length Q14 of another side surface or the third surface 1008$b$ of the first magnet 1130-1 to the half Q13 of the crosswise length of the first side portion 1141-1 of the housing 1140 may be 1:1.3~1:1.5.

For example, the ratio (Q14:Q13) of the length Q14 of another side surface or the third surface 1009$b$ of the second magnet 1130-2 to half Q13 of the crosswise length of the second side portion 1141-2 of the housing 1140 may also be the same as the above description.

For example, when Q13/Q14 exceeds 1.5, the sizes of the magnets 1130-1 and 1130-2 decreases excessively, making it impossible to ensure a desired electromagnetic force and to ensure driving force required for AF operation. When Q13/Q14 is less than 1.3, because the sizes of the magnets 1130-1 and 1130-2 increases excessively and spatial interference between the magnets 1130-1 and 1130-2 and the bobbin 1110 occurs, it is impossible to realize a large lens aperture.

Figure 26:
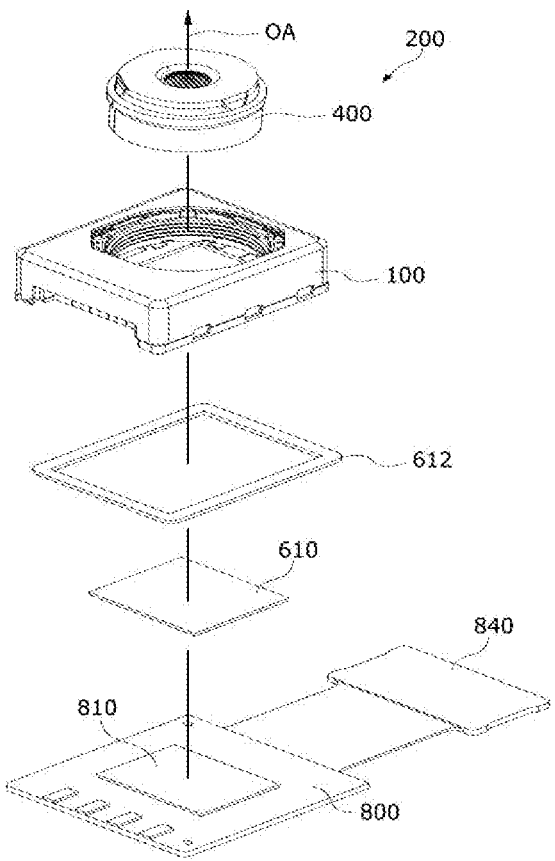
FIG. 26 is an exploded perspective view illustrating a camera module according to an embodiment.

FIG. 26 is an exploded perspective view illustrating a camera module 200 according to an embodiment.

Referring to FIG. 26, the camera module 200 may include a lens or a lens module 400, the lens moving apparatus 100, an adhesive member 612, a filter 610, a circuit board 800, an image sensor 810, and a connector 840.

The lens module 400 may include a lens and/or a lens barrel, and may be mounted in the bobbin 110, 1100 of the lens moving apparatus 100, 1000.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100, 1000 through threaded engagement. For example, the lens module 400 may be coupled to the lens moving apparatus 100, 1000 by means of an adhesive (not shown). The light that has passed through the lens module 400 may be radiated to the image sensor 810 through the filter 610.

The adhesive member 612 may couple or attach the base 210, 1210 of the lens moving apparatus 100, 1000 to the circuit board 800. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infraredlight-blocking filter may be manufactured by applying an infrared-light-blocking coating material to a plate-shaped optical filter such as a cover glass for protecting an imaging area.

The filter 610 may be disposed below the base 210, 1210 of the lens moving apparatus 100, 1000.

For example, the base 210, 1210 may be provided on the lower surface thereof with a mounting portion on which the filter 610 is mounted. In another embodiment, an additional sensor base, on which the filter 610 is mounted, may be provided.

The circuit board 800 may be disposed below the lens moving apparatus 100, 1000, and the image sensor 810 may be mounted on the circuit board 800. The image sensor 810 may receive an image included in the light introduced through the lens moving apparatus 100, 1000, and may convert the received image into an electrical signal.

The image sensor 810 may be positioned such that the optical axis thereof is aligned with the optical axis of the lens module 400. Accordingly, the image sensor may obtain the light that has passed through the lens module 400. The image sensor 810 may output the radiated light as an image. The image sensor 810 may be, for example, a CCD (charge coupled device), MOS (metal oxide semi-conductor), CPD or CID. However, the kind of the image sensor is not limited thereto.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device.

The lens moving apparatus 100, 1000 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 27:
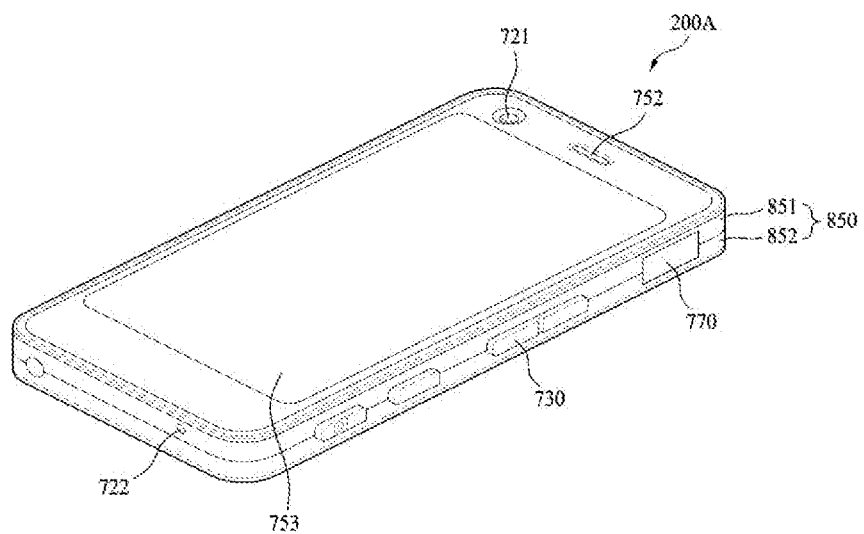
FIG. 27 is a perspective view of a portable terminal according to an embodiment.
Figure 28:
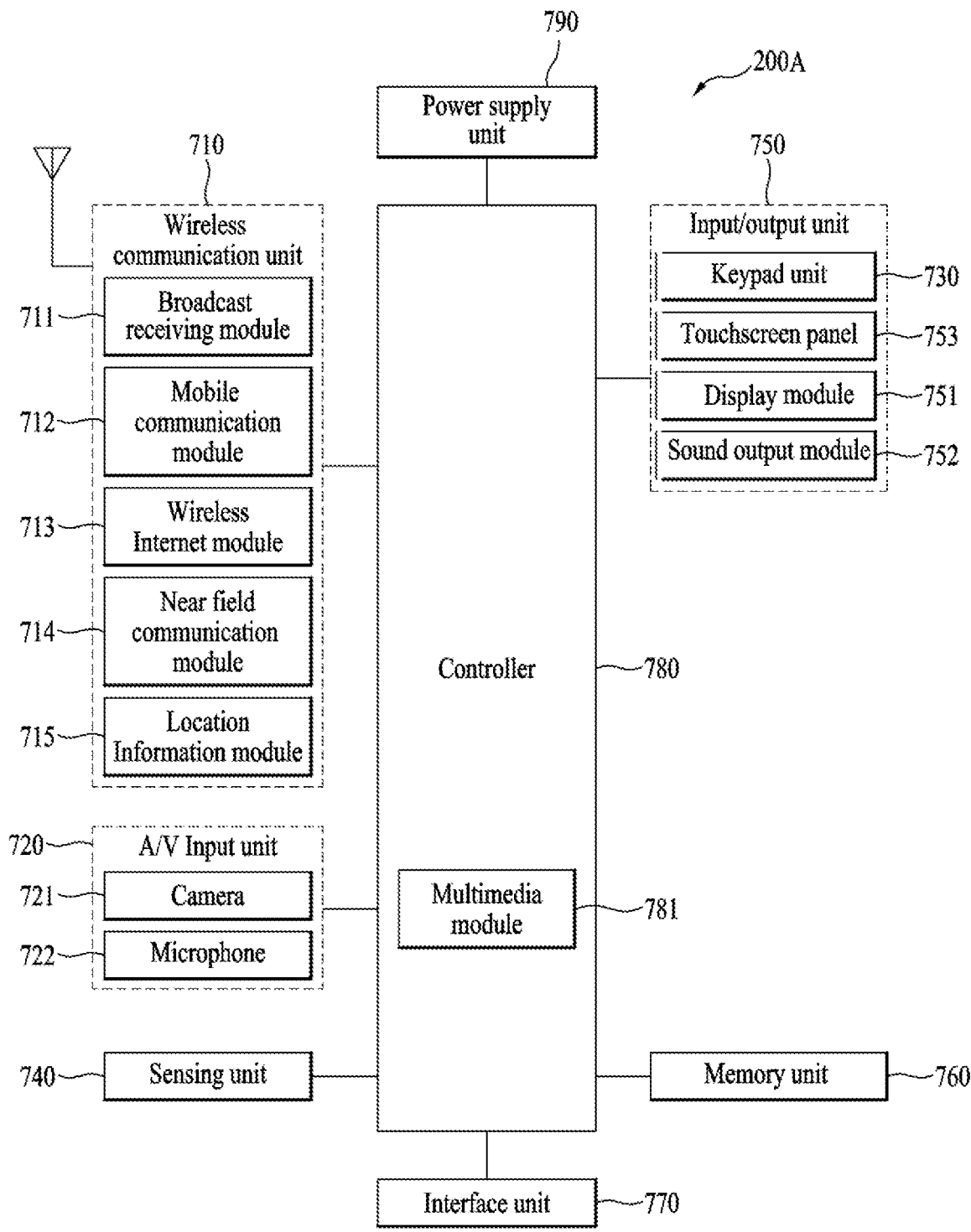
FIG. 28 is a view illustrating the configuration of the portable terminal illustrated in FIG. 27.

FIG. 27 is a perspective view illustrating a portable terminal 200A according to an embodiment. FIG. 28 is a view illustrating the configuration of the portable terminal illustrated in FIG. 27.

Referring to FIGS. 27 and 28, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 27 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera including the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

In place of the controller 830 of the camera module 200, the controller 780 of the optical device 200A may send a clock signal SCL, a data signal SDA and power signals VDD and GND for I2C communication with the position sensor 170, 1170 and may receive the clock signal SCL and the data signal SDA from the position sensor 170, 1170.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus and a camera module and an optical device each including the same, which are capable of mounting a large lens aperture while decreasing the size of a product, ensuring space for mounting a drive-type position sensor and improving design freedom.

The invention claimed is:
1. A lens moving apparatus comprising:
a housing comprising a first corner portion, a second corner portion, a third corner portion and a fourth corner portion;
a bobbin disposed in the housing;
a coil disposed on the bobbin and comprising a first coil and a second coil;
a magnet disposed on the housing so as to face the coil;
a circuit board disposed on one side surface of the housing and comprising a position sensor;
a sensing magnet disposed on the bobbin so as to face the position sensor; and
a lower elastic member comprising a first lower elastic unit, a second lower elastic unit, and a third lower elastic unit which are coupled to the housing and spaced apart from one another,
wherein the magnet comprises;
a first magnet disposed on the first corner portion of the housing so as to face the first coil; and
a second magnet disposed on the second corner portion facing the first corner portion so as to face the second coil,
wherein the position sensor is disposed closer to the third corner portion than to the first corner portion,
wherein no magnet is disposed on the third corner portion of the housing,
wherein a shortest distance between an optical axis and another side surface of the housing is less than a distance between the optical axis and the one side surface of the housing,
wherein the another side surface of the housing is disposed opposite to the one side surface of the housing with respect to an optical axis,
wherein a first end of the first coil is conductively connected to the first lower elastic unit and a second end of the first coil is conductively connected to a first end of the third lower elastic unit, and
wherein a first end of the second coil is conductively connected to a first end of the second lower elastic unit and a second end of the second coil is conductively connected to a second end of the third lower elastic unit.

2. The lens moving apparatus according to claim 1, wherein the circuit board is disposed between the first corner portion and the third corner portion of the housing.

3. The lens moving apparatus according to claim 1, wherein the lower elastic member is disposed under the housing,
wherein the first lower elastic unit is coupled to the third corner portion of the housing,
wherein the second lower elastic unit is coupled to the third corner portion of the housing,
wherein the third lower elastic unit is coupled to the fourth corner portion of the housing, which faces the third corner portion of the housing, and
wherein the circuit board comprises a first terminal conductively connected to the first lower elastic unit and a second terminal conductively connected to the second lower elastic unit.

4. The lens moving apparatus according to claim 3, wherein the lower elastic member does not overlap at least one of the first magnet and the second magnet in an optical-axis direction.

5. The lens moving apparatus according to claim 1, wherein one side surface of the bobbin, which faces one surface of the housing is provided with a projection projecting in a direction toward the one side surface of the housing, and the sensing magnet is disposed on the projection.

6. The lens moving apparatus according to claim 5, wherein the one side surface of the housing has therein a groove in which the projection of the bobbin is disposed.

7. The lens moving apparatus according to claim 6, wherein a width of at least a portion of the sensing magnet decreases in a direction toward the one side surface of the housing from the one side surface of the bobbin.

8. The lens moving apparatus according to claim 5, wherein a length of the sensing magnet in an optical-axis direction is greater than a length of the sensing magnet in a direction perpendicular to an optical axis.

9. The lens moving apparatus according to claim 5, wherein the bobbin comprises a seating groove depressed from an upper surface of the projection, and the sensing magnet is disposed in the seating groove.

10. The lens moving apparatus according to claim 1, wherein the housing comprises:
a first side portion disposed between the first corner portion and the third corner portion;
a second side portion facing the first side portion of the housing;

a third side portion disposed between the second corner portion and the third corner portion; and a fourth side portion disposed between the first corner portion and the fourth corner portion, and wherein a thickness of each of the third and fourth side portions of the housing is greater than a thickness of the second side portion of the housing.

11. The lens moving apparatus according to claim 10, wherein a length of the housing in a longitudinal direction is greater than a length of the housing in a crosswise direction, and wherein the longitudinal direction is a direction toward the second side portion from the first side portion, and the crosswise direction is a direction toward the fourth side portion from the third side portion.

12. The lens moving apparatus according to claim 1, comprising:

an upper elastic member coupled to an upper portion of the bobbin and an upper portion of the housing; and a base disposed under the housing.

13. A camera module comprising:

a lens;

the lens moving apparatus according to claim 1; and an image sensor.

14. A lens moving apparatus comprising:

a housing including a first corner portion, a second corner portion, a third corner portion and a fourth corner portion;

a bobbin disposed in the housing;

a coil disposed on the bobbin and comprising a first coil and a second coil;

a magnet disposed on the housing so as to face the coil; and a lower elastic member coupled to the bobbin and the housing and comprising a first lower elastic unit, a second lower elastic unit, and a third lower elastic unit which are spaced apart from one another, wherein the magnet comprises:

a first magnet disposed on the first corner portion of the housing so as to face the first coil; and a second magnet disposed on the second corner portion so as to face the first corner portion so as to face the second coil, wherein the third corner portion of the housing is disposed so as to be adjacent to the first corner portion and to face the fourth corner portion, wherein the lower elastic member comprises an inner portion coupled to a lower portion of the bobbin, an outer portion coupled to a lower portion of the housing and a connector connecting the inner portion to the outer portion, wherein, when viewed from a top, an imaginary line connecting the third corner portion to the fourth corner portion does not overlap the inner portion of the lower elastic member, wherein a first end of the first coil is conductively connected to the first lower elastic unit and a second end of the first coil is conductively connected to a first end of the third lower elastic unit, and wherein a first end of the second coil is conductively connected to a first end of the second lower elastic unit and a second end of the second coil is conductively connected to a second end of the third lower elastic unit.

15. The lens moving apparatus according to claim 14, wherein the imaginary line connecting the third corner portion to the fourth corner portion does not overlap the connector.

16. The lens moving apparatus according to claim 14, comprising:

a circuit board disposed between the first corner portion and the third corner portion; and a position sensor disposed on the circuit board, wherein the position sensor is disposed closer to the third corner portion than to the first corner portion of the housing.

17. The lens moving apparatus according to claim 16, wherein no magnet is disposed on the third corner portion of the housing.

18. A lens moving apparatus comprising:

a housing including a first corner portion, a second corner portion, a third corner portion and a fourth corner portion;

a bobbin disposed in the housing;

a coil disposed on the bobbin and comprising a first coil and a second coil;

a magnet disposed on the housing, a lower elastic member coupled to the housing and comprising a first lower elastic unit, a second lower elastic unit, and a third lower elastic unit which are spaced apart from one another, wherein the magnet comprises:

a first magnet disposed on the first corner portion of the housing so as to face the first coil; and a second magnet disposed on the second corner portion so as to face the first corner portion so as to face the second coil, wherein the third corner portion of the housing is disposed so as to be adjacent to the first corner portion and face the fourth corner portion, wherein, when viewed from a top, an imaginary line connecting the third corner portion to the fourth corner portion does not overlap the magnet and the coil, wherein a first end of the first coil is conductively connected to the first lower elastic unit and a second end of the first coil is conductively connected to a first end of the third lower elastic unit, and wherein a first end of the second coil is conductively connected to a first end of the second lower elastic unit and a second end of the second coil is conductively connected to a second end of the third lower elastic unit.

* * * * *